US012641222B2

(12) United States Patent
Huo et al.

(10) Patent No.: US 12,641,222 B2
(45) Date of Patent: May 26, 2026

(54) CODING METHOD AND APPARATUS, DECODING METHOD AND APPARATUS, AND CODING DEVICE, DECODING DEVICE AND STORAGE MEDIUM

(71) Applicant: GUANGDONG OPPO MOBILE TELECOMMUNICATIONS CORP., LTD., Dongguan (CN)

(72) Inventors: Junyan Huo, Dongguan (CN); Yanzhuo Ma, Dongguan (CN); Fuzheng Yang, Dongguan (CN); Danni Wang, Dongguan (CN); Hongqing Du, Dongguan (CN); Ming Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/907,838

(22) Filed: Oct. 7, 2024

(65) Prior Publication Data

US 2025/0030842 A1     Jan. 23, 2025

Related U.S. Application Data

(63) Continuation of application No. PCT/CN2022/086465, filed on Apr. 12, 2022.

(51) Int. Cl.
H04N 19/105 (2014.01)
H04N 19/132 (2014.01)
(Continued)

(52) U.S. Cl.
CPC ......... H04N 19/105 (2014.11); H04N 19/132 (2014.11); H04N 19/176 (2014.11);
(Continued)

(58) Field of Classification Search
CPC .... H04N 19/105; H04N 19/11; H04N 19/132; H04N 19/176; H04N 19/186; H04N 19/42; H04N 19/50; H04N 19/593
See application file for complete search history.

(56) References Cited

U.S. PATENT DOCUMENTS 11,909,956 B2 *   2/2024   Lin ........................ H04N 19/50
11,956,453 B2 *   4/2024   Lin ........................ H04N 19/42
(Continued)

FOREIGN PATENT DOCUMENTS

CN      109716771 A      5/2019
CN      110602491 A     12/2019
(Continued)

OTHER PUBLICATIONS

International Search Report in the international application No. PCT/CN2022/086465, mailed on Nov. 29, 2022, 6 pages with English translation.
(Continued)

*Primary Examiner* — Boubacar Abdou Tchoussou
(74) *Attorney, Agent, or Firm* — BAYES PLLC

(57)     ABSTRACT

Disclosed are a coding method, a decoding method, and a decoding device. The decoding method includes: determining a reference sample value of a first color component of the current block; according to the reference sample value of the first color component of the current block, determining a weighting coefficient by means of a neural network model, wherein an input for the neural network model comprises the reference sample value of the first color component of the current block; according to the weighting coefficient and a reference sample value of a second color component of the current block, determining a predicted block of the second color component of the current block; and according to the predicted block, determining a reconstructed value of a
(Continued)

sampling point of the second color component of the current block.

17 Claims, 22 Drawing Sheets

(51) Int. Cl.
| | |
|---|---|
| *H04N 19/176* | (2014.01) |
| *H04N 19/186* | (2014.01) |
| *H04N 19/42* | (2014.01) |
| *H04N 19/50* | (2014.01) |

(52) U.S. Cl.
CPC ........... *H04N 19/186* (2014.11); *H04N 19/42* (2014.11); *H04N 19/50* (2014.11)

(56) References Cited

U.S. PATENT DOCUMENTS

| | | | | |
|---|---|---|---|---|
| 12,327,383 | B2 * | 6/2025 | Lee ...................... | H04N 19/139 |
| 12,355,942 | B2 * | 7/2025 | Dumas ................... | H04N 19/12 |
| 2022/0078484 | A1 | 3/2022 | Filippov et al. | |
| 2022/0116591 | A1 | 4/2022 | Huo et al. | |
| 2023/0254507 | A1 * | 8/2023 | Dumas ................ | H04N 19/186 |
| | | | | 375/240.12 |
| 2024/0155153 | A1 * | 5/2024 | Kang ................... | H04N 19/176 |

FOREIGN PATENT DOCUMENTS

| | | |
|---|---|---|
| CN | 114041288 A | 2/2022 |
| EP | 4049453 A1 | 8/2022 |
| GB | 2591806 A | 8/2021 |
| WO | 2021078498 A1 | 4/2021 |
| WO | 2021156587 A1 | 8/2021 |

OTHER PUBLICATIONS

English translation of the Written Opinion of the International Search Authority in the international application No. PCT/CN2022/086465, mailed on Nov. 29, 2022, 6 pages with English translation.

Dumas, T. et al. "AHG11: neural network-based intra prediction: updated signaling", Joint Video Experts Team (JVET) of ITU-T SG 16 WP 3 and ISO/IEC JTC I/SC 29 22nd Meeting, by teleconference, Apr. 28, 2021 (Apr. 28, 2021), entire document, pp. 1-10.

First Office Action of the Japanese application No. 2024-559959, issued on Jan. 6, 2026.

Blanch Marc Gorriz et al: "Chroma Intra Prediction With Attention-Based CNN Architectures", 2020 IEEE International Conference On Image Processing (ICIP), IEEE, Oct. 25, 2020 (Oct. 25, 2020), pp. 783-787, XP033869761, DOI: 10.1109/ICIP40778.2020.9191050 [retrieved on Sep. 9, 2020], the whole document.

Zhu L et al: "Deep Learning-Based Chroma Prediction for Intra Versatile Video Coding", IEEE Transactions On Circuits and Systems Por Video Technology, vol. 31, No. 8, Aug. 2021, [Online] Aug. 1, 2021 (Aug. 1, 2021), XP093345278, the whole document.

Zou Chengyi et al: "Spatial Information Refinement for Chroma Intra Prediction in Video Coding", 2021 Asia- Pacific Signal and Information Processing Association Annual Summit and Conference (APSIPA ASG). IEEE, Jan. 1, 2021 (Jan. 1, 2021), pp. 1-6, XP093215127, the whole document.

Supplementary European Search Report in the European application No. 22936843.6, mailed on Jan. 14, 2026.

\* cited by examiner

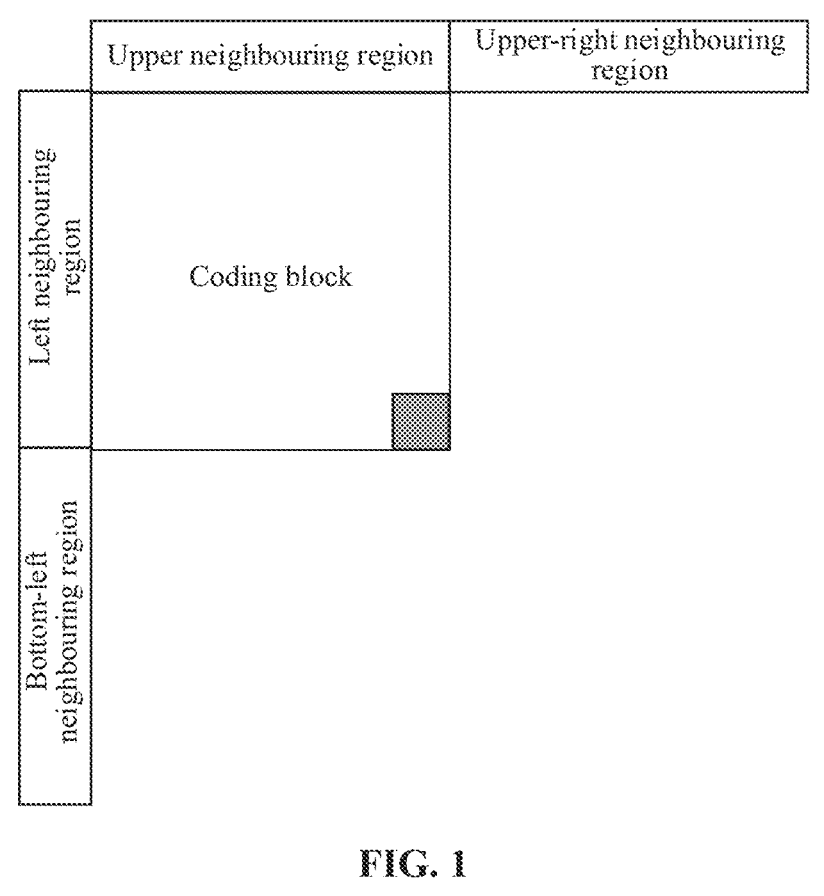

| Upper neighbouring region | Upper-right neighbouring region |
|---|---|

Left neighbouring region

Coding block

Bottom-left neighbouring region

FIG. 1

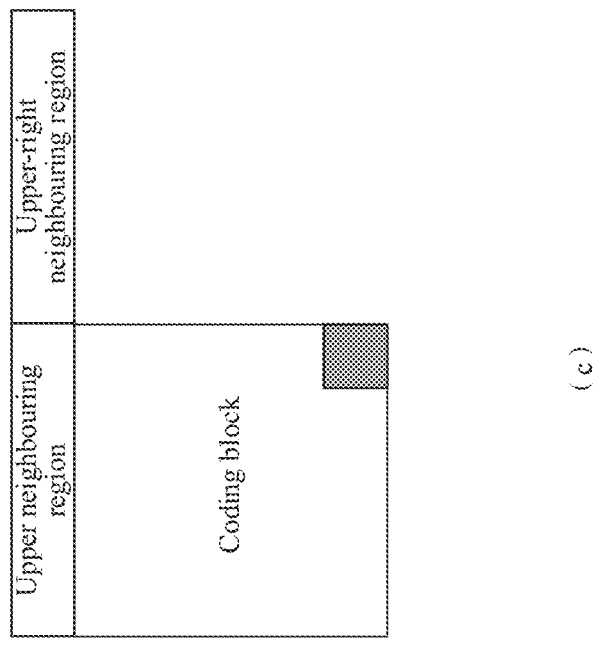
(c)
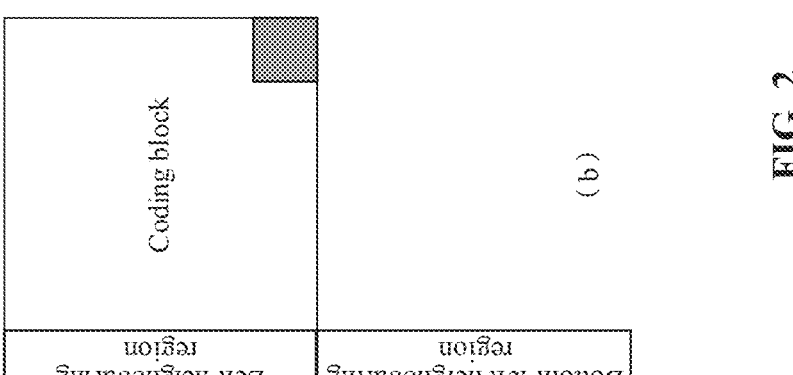
(b)
FIG. 2
(a)

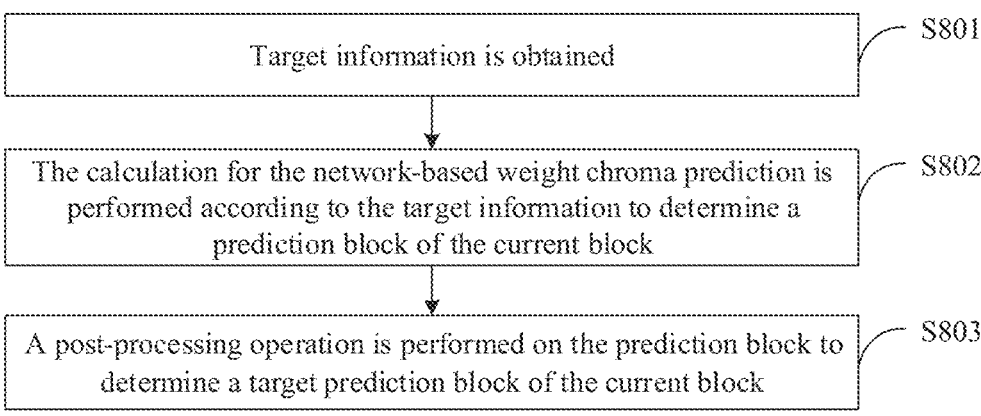

| Target information is obtained | ⟋ S801 |

| The calculation for the network-based weight chroma prediction is performed according to the target information to determine a prediction block of the current block | ⟋ S802 |

| A post-processing operation is performed on the prediction block to determine a target prediction block of the current block | ⟋ S803 |

FIG. 8

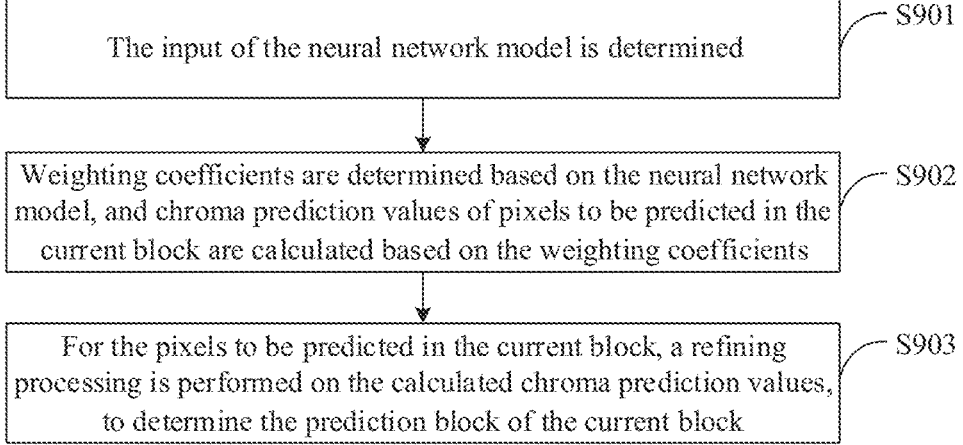

| The input of the neural network model is determined | ⟋ S901 |

| Weighting coefficients are determined based on the neural network model, and chroma prediction values of pixels to be predicted in the current block are calculated based on the weighting coefficients | ⟋ S902 |

| For the pixels to be predicted in the current block, a refining processing is performed on the calculated chroma prediction values, to determine the prediction block of the current block | ⟋ S903 |

FIG. 9

CODING METHOD AND APPARATUS, DECODING METHOD AND APPARATUS, AND CODING DEVICE, DECODING DEVICE AND STORAGE MEDIUM

CROSS-REFERENCE TO RELATED APPLICATION

This application is a continuation of International Patent Application No. PCT/CN2022/086465 filed on Apr. 12, 2022, the disclosure of which is hereby incorporated by reference in its entirety.

BACKGROUND

With the improvement of people's requirements for the video display quality, new video application forms, such as high-definition video and ultra-high-definition video, have emerged as the times require. The Joint Video Exploration Team (JVET) of ISO/IEC and ITU-T has developed the next generation video coding standard H.266/Versatile Video Coding (VVC).

Inter-colour component prediction techniques are included in H.266/VVC. However, there is a large deviation between the prediction value of the coded block calculated through an inter-colour prediction technique of H.266/VVC and the original value, which leads to low prediction accuracy, degradation of decoded video quality and degradation of coding performance.

SUMMARY

Embodiments of the present disclosure provide an encoding method, a decoding method, an encoding device, a decoding device and a storage medium, which can not only improve an accuracy of the chroma prediction and save a bit rate, but also improve the encoding and decoding performance.

The technical solutions of the embodiments of the present disclosure can be implemented as follows.

In a first aspect, an embodiment of the present disclosure provides a decoding method. The method includes the following operations.

Reference sample values of a first colour component of a current block are determined.

According to the reference sample values of the first colour component of the current block, weighting coefficients are determined through a neural network model, herein, an input of the neural network model includes the reference sample values of the first colour component of the current block.

A prediction block of a second colour component of the current block is determined according to the weighting coefficients and reference sample values of the second colour component of the current block.

Reconstructed values of second colour component samples of the current block are determined according to the prediction block.

In a second aspect, an embodiment of the present disclosure provides an encoding method. The method includes the following operations.

Reference sample values of a first colour component of a current block are determined.

According to the reference sample values of the first colour component of the current block, weighting coefficients are determined through a neural network model, herein, an input of the neural network model includes the reference sample values of the first colour component of the current block.

A prediction block of a second colour component of the current block is determined according to the weighting coefficients and reference sample values of the second colour component of the current block.

Prediction difference values of second colour component samples of the current block are determined according to the prediction block.

In a third aspect, an embodiment of the present disclosure provides an encoding apparatus, and the encoding apparatus includes a first determination unit, a first model unit and a first prediction unit.

The first determination unit is configured to determine reference sample values of a first colour component of a current block.

The first model unit is configured to determine, according to the reference sample values of the first colour component of the current block, weighting coefficients through a neural network model, herein, an input of the neural network model includes the reference sample values of the first colour component of the current block.

The first prediction unit is configured to determine a prediction block of a second colour component of the current block according to the weighting coefficients and reference sample values of the second colour component of the current block.

The first determination unit is further configured to determine prediction difference values of second colour component samples of the current block according to the prediction block.

In a fourth aspect, an embodiment of the present disclosure provides an encoding device, and the encoding device includes a first memory and a first processor.

The first memory is configured to store computer programs executable on the first processor.

The first processor is configured to perform the method according to the second aspect when executing the computer programs.

In a fifth aspect, an embodiment of the present disclosure provides a decoding apparatus, and the decoding apparatus includes a second determination unit, a second model unit and a second prediction unit.

The second determination unit is configured to determine reference sample values of a first colour component of a current block.

The second model unit is configured to determine, according to the reference sample values of the first colour component of the current block, weighting coefficients through a neural network model, herein, an input of the neural network model includes the reference sample values of the first colour component of the current block.

The second prediction unit is configured to determine a prediction block of a second colour component of the current block according to the weighting coefficients and reference sample values of the second colour component of the current block.

The second determination unit is further configured to determine reconstructed values of second colour component samples of the current block according to the prediction block.

In a sixth aspect, an embodiment of the present disclosure provides a decoding device, and the decoding device includes a second memory and a second processor.

The second memory is configured to store computer programs executable on the second processor.

The second processor is configured to perform the method according to the first aspect when executing the computer programs.

In a seventh aspect, an embodiment of the present disclosure provides a computer readable storage medium. The computer readable storage medium stores computer programs that when executed, implement the method according to the first aspect or the method according to the second aspect.

The embodiments of the present disclosure provide an encoding method and apparatus, a decoding method and apparatus, an encoding device, a decoding device and a storage medium. In both an encoding side and a decoding side: reference sample values of a first colour component of a current block are determined; according to the reference sample values of the first colour component of the current block, weighting coefficients are determined through a neural network model, herein, an input of the neural network model includes the reference sample values of the first colour component of the current block; a prediction block of a second colour component of the current block is determined according to the weighting coefficients and reference sample values of the second colour component of the current block. So that at the encoding side, prediction difference values of second colour component samples of the current block can be determined according to the prediction block; and at the decoding side, reconstructed values of second colour component samples of the current block can be determined according to the prediction block. In this way, by using the colour component information in the neighbouring region of the current block and the colour component information in the current block, multiple types of available input information can be provided for the network-based weight chroma prediction, and thus the chroma prediction can be better performed. In addition, by taking the luma difference between the reference pixel and the current block or a result after performing a correlation process on the luma difference as one of the inputs of the neural network, and by learning a correlation between the reference chroma and the chroma to be predicted of the current block through the neural network, and using the correlation for the chroma prediction of the current block, the accuracy of the chroma prediction can be further improved, the bit rate can be saved, and the encoding and decoding performance can be improved at the same time.

BRIEF DESCRIPTION OF THE DRAWINGS

FIG. 1 is a schematic diagram of distribution of available neighbouring regions;

FIG. 2 is a schematic diagram of distribution of selection regions under different prediction modes;

FIG. 8 is a second schematic flowchart of a decoding method according to an embodiment of the present disclosure;

FIG. 9 is a third schematic flowchart of a decoding method according to an embodiment of the present disclosure;

DETAILED DESCRIPTION

Figure 3:
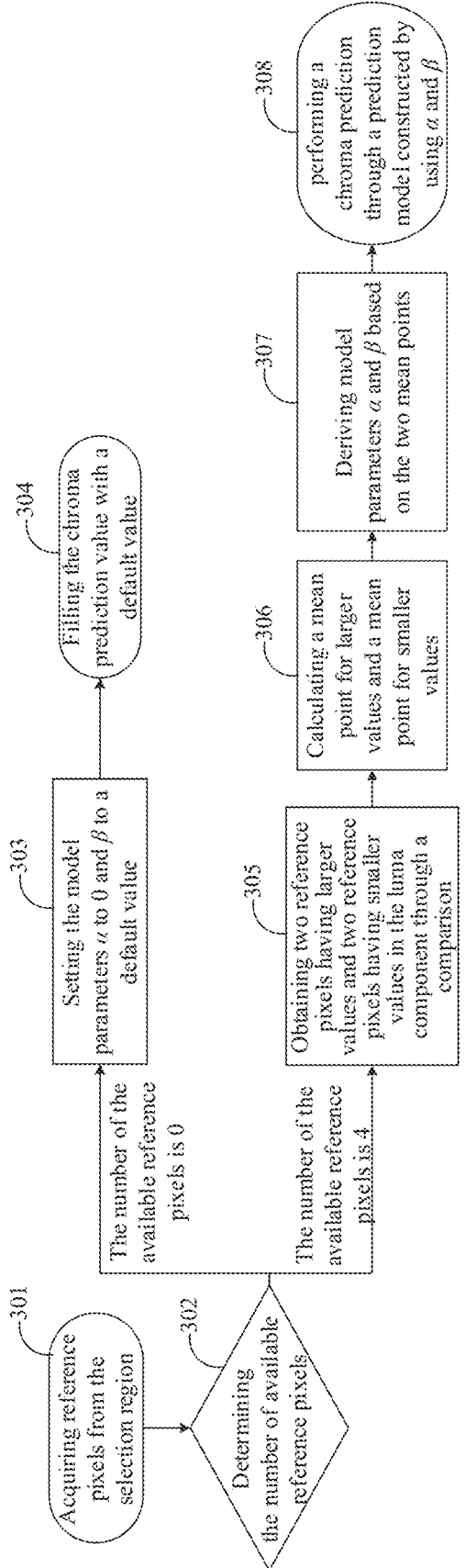
FIG. 3 is a schematic flowchart of a model parameter derivation scheme.

In order to provide a more detailed understanding of the features and technical contents of the embodiments of the present disclosure, the implementation of the embodiments of the present disclosure will be described in detail below in conjunction with the accompanying drawings, which are provided for illustration only, and are not intended to limit the embodiments of the present disclosure.

Unless otherwise defined, all technical and scientific terms used herein have a same meaning as commonly understood by those skilled in the art of the present disclosure. The terms used herein are only for a purpose of describing the embodiments of the present disclosure and are not intended to limit the present disclosure.

In the following description, reference is made to "some embodiments", which describe a subset of all possible embodiments. However, it should be understood that "some embodiments" may be a same subset or different subsets of all possible embodiments and may be combined with each other without conflict. It should further be noted that involved terms "first\second\third" in the embodiments of the present disclosure are used only to distinguish similar objects rather than representing a particular order for objects. It should be understood that "first\second\third" may be interchanged in a particular order or a priority order, so that the embodiments of the present disclosure described herein can be implemented in an order other than that illustrated or described herein.

In video pictures, a first colour component, a second colour component and a third colour component are generally used to characterize a Coding Block (CB). These three colour components are a luma component, a blue chroma component and a red chroma component, respectively. For example, the luma component is typically represented by a symbol Y, the blue chroma component is typically represented by a symbol Cb or U, and the red chroma component is typically represented by a symbol Cr or V. In this way, the video picture can be represented in an YCbCr format or in a YUV format. In addition, the video picture may be in an RGB format, an YCgCo format, or the like, which is not limited in the embodiments of the present disclosure.

It can be understood that in the current video picture or video encoding and decoding process, the cross-component prediction technology mainly includes a Cross-component Linear Model (CCLM) prediction mode and a Multi-Directional Linear Model (MDLM) prediction mode. Regardless of the model parameters derived according to the CCLM prediction mode or the model parameters derived according to the MDLM prediction mode, the corresponding prediction model can realize the prediction between colour components, such as a prediction from a first colour component to a second colour component, a prediction from a second colour component to a first colour component, a prediction from a first colour component to a third colour component, a prediction from a third colour component to a first colour component, a prediction from a second colour component to a third colour component, or a prediction from a third colour component to a second colour component.

Taking the prediction from the first colour component to the second colour component as an example, it is assumed that the first colour component is the luma component and the second colour component is the chroma component, in order to reduce a redundancy between the luma component and the chroma component, a CCLM prediction mode is used in VVC, that is, a prediction value of the chroma is constructed according to the reconstructed luma value in the same coding block, as represented by:

$$Pred_C(i, j) = \alpha \cdot Rec_L(i, j) + \beta.$$

Where i, j represents a position coordinate of a pixel to be predicted in the coding block, i represents a horizontal direction, j represents a vertical direction, $Pred_C(i,j)$ represents a chroma prediction value corresponding to the pixel to be predicted with the position coordinate (i, j) in the coding block, $Rec_L(i, j)$ represents a reconstructed luma value corresponding to the pixel to be predicted with the position coordinate (i, j) in the same coding block (after down-sampling). In addition, $\alpha$ and $\beta$ represent model parameters, which can be derived from reference pixels.

For a coding block, the neighbouring regions thereof can be partitioned into five portions: a left neighbouring region, an upper neighbouring region, a bottom-left neighbouring region, an upper-left neighbouring region and an upper-right neighbouring region. Three cross-component linear model prediction modes are included in H.266/VVC, which are an intra CCLM prediction mode (represented by INTRA_LT_CCLM) for the left and upper neighbours, an intra CCLM prediction mode (represented by INTRA_L_CCLM) for the left and bottom-left neighbours and an intra CCLM prediction mode (represented by INTRA_T_CCLM) for the upper and upper-right neighbours. In each of the three prediction modes, a preset number (such as four) of reference pixels may be selected for the derivation of model parameters $\alpha$ and $\beta$, and the biggest difference among these three prediction modes is that the selection regions corresponding to the reference pixels used to derive the model parameters $\alpha$ and $\beta$ are different.

Specifically, the size of the coding block corresponding to the chroma component is W×H, it is assumed that the upper selection region corresponding to the reference pixel is W', the left selection region corresponding to the reference pixel is H. In this way:

for the INTRA_LT_CCLM mode, the reference pixel may be selected in the upper neighbouring region and the left neighbouring region, i.e., W'W, H'H;

for the INTRA_L_CCLM mode, the reference pixel may be selected in the left neighbouring region and the bottom-left neighbouring region, i.e., H'W+H, and set W'=0; and for the INTRA_T_CCLM mode, the reference pixel may be selected in the upper neighbouring region and the upper-right neighbouring region, i.e., W'=W+H, and set H'=0.

It should be noted that in VTM, only the pixels within the W range are stored at most in the upper-right neighbouring region, and only the pixels within the H range are stored at most in the bottom-left neighbouring region. The ranges of the selection regions of the INTRA_L_CCLM mode and the INTRA_T_CCLM mode are defined as W+H, however, in a practical application, the selection region of the INTRA_L_CCLM mode will be limited within H+H, and the selection region of the INTRA_T_CCLM mode will be limited within W+W. I this way:

for the INTRA_L_CCLM mode, the reference pixel may be selected in the left neighbouring region and the bottom-left neighbouring region, H'=min{W+H, H+H}; and for the INTRA_T_CCLM mode, the reference pixel may be selected in the upper neighbouring region and the upper-right neighbouring region, W'=min{W+H, W+W}.

Referring to FIG. 1, a schematic diagram of distribution of available neighbouring regions is shown. In FIG. 1, the left neighbouring region, the bottom-left neighbouring region, the upper neighbouring region and the upper-right neighbouring region are all available. In addition, the block filled in gray is the pixel to be predicted with position coordinate (i, j) in the coding block.

As such, on basis of FIG. 1, the selection regions for the three prediction modes are shown in FIG. 2. In FIG. 2, (a) represents the selection region of the INTRA_LT_CCLM mode, including the left neighbouring region and the upper neighbouring region; (b) represents the selection region of the INTRA_L_CCLM mode, including the left neighbouring region and the bottom-left neighbouring region; and (c) represents the selection region of the INTRA_T_CCLM mode, including an upper neighbouring region and an upper-right neighbouring region. In this way, after the selection regions for the three prediction modes are determined, the pixel for model parameter derivation may be selected within the selection regions. Thus, the selected pixel may be referred to as a reference pixel, and the number of reference pixels is usually 4. For a coding block having a determined size of W×H, the positions of reference pixels thereof are generally determined.

After obtaining a preset number of reference pixels, the chroma prediction is currently performed according to the schematic flowchart of a model parameter derivation scheme shown in FIG. 3. According to the flow shown in FIG. 3, assuming that the preset number is 4, the flow may include the following operations.

At operation 301, reference pixels are acquired in the selection region.

At operation 302, the number of available reference pixels is determined.

At operation 303, when the number of the available reference pixels is 0, the model parameter $\alpha$ is set to 0, the model parameter $\beta$ is set to a default value.

At operation 304, the chroma prediction value is filled with a default value.

At operation 305, when the number of the available reference pixels is 4, two reference pixels having larger values and two reference pixels having smaller values in the luma component are obtained through a comparison.

At operation 306, a mean point for larger values and a mean point for smaller values are calculated.

At operation 307, model parameters $\alpha$ and $\beta$ are derived from two mean points.

At operation 308, the chroma prediction is performed using a prediction model constructed by using $\alpha$ and $\beta$.

It should be noted that, in VVC, the operation of the number of the available reference pixels being 0 is determined according to the availability of the neighbouring regions.

It should further be noted that when utilizing a principle of "two points determining a straight line" to construct a prediction model, these two points here can be referred to as fitting points. In the present technical solution, after obtaining four reference pixels, two reference pixels having larger values and two reference pixels having smaller values in the luma component are obtained through a comparison; then, a mean point (represented by $mean_{max}$) is calculated according to the two reference pixels having the larger values, another mean point (represented by $mean_{min}$) is calculated according to the two reference pixels having the smaller values, and then two mean points ($mean_{max}$ and $mean_{min}$) are obtained; next, $mean_{max}$ and $mean_{min}$ are used as two fitting points, to derive the model parameters (represented by $\alpha$ and $\beta$); finally, a prediction model is constructed according to $\alpha$ and $\beta$, and the prediction process of the chroma component is performed according to the prediction model.

However, in the related art, each coding block uses a simple linear model $Pred_C(i, j) = \alpha \cdot Rec_L(i, j) + \beta$, to predict the chroma component, and pixels at any position of each coding block are predicted by using the same model parameters $\alpha$ and $\beta$. This will lead to the following defects: on the one hand, coding blocks with different content characteristics all use the simple linear model to map from the luma to the chroma for realizing the chroma prediction, but not all mapping functions from the luma to the chroma in any coding block can be accurately fitted from the simple linear model, which leads to inaccurate prediction effect for some coding blocks; on the other hand, in the prediction process, the same model parameters $\alpha$ and $\beta$ are used for pixels at different positions in the coding block, the prediction accuracy at different positions in the coding block is also quite different. Simply put, under the current CCLM technology, there is a large deviation between the prediction value for some coding blocks and the original value, which leads to a low prediction accuracy, a degradation of quality, and then a reduction of the encoding and decoding efficiency.

Based on this, an embodiment of the present disclosure provides an encoding method, which includes that: reference sample values of a first colour component of a current block are determined; according to the reference sample values of the first colour component of the current block, weighting coefficients are determined through a neural network model, herein, an input of the neural network model includes the reference sample values of the first colour component of the current block; a prediction block of a second colour component of the current block is determined according to the weighting coefficients and reference sample values of the second colour component of the current block; and prediction difference values of second colour component samples of the current block are determined according to the prediction block.

An embodiment of the present disclosure further provides a decoding method, which includes that: reference sample values of a first colour component of a current block are determined; according to the reference sample values of the first colour component of the current block, weighting coefficients are determined through a neural network model, herein, an input of the neural network model includes the reference sample values of the first colour component of the current block; a prediction block of a second colour component of the current block is determined according to the weighting coefficients and reference sample values of the second colour component of the current block; and reconstructed values of second colour component samples of the current block are determined according to the prediction block.

In this way, by making full use of the colour component information in the neighbouring region of the current block and the colour component information in the current block, multiple types of available input information can be provided for the network-based weight chroma prediction, and thus the chroma prediction can be better performed. In addition, by taking the luma difference between the reference pixel and the current block or a result after performing a correlation process on the luma difference as one of the inputs of the neural network, and by learning a correlation between the reference chroma and the chroma to be predicted of the current block through the neural network, and using the correlation for the chroma prediction of the current block, the accuracy of the chroma prediction can be further improved, the bit rate can be saved, and the encoding and decoding performance can be improved at the same time.

The embodiments of the present disclosure will be described in detail below with reference to the accompanying drawings.

Figure 4A:
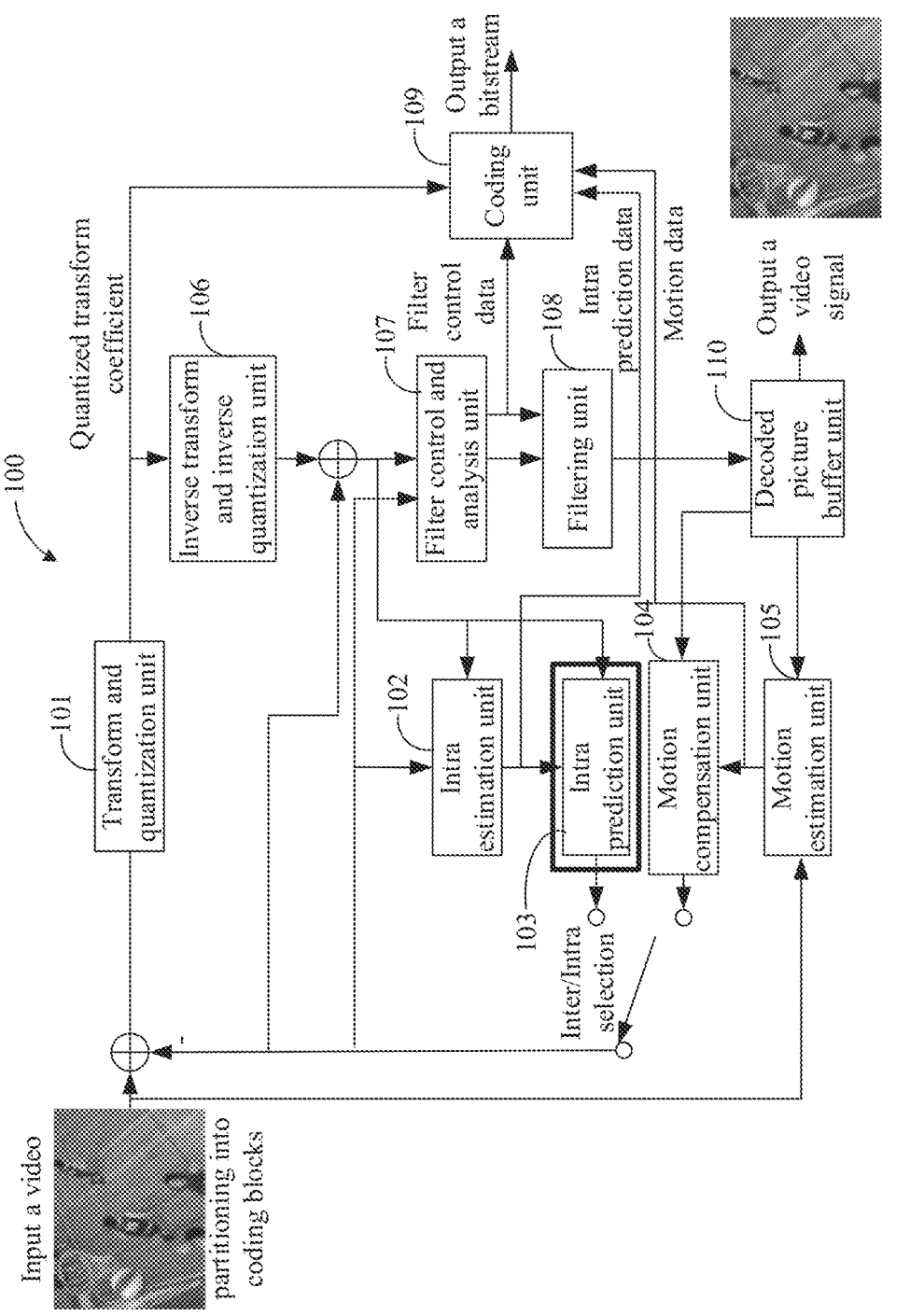
FIG. 4A is a schematic block diagram of a composition of an encoder according to an embodiment of the present disclosure.

Referring to FIG. 4A, a schematic block diagram of a composition of an encoder according to an embodiment of the present disclosure is illustrated. As shown in FIG. 4A, the encoder (specifically, a video encoder) 100 may include a transform and quantization unit 101, an intra estimation unit 102, an intra prediction unit 103, a motion compensation unit 104, a motion estimation unit 105, an inverse transform and inverse quantization unit 106, a filter control and analysis unit 107, a filtering unit 108, a coding unit 109 and a decoded picture buffer unit 110, etc. The filtering unit 108 can implement a deblocking filtering and a Sample Adaptive Offset (SAO) filtering, and the coding unit 109 can implement head information coding and Context-based Adaptive Binary Arithmetic Coding (CABAC). For an input original video signal, a video coding block can be obtained by partition of a Coding Tree Unit (CTU), and then the video coding block is transformed through the transform and quantization unit 101 based on residual pixel information obtained after an intra prediction or an inter prediction, including transforming the residual information from a pixel domain to a transform domain, and quantizing the obtained transform coefficients to further reduce a bit rate. The intra estimation unit 102 and the intra prediction unit 103 are used to perform the intra prediction on the video coding block, specifically, the intra estimation unit 102 and the intra prediction unit 103 are used to determine an intra prediction mode to be used to encode the video coding block. The motion compensation unit 104 and the motion estimation unit 105 are used to perform the inter prediction coding of the received video coding block with respect to one or more blocks of one or more reference pictures to provide temporal prediction information. A motion estimation performed by the motion estimation unit 105 is a process of generating motion vectors that can be used to estimate the motion of the video coding block, and then a motion compensation is performed by the motion compensation unit 104 based on the motion vectors determined by the motion estimation unit 105. After determining the intra prediction mode, the intra prediction unit 103 is further used to supply selected intra prediction data to the coding unit 109, and the motion estimation unit 105 transmits the motion vector data determined by calculating to the coding unit 109. Furthermore, the inverse transform and inverse quantization unit 106 is used for a reconstruction of the video coding block, a residual block is reconstructed in the pixel domain. Blocking artifacts of the reconstructed residual block are removed through the filter control and analysis unit 107 and the filtering unit 108, and then the reconstructed residual block is added to a prediction block in a picture of the decoded picture buffer unit 110, to generate the reconstructed video coding block. The coding unit 109 is used for encoding various encoding parameters and quantized transform coefficients. In a CABAC-based coding algorithm, context contents can be based on neighbouring coding blocks, and can be used to code information indicating the determined intra prediction mode, and a bitstream of the video signal is outputted. The decoded picture buffer unit 110 is used to store the reconstructed video coding block for a prediction reference. As the video picture encoding progresses, new reconstructed video coding blocks are continuously generated and all of these reconstructed video coding blocks are stored in the decoded picture buffer unit 110.

Figure 4B:
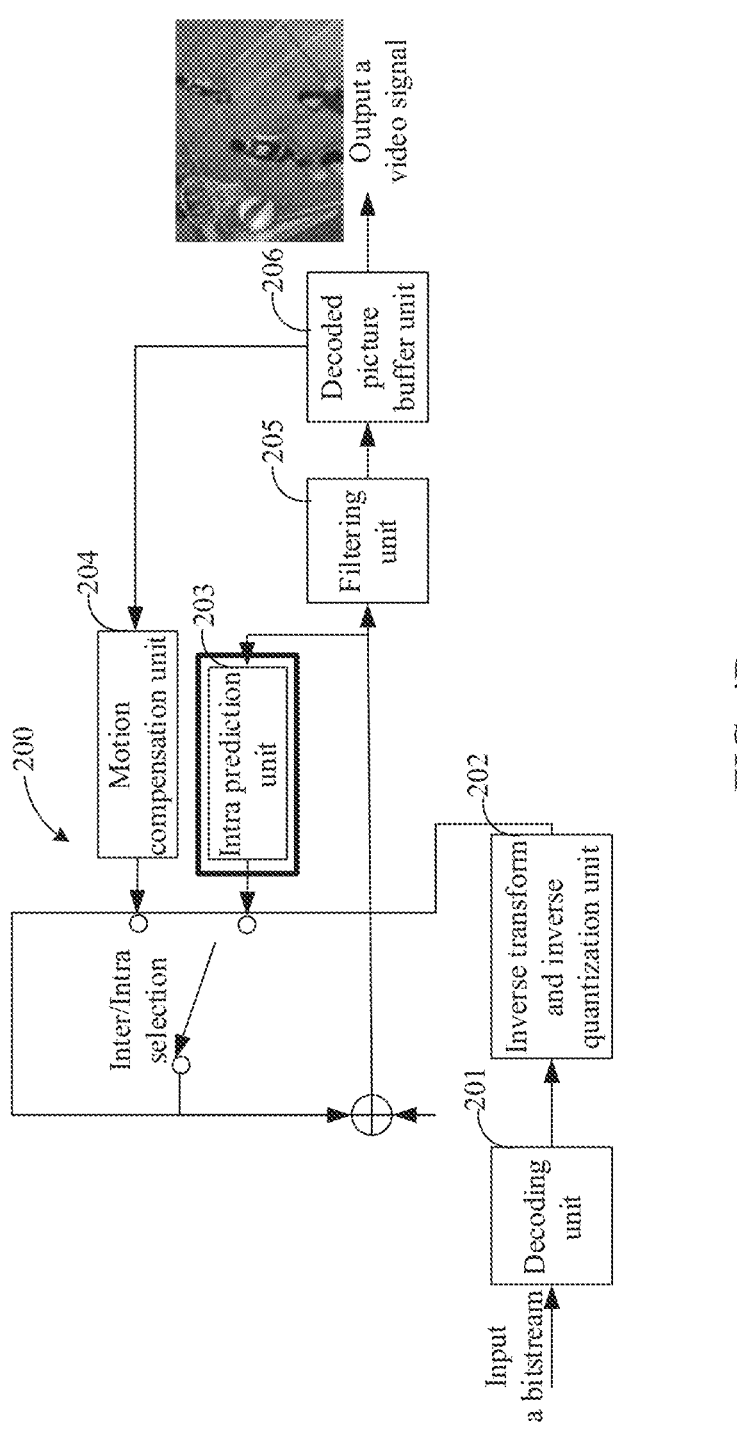
FIG. 4B is a schematic block diagram of a composition of a decoder according to an embodiment of the present disclosure.

Referring to FIG. 4B, a schematic block diagram of a composition of a decoder according to an embodiment of the present disclosure is illustrated. As shown in FIG. 4B, the decoder (Specifically, a video decoder) 200 includes a decoding unit 201, an inverse transform and inverse quantization unit 202, an intra prediction unit 203, a motion compensation unit 204, a filtering unit 205 and a decoded picture buffer unit 206, etc. The decoding unit 201 can implement a head information decoding and a CABAC decoding, and the filtering unit 205 can implement a deblocking filtering and a SAO filtering. After an input video signal is encoded as described in FIG. 4A, a bitstream of the video signal is outputted. The bitstream is inputted into the decoder 200, and firstly passes through the decoding unit 201 to obtain decoded transform coefficients. The transform coefficients are processed by the inverse transform and inverse quantization unit 202 to generate a residual block in a pixel domain. The intra prediction unit 203 can be used to generate prediction data of a current video coding block based on the determined intra prediction mode and data from previously decoded block of a current picture or picture. The motion compensation unit 204 is used to determine prediction information for the video coding block by parsing motion vectors and other associated syntax elements, and use the prediction information to generate a prediction block of the video coding block being decoded. The decoded video block is formed by summing the residual block from the inverse transform and inverse quantization unit 202 and the corresponding prediction block generated by the intra prediction unit 203 or the motion compensation unit 204. Blocking artifacts of the decoded video signal are removed through the filtering unit 205, so that the video quality can be improved. Then the decoded video block is stored in the decoded picture buffer unit 206. The decoded picture buffer unit 206 stores a reference picture for subsequent intra prediction or motion compensation, at the same time, the decoded picture buffer unit 206 is also used to output the video signal, i.e. a recovered original video signal is obtained.

It should be noted that the method in the embodiments of the present disclosure can be applied to the intra prediction unit 103 as shown in FIG. 4A and the intra prediction unit 203 as shown in FIG. 4B. That is to say, the embodiments of the present disclosure can be applied to an encoder, a decoder, or even to an encoder and a decoder at the same time, which is not specifically limited in the embodiments of the present disclosure.

It should further be noted that when applying to the intra prediction unit 103, "current block" specifically refers to an encoding block currently to be intra predicted. When applying to the intra prediction unit 203, "current block" specifically refers to a decoding block currently to be intra predicted.

Figure 5:
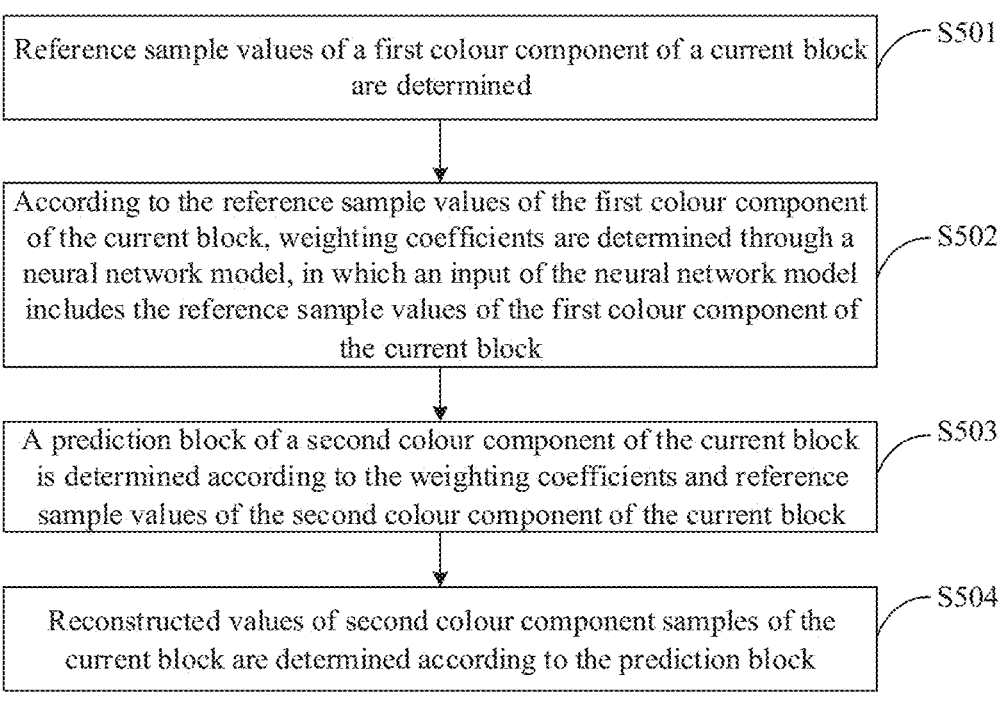
FIG. 5 is a first schematic flowchart of a decoding method according to an embodiment of the present disclosure.

In an embodiment of the present disclosure, referring to FIG. 5, which illustrates a first schematic flowchart of a decoding method according to an embodiment of the present disclosure. As shown in FIG. 5, the method can include the following operations.

At operation S501, reference sample values of a first colour component of a current block are determined.

It should be noted that the decoding method of the embodiment of the present disclosure is applied to a decoding apparatus or a decoding device integrated with the decoding apparatus (which may also be referred to as a "decoder"). Further, the decoding method in the embodiment of the present disclosure may specifically refer to an intra prediction method, and more specifically, refer to a Network-based Weight Chroma Prediction (NWCP) method.

In the embodiment of the present disclosure, a video picture can be partitioned into multiple coding blocks, each coding block may include a first colour component, a second colour component, and a third colour component, and the current block here refers to a coding block currently to be intra predicted in the video picture. In addition, assuming that a prediction of the first colour component is performed for the current block, and the first colour component is a luma component, i.e., the component to be predicted is a luma component, the current block may also be referred to as a luma prediction block. Alternatively, assuming that a prediction of the second colour component is performed for the current block, and the second colour component is a chroma component, i.e., the component to be predicted is a chroma component, the current block may also be referred to as a chroma prediction block.

It should also be noted that, in the embodiment of the present disclosure, reference information of the current block may include values of first colour component samples in a neighbouring region of the current block and values of second colour component samples in a neighbouring region of the current block, and these samples may be determined according to decoded pixels in the neighbouring region of the current block. In some embodiments, the neighbouring region of the current block may include at least one of an upper neighbouring region, an upper-right neighbouring region, a left neighbouring region and a bottom-left neighbouring region.

Here, the upper neighbouring region and the upper-right neighbouring region as a whole can be regarded as an upper region, and the left neighbouring region and the bottom-left neighbouring region as a whole can be regarded as a left region. In addition, the neighbouring region may also include an upper-left region, as shown in FIG. 6 for details. When performing a prediction of the second colour component for the current block, the upper region, the left region, and the upper-left region of the current block may all be referred to as the reference regions of the current block as neighbouring regions, and the pixels in the reference region are all decoded reference pixels.

It should also be noted that, in the embodiment of the present disclosure, the neighbouring region of the current block may include multiple rows or columns neighbouring to the current block. For example, the left region may include one or more columns, and the upper region may include one or more rows, and even the number of rows or columns increases or decreases, which is not limited in the embodiments of the present disclosure.

In some embodiments, the method may further include that: neighbouring reference values of the first colour component of the current block are determined according to first colour component samples in a neighbouring region of the current block.

It should be noted that, in the embodiment of the present disclosure, the reference pixels of the current block may specifically refer to reference pixel points that are neighbouring the current block. Here, the "neighbouring" may be "spatially neighbouring", but is not limited thereto. For example, the "neighbouring" may be "temporally neighbouring", "spatially and temporally neighbouring", and even the reference pixel of the current block may be a reference pixel obtained by performing some processing on the spatially neighbouring reference pixel point, the temporally neighbouring reference pixel point, the spatially and temporally neighbouring reference pixel point, and the like, which is not limited in the embodiments of the present disclosure.

It should also be noted that, in the embodiment of the present disclosure, both the first colour component samples and the second colour component samples in the neighbouring region of the current block may be referred to as reference pixels of the current block. Assuming that the first colour component is a luma component and the second colour component is a chroma component, a value of the first colour component sample in the neighbouring region of the current block is reference luma information corresponding to the reference pixel of the current block, and a value of the second colour component sample in the neighbouring region of the current block is reference chroma information corresponding to the reference pixel of the current block.

It should also be noted that, in the embodiment of the present disclosure, the neighbouring region of the current block may include: only the upper neighbouring region; only the left neighbouring region; both the upper neighbouring region and the upper-right neighbouring region; both the left neighbouring region and the bottom-left neighbouring region; both the upper neighbouring region and the left neighbouring region; or even the upper neighbouring region, the upper-right neighbouring region and the left neighbouring region, and the like, which is not limited in the embodiments of the present disclosure.

It should also be noted that, in the embodiment of the present disclosure, the neighbouring region may be determined according to the prediction mode of the current block. In a specific embodiment, it may include the following alternatives.

When the prediction mode of the current block is the horizontal mode, reference pixels are determined according to pixels in the upper neighbouring region and/or the upper-right neighbouring region.

When the prediction mode of the current block is the vertical mode, reference pixels are determined according to pixels in the left neighbouring region and/or the bottom-left neighbouring region.

For example, when the prediction mode of the current block is the horizontal mode, only the upper neighbouring region and/or the upper-right neighbouring region may be selected for the neighbouring region in the prediction of the chroma component. When the prediction mode of the current block is the vertical mode, only the left neighbouring region and/or the bottom-left neighbouring region may be selected for the neighbouring region in the prediction of the chroma component.

Further, in some embodiments, for a determination of the neighbouring reference values of the first colour component, the method may further include that: the neighbouring reference values of the first colour component of the current block are determined by performing a screening process on values of the first colour component samples in the neighbouring region.

It should be noted that, among the first colour component samples in the neighbouring region, there may be some unimportant samples (for example, the correlation between these samples is poor) or some abnormal samples, and in order to ensure the accuracy of the prediction, these samples need to be eliminated to obtain available values of the first colour component samples. That is to say, in the embodiment of the present disclosure, a first sample set is composed according to the first colour component samples in the neighbouring region of the current block. The screening process may be performed on the first sample set, so as to determine the neighbouring reference values of the first colour component of the current block.

In a specific embodiment, the operation of determining the neighbouring reference values of the first colour component of the current block by performing the screening process on the values of the first colour component samples in the neighbouring region may include the following operations.

Positions of samples to be selected are determined based on positions and/or colour component intensities of the first colour component samples in the neighbouring region.

The neighbouring reference values of the first colour component of the current block are determined from the neighbouring region according to the positions of the samples to be selected.

It should be noted that, in the embodiment of the present disclosure, the colour component intensity may be represented by colour component information, such as reference luma information, reference chroma information, and the like. Here, the larger the value of the colour component information indicates that the colour component intensity is higher. In this way, the values of the first colour component samples in the neighbouring region may be screened according to the positions of the samples or the intensities of the colour component, so that the available values of the first colour component samples are determined according to the samples obtained by the screening, and thus the neighbouring reference values of the first colour component of the current block are further determined.

In some embodiments, for the neighbouring reference values of the first colour component, the method may further include that: the neighbouring reference values of the first colour component of the current block are determined by performing a first filtering process on values of the first colour component samples in the neighbouring region.

It should be noted that, in the embodiment of the present disclosure, the first filtering process may be a down-sampling filtering process. The first colour component is the luma component, and at this time, the down-sampling filtering processing may be performed on the reference luma information to enable that the spatial resolution of the filtered reference luma information is the same as the spatial resolution of the reference chroma information. Alternatively, the first filtering process may be an up-sampling filtering process, so as to keep the reference luma information not lost, which is not limited here.

It should also be noted that, in the embodiment of the present disclosure, the reference information of the current block may further include reconstructed values of the first colour component samples in the current block. At this time, in some embodiments, the method may further include that: a reference value of the first colour component of the current block is determined according to the reconstructed values of the first colour component samples in the current block.

In the embodiment of the present disclosure, assuming that the first colour component is a luma component, the reconstructed values of the samples of the first colour component in the current block are reconstructed luma information of the current block.

In some embodiments, for the reference value of the first colour component in the current block, the method may further include that: the reference value of the first colour component in the current block is determined by performing a second filtering process on the reconstructed values of the first colour component samples in the current block.

It should be noted that, in the embodiment of the present disclosure, the second filtering process may be a downsampling filtering process. Here, the first colour component is a luma component, and at this time, the down-sampling filtering processing may be performed on the reconstructed luma information in the current block. Alternatively, the second filtering process may be an up-sampling filtering process, so as to keep the reconstructed luma information not lost, which is not limited here.

In some embodiments, for operation S501, the determination of the reference sample values of the first colour component of the current block may include the following operations:

neighbouring reference values of the first colour component of the current block are determined according to first colour component samples in a neighbouring region of the current block; and the reference sample values of the first colour component of the current block are determined according to reconstructed values of the first colour component samples in the current block and the neighbouring reference values of the first colour component of the current block.

In a specific embodiment, the operation of determining the reference sample values of the first colour component of the current block according to the reconstructed values of the first colour component samples in the current block and the neighbouring reference values of the first colour component of the current block may include the following operations:

a reference value of the first colour component of the current block is determined according to the reconstructed values of the first colour component samples in the current block; and the reference sample values of the first colour component of the current block are determined according to the reference value of the first colour component in the current block and the neighbouring reference values of the first colour component of the current block.

It should be noted that, in the embodiment of the present disclosure, the reference sample values of the first colour component of the current block may be luma difference information. Here, the reference sample value of the first colour component of the current block may be an absolute value of a difference between a neighbouring reference value of the first colour component of the current block and a reference value of the first colour component in the current block.

It should also be noted that, in the embodiment of the present disclosure, for the calculation of the luma difference information, it may be an absolute value of the difference between the reference luma information and the reconstructed luma information, an absolute value of the difference between the reference luma information after filtering and the reconstructed luma information, an absolute value of the difference between the reference luma information and the reconstructed luma information after filtering, or even an absolute value of the difference between the reference luma information after filtering and the reconstructed luma information after filtering. Therefore, in the embodiment of the present disclosure, in addition to the reference sample value of the first colour component of the current block being an absolute value of the difference between the neighbouring reference value of the first colour component of the current block and the reference value of the first colour component in the current block, the reference sample value of the first colour component of the current block may also be an absolute value of the difference between the reconstructed value of the first colour component sample in the current block and the neighbouring reference value of the first colour component of the current block. Alternatively, the reference sample value of the first colour component of the current block may also be an absolute value of a difference between a reconstructed value of the first colour component sample in the current block and a value of the first colour component sample in the neighbouring region of the current block. Alternatively, the reference sample value of the first colour component of the current block may be an absolute value of the difference between the reference value of the first colour component in the current block and the value of the first colour component sample in the neighbouring region of the current block, and the like, which is not limited herein.

It should be also understood that, in the embodiment of the present disclosure, for the second colour component samples in the neighbouring region, in some embodiments, the method may further include that: the reference sample values of the second colour component of the current block are determined by performing a third filtering process on values of the second colour component samples in the neighbouring region.

It should be noted that, in the embodiment of the present disclosure, the third filtering process may be an up-sampling filtering process. Alternatively, the third filtering process may be a down-sampling filtering process, which is not limited herein. Herein, the second colour component is a chroma component, and at this time, the up-sampling filtering processing or down-sampling filtering processing may be performed on the reference chroma information, finally resulting in the spatial resolution of the filtered reference chroma information being the same as the spatial resolution of the reference luma information.

That is to say, the reference chroma information and the reference luma information of the current block may be acquired from the neighbouring region. The acquired reference chroma information includes, but is not limited to, selecting a reconstructed reference chroma value of the upper region of the current block and/or a reconstructed reference chroma value of the left region of the current block. The acquired reference luma information includes, but is not limited to, acquiring corresponding reference luma information according to the position of the reference chroma information. The operation of acquiring the reconstructed luma information in the current block includes, but is not limited to, acquiring corresponding reconstructed luma information as the reconstructed luma information of the current block according to the position of the chroma information position in the current block.

It should also be understood that in the embodiment of the present disclosure, the reference chroma information, the reference luma information, or the reconstructed luma information may be subjected to a relevant filtering process under certain conditions, and the processed information may be used as the target information of the current block. In addition, the relevant filtering operation herein may be implemented in a manner based on a neural network structure. For example, in order to reduce the computational complexity, a point selection operation or a down-sampling filtering operation based on the neural network structure may be performed on the reference chroma information, the reference luma information, or the reconstructed luma information. For example, under the condition that the spatial resolutions of the chroma component and the luma component are inconsistent, the operation of up-sampling filtering/down-sampling filtering based on the neural network structure may also be performed on the reference chroma information, the reference luma information or the reconstructed luma information, to facilitate the calculations of subsequent chroma prediction.

In this way, the target information of the current block may include: the neighbouring reference values of the first colour component of the current block (i.e., reference luma information), the reference value of the first colour component in the current block (i.e., reconstructed luma information), and the reference sample values of the second colour component of the current block (i.e., reference chroma information). These information may be information after filtering or information without filtering, which is not limited in the embodiments of the present disclosure.

It should also be understood that in the embodiment of the present disclosure, the luma difference information is constituted by multiple luma difference matrices. Thus, in some embodiments, the reference sample values of the first colour component of the current block may include N matrices, where N represents the number of the reference sample values of the second colour component of the current block, a k-th matrix includes an absolute value of a difference between a k-th value among the neighbouring reference values of the first colour component of the current block and the reference value of the first colour component in the current block, k=0, 1, . . . , N−1.

Exemplarily, it is described in pseudo code as follows:

```
for (k = 0; k < = numRefChroma-1; k + +)
{
    for (y = 0; y < = hLuma-1; y + +)
for (x = 0; x < = wLuma-1; x + +)
    deltaLuma[k][y][x] = abs (recLuma[y][x]-refLuma[k]);
}
```

Where numRefChroma represents the number of reference sample values of the second colour component of the current block, wLuma×hLuma represents the number of reference values of the first colour component in the current block, wLuma is the width, hLuma is the height, deltaLuma [k][y][x] represents the k-th matrix in the reference sample values of the first colour component of the current block, i.e., the absolute value of the difference between the k-th value among the neighbouring reference values of the first colour component of the current block and the reference value of the first colour component in the current block.

At operation S502, according to the reference sample values of the first colour component of the current block, weighting coefficients are determined through a neural network model, herein, an input of the neural network model includes the reference sample values of the first colour component of the current block.

It should be noted that, in the embodiment of the present disclosure, after the reference sample values of the first colour component of the current block are determined, the reference sample values of the first colour component of the current block may be used as an input of the neural network model, and the output of the neural network model may be the weighting coefficients.

In a possible implementation, in a case that the reference sample values of the first colour component of the current block includes N matrices, for operation S502, the operation of determining the weighting coefficients through the neural network model according to the reference sample values of the first colour component of the current block may include that: an output of the neural network model is determined as the weighting coefficients by taking the N matrices as the input of the neural network model.

It should also be noted that, in the embodiment of the present disclosure, the N matrices, as a whole, are used as the input of the neural network model, and the output of the neural network model is the weighting coefficient.

Exemplarily, it is described in pseudo code as follows:

mWeight=NNFunction(deltaLuma)

Herein, deltaLuma represents a three-dimensional array or a three-dimensional matrix, which is used as the input of the neural network model as a whole, and mWeight represents the weighting coefficients. It should be noted that if deltaLuma is a three-dimensional data structure, the output mWeight is also a three-dimensional data structure.

In another possible implementation, an non-linearly process may also be performed on the luma difference information (e.g., N matrices), and then the processed result may be used as reference sample values of the first colour component of the current block. In some embodiments, the method may further include the following operations.

Values corresponding to the N matrices under a preset mapping relationship are determined.

The reference sample values of the first colour component of the current block are determined according to the values corresponding to the N matrices.

It should also be noted that, the preset mapping relationship may be a preset function relationship. In a specific embodiment, the preset mapping relationship is a Softmax function.

It should be understood that in probability theory and related fields, a normalized exponential function, or Softmax function, is a generalization of a logical function. This function can "compress" an N-dimensional vector z containing any real number into another N-dimensional vector $\sigma(z)$, such that the range of each element is between (0, 1), and the sum of all elements is 1. This function is often used as the nonlinear activation function of a multi-class neural network. Exemplarily, the k-th matrix is denoted by delta-Luma[k][y][x], and the Softmax function is shown below.

$$f(deltaLuma[k][y][x]) = \frac{e^{deltaLuma[k][y][x]}}{\sum_j e^{deltaLuma[j][y][x]}} \quad (1)$$

In another specific embodiment, the preset mapping relationship is a weighting function having an inverse relationship with the i-th matrix. Exemplarily, the k-th matrix is still denoted by deltaLuma[k][y][x], and the Softmax function of Equation (1) can also be replaced as follows:

$$f(deltaLuma[k][y][x]) = \frac{\dfrac{1}{deltaLuma[k][y][x] + \text{offset}}}{\sum_{j=1}^{N}\left(\dfrac{1}{deltaLuma[j][y][x] + \text{offset}}\right)} \quad (2)$$

$$fdeltaLuma[k][y][x]) = \frac{\dfrac{1}{deltaLuma[k][y][x]_{+offset}}}{\sum_{j=1}^{N}\left(\dfrac{1}{deltaLuma[j][y][x]_{+offset}}\right)} \quad (3)$$

Where k=0, 1, . . . N−1, offset=1, 2, 0.5 or 0.25.

Accordingly, in some embodiments, for operation S502, the operation of determining the weighting coefficients through the neural network model according to the reference sample values of the first colour component of the current block may include that: an output of the neural network model is determined as the weighting coefficients by taking the values corresponding to the N matrices under the preset mapping relationship as the input of the neural network model.

It should be noted that after the values corresponding to the N matrices under the preset mapping relationship are determined, the values corresponding to the N matrices, as a whole, are also used as the input of the neural network model, and the output of the neural network model is the weighting coefficients.

It should also be noted that, in the embodiment of the present disclosure, the preset mapping relationship may be a preset function relationship such as a Softmax function, or may be a preset look-up table manner, for example, an array element look-up table manner is adopted to reduce a part of calculation operations, and the like, which is not limited in the embodiment of the present disclosure.

It should also be noted that in the embodiment of the present disclosure, the reference sample values of the first colour component of the current block are a three-dimensional data structure. Specifically, after the absolute value of the difference between the neighbouring reference value of the first colour component of the current block and the reference value of the first colour component in the current block is calculated, the absolute value of the difference value may be stored in N matrices of the three-dimensional data structure. Alternatively, each element of the neighbouring reference values of the first colour component of the current block may be duplicated multiple times to obtain the neighbouring reference values of the first colour component of the three-dimensional data structure. The reference values of the first colour component in the current block, as a whole, may be duplicated multiple times to obtain the reference value of the first colour component of the three-dimensional data structure. Then, the absolute value of the difference value is calculated according to the neighbouring reference value of the first colour component of the three-dimensional data structure and the reference value of the first colour component of the three-dimensional data structure, and N matrices of the three-dimensional data structure can also be obtained, which is no limited herein.

It should be understood that in the embodiment of the present disclosure, the input of the neural network model may be other forms of information in addition to the luma difference information or the information obtained by performing an nonlinear process on the luma difference information, for example, the reference value of the first colour component in the current block and the neighbouring reference values of the first colour component of the current block are directly taken as the input of the neural network model, information obtained by performing concatenating process on the reference value of the first colour component in the current block and the neighbouring reference values of the first colour component of the current block is used as the input of the neural network model, or information obtained by combining the reference value of the first colour component in the current block and the neighbouring reference values of the first colour component of the current block with the reference sample values of the second colour component of the current block is used as the input of the neural network model, etc. These cases will be described below.

In a possible implementation, for operation S502, the operation of determining the weighting coefficients through the neural network model according to the reference sample values of the first colour component of the current block may include the following operation.

An output of the neural network model is determined as the weighting coefficients by taking the reference value of the first colour component in the current block and the neighbouring reference values of the first colour component of the current block as the input of the neural network model.

It should be noted that in this case, it is not necessary to perform a related process on the reference value of the first colour component in the current block and the neighbouring reference values of the first colour component of the current block, the reference value of the first colour component in the current block and the neighbouring reference values of the first colour component of the current block may be directly used as the input of the neural network model.

In another possible implementation, for operation S502, the operation of determining the weighting coefficients through the neural network model according to the reference sample values of the first colour component of the current block may include the following operations.

First concatenated information is obtained by performing a concatenating process on the reference value of the first colour component in the current block and the neighbouring reference values of the first colour component of the current block.

An output of the neural network model is determined as the weighting coefficients by taking the first concatenated information as the input of the neural network model.

It should be noted that in this case, the reference value of the first colour component in the current block and the neighbouring reference values of the first colour component of the current block may be concatenated in the first dimension, but it is not necessary to calculate the absolute value of the difference value between the reference value of the first colour component in the current block and the neighbouring reference values of the first colour component of the current block, and thus, the obtained first concatenated information may be used as an input of the neural network model. The first concatenated information is processed by the neural network model, and finally the output of the neural network model is the weighting coefficients.

In yet another possible implementation, for operation S502, the method may further include the following operations.

An output of the neural network model is determined as the weighting coefficients by taking the reference sample values of the first colour component of the current block and the reference sample values of the second colour component of the current block as the input of the neural network model.

In a specific embodiment, the method may include that: the output of the neural network model is determined as the weighting coefficients by taking the reference value of the first colour component in the current block, the neighbouring reference values of the first colour component of the current block and the reference sample values of the second colour component of the current block as the input of the neural network model.

It should be noted that in this case, all of the target information (including the reference luma information in the neighbouring region, the reference chroma information in the neighbouring region, and the reconstructed luma information in the current block) of the current block may be used as the input of the neural network model, and then these information may be processed by the neural network model, and finally the output of the neural network model is weighting coefficients.

In another specific embodiment, the method may include that: second concatenated information is obtained by performing a concatenating process on the reference value of the first colour component in the current block and the neighbouring reference values of the first colour component of the current block. The output of the neural network model is determined as the weighting coefficients by taking the second concatenated information and the reference sample values of the second colour component of the current block as the input of the neural network model.

It should be noted that in this case, the reference value of the first colour component in the current block and the neighbouring reference values of the first colour component of the current block may be concatenated in the first dimension, but it is not necessary to calculate the absolute value of the difference value between the two, and then the obtained second concatenated information and the reference sample values of the second colour component of the current block are collectively used as the input of the neural network model, and these information are processed by the neural network model, and finally the output of the neural network model is the weighting coefficients.

It should also be noted that, in the embodiment of the present disclosure, both the first concatenated information and the second concatenated information are obtained by performing concatenating process on the reference value of the first colour component in the current block and the neighbouring reference values of the first colour component of the current block. However, both the two concatenated information may be the same or different. For example, after each element in the neighbouring reference values of the first colour component of the current block is duplicated multiple times to obtain the neighbouring reference values of the first colour component of the three-dimensional data structure, for the first concatenated information, the reference value of the first colour component in the current block may be duplicated multiple times as a whole to obtain the reference value of the first colour component of the three-dimensional data structure. Then the concatenation in the first dimension is performed according to the neighbouring reference values of the first colour component of the three-dimensional data structure and the reference value of the first colour component of the three-dimensional data structure. For the second concatenated information, the reference value of the first colour component in the current block may be added by one dimension along the first dimension to obtain the reference value of the first colour component of the three-dimensional data structure. Then the concatenation in the first dimension is performed according to the neighbouring reference values of the first colour component of the three-dimensional data structure and the reference value of the first colour component of the three-dimensional data structure, but is not specifically limited.

In still another specific embodiment, the method may include that: third concatenated information is obtained by performing a concatenating process on the reference value of the first colour component in the current block, the neighbouring reference values of the first colour component of the current block and the reference sample values of the second colour component of the current block, and the output of the neural network model is determined as the weighting coefficients by taking the third concatenated information as the input of the neural network model.

It should be noted that in this case, the reference value of the first colour component in the current block, the neighbouring reference values of the first colour component of the current block and the reference sample values of the second colour component of the current block may be concatenated in the first dimension, then the obtained third concatenated information may be used as an input of the neural network model, and the third concatenated information may be processed by the neural network model, and finally the output of the neural network model is weighting coefficients.

It should also be noted that, in the embodiment of the present disclosure, since the input of the neural network model is required to be in a three-dimensional data structure, that is, the reference value of the first colour component in the current block, the neighbouring reference values of the first colour component of the current block and the reference sample values of the second colour component of the current block each need to be transformed into a three-dimensional data structure before being used as the input of the neural network model. For example, before being used as the input of the neural network model, the reference value of the first colour component in the current block is duplicated as a whole, the neighbouring reference values of the first colour component of the current block are duplicated element by element, or the reference sample values of the second colour component of the current block are duplicated element by element.

In addition, it should be also illustrated that, for the neural network model, when information with more dimensions is required for the input of the neural network model, the embodiment of the present disclosure may further expand the dimension of the input information. Then, after the expanded information is processed by the neural network model, the output of the neural network model is dimensionally deleted to restore the original dimension, and then the weighting coefficients of the three-dimensional data structure can still be obtained.

As can be understood, for the neural network model, in some embodiments, the neural network model may be a convolutional neural network model.

Here, the convolutional neural network model may include at least one basic unit and a target unit.

The basic unit includes at least a first convolutional layer and a first activation function.

The target unit includes at least a second convolutional layer and a second activation function.

In an embodiment of the present disclosure, the first activation function is a ReLU function, and the second activation function is a softmax function. In a specific embodiment, the convolutional neural network model may be composed of seven basic units and a target unit formed by a final layer. The basic unit may be composed of a convolutional layer having a step size of 1, a same pattern padding and a convolution kernel of 3×3, and a first activation function ReLU; and the target unit may be composed of a convolutional layer having a step size of 1, a same pattern padding and a convolution kernel of 3×3, and a softmax activation function.

It should be noted that, the same pattern padding means that the size of the feature map after convolution remains unchanged, that is, the size of the input picture and the size of the output picture are the same.

It should also be noted that the number of layers of the convolutional neural network model used herein is not limited, the network structure may include but is not limited to a convolutional layer, a pooling layer, an activation function, and the like, the size of the convolution kernel may be 3×3, 5×5 or other sizes, the convolution type may be ordinary convolution, transposed convolution, deformable convolution, and the like. Whether it is the first activation function or the second activation function, it includes, but is not limited to, a ReLU activation function, a softmax activation function, and the like, which is not limited in the embodiment of the present disclosure.

As an example, the convolutional neural network model may also use a convolutional neural network composed of two down-sampling convolution units and two up-sampling convolution units as the neural network model of the embodiment of the present disclosure. The down-sampling convolution unit may be composed of a convolution layer having a step size of 2 and same pattern padding, and a ReLU activation function; and the up-sampling convolution unit may be composed of a transposed convolution layer having a step size of 2 and a ReLU activation function.

For example, the convolutional neural network model may also use a convolutional neural network composed of multiple basic units as the neural network model of the embodiment of the present disclosure. Herein, the basic unit may be composed of a convolution layer with a step size of 1 and the same pattern padding, and a ReLU activation function; and the convolution kernel size may be 3×3, 5×5, or other sizes.

For example, the convolutional neural network model may also use a convolutional neural network composed of multiple basic units and an attention mechanism as the neural network model of the embodiment of the present disclosure. Herein, the basic unit may be composed of a convolution layer with a step size of 1 and the same pattern padding, and a ReLU activation function; and the convolution kernel size may be 3×3, 5×5, or other sizes. The attention mechanism may be composed of a convolutional layer, a ReLU activation function and a Sigmoid activation function, or composed of a convolutional layer, a ReLU activation function and a Softmax activation function.

It should also be understood that, for the neural network model, in some embodiments, the neural network model is a fully connected neural network model.

Here, the fully connected neural network model may include at least one basic unit and a target unit.

The basic unit includes at least a first fully connected layer and a first activation function;

The target unit includes at least a second fully connected layer and a second activation function.

In an embodiment of the present disclosure, the first activation function is a ReLU function, and the second activation function is a softmax function. In a specific embodiment, in the fully connected neural network model, two basic units and a target unit formed by the final layer may be used to constitute the used fully connected network. Herein, the basic unit may be composed of a fully connected layer and a ReLU activation function, and the target unit may be composed of a fully connected layer and a Softmax activation function.

It should also be noted that the number of layers used in the fully connected network model is not limited, and the network structure includes, but is not limited to, a fully connected layer, an activation function, and the like. There is no fixed limit on the number of neurons in the fully connected layer, and the activation function includes, but is not limited to, a ReLU activation function, a softmax activation function, or a Sigmoid activation function, and the like, which is not specifically limited in the embodiments of the present disclosure.

It should also be understood that in the embodiment of the present disclosure, deltaLuma[k][y][x] is used as a three-dimensional matrix data structure, then deltaLuma[k][y][x] can also be regarded as W×H one-dimensional matrices. Thus, in some embodiments, the method may further include the following operation.

The reference sample values of the first colour component of the current block includes W×H one-dimensional matrices, the one-dimensional matrix includes N weighting coefficients, where the W×H represents the number of the second colour component samples of the current block, and N represents the number of the reference sample values of the second colour component of the current block.

It should be noted that in the embodiments of the present disclosure, W×H represents the number of the second colour component samples of the current block. Alternatively, W×H may also be interpreted as the number of second colour component prediction points of the current block, or the number of second colour component prediction points determined through calculation.

It should be noted that in this case, each one-dimensional matrix includes N weighting coefficients, so that the prediction values of the second colour component prediction points corresponding to the one-dimensional matrix in the current block are determined according to the N weighting coefficients. In a one-dimensional matrix, the sum of N weighting coefficients is equal to 1, and each weighting coefficient is a value greater than or equal to 0 and less than or equal to 1. But it should be noted here that "the sum of N weighting coefficients is equal to 1" is only a theoretical concept. In the actual fixed-point implementation process, the absolute value of the weighting coefficient may be greater than 1.

At operation S503, a prediction block of a second colour component of the current block is determined according to the weighting coefficients and reference sample values of the second colour component of the current block.

It should be noted that, after the weighting coefficients is output via the neural network model, the prediction block of the second colour component of the current block may be determined by performing weighting calculation based on the weighting coefficients and the reference sample values of the second colour component of the current block.

In some embodiments, for operation S503, the operation of determining the prediction block of the second colour component of the current block according to the weighting coefficients and the reference sample values of the second colour component of the current block may include the following operations.

A first one-dimensional matrix for calculating the second colour component samples to be predicted is determined according to position indexes of second colour component samples to be predicted in the current block and the weighting coefficients.

The prediction block of the second colour component of the current block is determined according to the first one-dimensional matrix and the reference sample values of the second colour component of the current block.

In the embodiment of the present disclosure, the first one-dimensional matrix represents a one-dimensional matrix corresponding to the position indexes in a three-dimensional matrix data structure of the weighting coefficients.

That is to say, the weighting coefficients are a three-dimensional matrix data structure. When the position index of the second colour component sample to be predicted in the current block is the w-th column and the h-th row, the first one-dimensional matrix is the one-dimensional matrix at the w-th column and the h-th row in the three-dimensional matrix data structure of the weighting coefficients.

In other embodiments, for operation S503, the operation of determining the prediction block of the second colour component of the current block according to the weighting coefficients and the reference sample values of the second colour component of the current block may include the following operation.

The prediction block of the second colour component of the current block is determined according to the position indexes of the second colour component samples to be predicted in the current block and weighting coefficients.

In the embodiment of the present disclosure, the prediction value of the second colour component sample to be predicted in the prediction block may be set to be equal to a sum of weighted values the reference sample values of the second colour component of the current block and the coefficients in the second one-dimensional matrix. The second one-dimensional matrix represents the one-dimensional matrix corresponding to the position index in the three-dimensional matrix data structure of the weighting coefficients.

That is to say, still taking the position index of the second colour component sample to be predicted in the current block being the w-th column and h-th row as an example. For the second colour component sample to be predicted, its corresponding one-dimensional matrix at the w-th column and h-th row in the three-dimensional matrix data structure of weighting coefficients includes N weighting coefficients. Then the weighted value of the reference sample value of the second colour component of the current block and the corresponding coefficient among the N weighting coefficients is determined, and the prediction value of the second colour component sample to be predicted may be set to be equal to the sum of the N weighted values, where N represents the number of reference sample values of the second colour component, and N is a positive integer.

In the embodiment of the present disclosure, the second colour component is a chroma component, and then the second colour component sample is a chroma sample. Exemplarily, it is described in pseudo code as follows:

```
for (y = 0; y < = hChroma-1; y + +)
  for (x = 0; x < = wChroma-1; x + +)
  {
  //Determine the weighting coefficient used for (x, y) chroma sample
  for (k = 0; k < = numRefChroma-1; k + +)
    mWeightSample [k] = mWeight[k][y][x];
  //Calculate the prediction value of (x, y) chroma sample
  for (k = 0; k < = numRefChroma-1; k + +)
    predChroma[y][x] + = mWeightSample[k] × refChroma[k];
  }
```

The prediction process described above may also be equivalent to the following:

```
for (y = 0; y < = hChroma-1; y + +)
  for (x = 0; x < = wChroma-1; x + +)
  {
  for (k = 0; k < = numRefChroma-1; k + +)
    predChroma[y][x] + = mWeight[k][y][x] × refChroma[k];
  }
```

Where numRefChroma represents the number of reference sample values of the second colour component of the current block, wLuma×hLuma represents the number of reference values of the first colour component in the current block, wLuma is the width, hLuma is the height, predChroma[y][x] represents the prediction value of the chroma sample at (x, y). Here, mWeight[k][y][x] represents the k-th weighting coefficient corresponding to the chroma sample at (x, y), refChroma [k] represents the reference sample value of the k-th second colour component, there are num-RefChroma weighting values of mWeight[k][y][x]× refChroma[k] in total, and the sum of these weighting values is the prediction value of the chroma sample at (x, y).

It should also be noted that, in the embodiment of the present disclosure, for the weighting coefficients output by the neural network model, a non-linear process is performed on the weighting coefficients, and the weighting calculation may be performed on the processed coefficients and the reference sample values of the second colour component of the current block. In some embodiments, the method may further include the following operations.

Values corresponding to the weighting coefficients under a preset mapping relationship are determined after determining the weighting coefficients through the neural network model.

The weighting coefficients are updated based on the values corresponding to the weighting coefficients under the preset mapping relationship.

Here, the weighting coefficients output by the neural network model may be processed non-linearly in one dimension or multiple dimensions. Exemplarily, the preset mapping relationship for the non-linear process is as follows:

$$f(mWeight[k][y][x]) = \frac{\frac{1}{mWeight[k][y][x] + \text{offset}}}{\sum_{j=1}^{N}\left(\frac{1}{mWeight[j][y][x] + \text{offset}}\right)} \quad (4)$$

Where k=0, 1, . . . N−1, offset=1, 2, 0.5 or 0.25, N is the number of reference sample values of the second colour component of the current block. Then the weighting coefficients are updated by using f(mWeight[k][y][x]), and the weighting calculation is performed by using the updated weighting coefficients and the reference sample values of the second colour component of the current block, so that the prediction block of the second colour component of the current block can be determined.

It should also be noted that, in the embodiment of the present disclosure, for a weighting coefficient output by the neural network model, a fixed-point process may be performed on the weighting coefficient when the weighting coefficient is a floating-point weighting coefficient. Alternatively, when the prediction value calculated for the second colour component sample to be predicted is a floating-point number, a fixed-point process may be performed on the prediction value.

In addition, the output of the neural network model may be a weighting coefficients involved in the calculation of the chroma prediction value, or may directly be a prediction block of the chroma component of the current block. Thus, in some embodiments, the method may further include the following operations.

According to the reference sample values of the first colour component of the current block and the reference sample values of the second colour component of the current block, the prediction block of the second colour component of the current block is determined through the neural network model.

The reconstructed values of the second colour component samples of the current block are determined according to the prediction block.

In an embodiment of the present disclosure, the method may include that: an output of the neural network model is determined as the prediction block by taking the reference sample values of the first colour component of the current block and the reference sample values of the second colour component of the current block as the input of the neural network model.

It should be noted that, for the input of the neural network model, the reference value of the first colour component in the current block, the neighbouring reference values of the first colour component of the current block and the reference sample values of the second colour component of the current block may be used as the input of the neural network model. Alternatively, the reference value of the first colour component in the current block, the neighbouring reference values of the first colour component of the current block and the reference sample values of the second colour component of the current block may be concatenated, and the concatenated information may be used as the input of the neural network model. Alternatively, the reference value of the first colour component in the current block and the neighbouring reference values of the first colour component of the current block may be concatenated, and the concatenated information and the reference sample values of the second colour component of the current block may be used as the input of the neural network model. Alternatively, after the absolute value of the difference between the reference value of the first colour component in the current block and the neighbouring reference values of the first colour component of the current block is calculated, the absolute value of the difference value and the reference sample values of the second colour component of the current block may be used as the input of the neural network model, etc. At this time, the output of the neural network model may be directly the prediction block of the second colour component of the current block.

At operation S504, reconstructed values of second colour component samples of the current block are determined according to the prediction block.

It should be noted that, in the embodiment of the present disclosure, the prediction block may include prediction values of at least part of second colour component samples in the current block. When the prediction block includes the prediction values of all the second colour component samples in the current block, no processing is required for the prediction block at this time, and the prediction block can be directly regarded as the final prediction block. When the prediction block includes the prediction values of part of second colour component samples in the current block, an up-sampling filtering is required to be performed on the prediction block to obtain the final prediction block. When the number of prediction values of the second colour component included in the prediction block is the same as the number of the second colour component samples included in the current block, but the prediction values of the second colour component samples of the current block are not included, at this time, a filtering process is required to enhance the prediction values, to obtain the final prediction block. Accordingly, in some embodiments, the method may further include that: after determining the prediction block of the second colour component of the current block, a related process is performed on the prediction block, and the processed prediction block is determined as the prediction block.

In a specific embodiment, the prediction values of the second colour component samples in the prediction block usually needs to be limited within a preset range.

Accordingly, in some embodiments, the operation of performing the process on the prediction block may include that: a refining operation is performed on the prediction values of the second colour component samples in the prediction block, to determine the prediction block of the second colour component of the current block.

It should be noted that in the embodiment of the present disclosure, the preset range may be between 0 and (1<<Bit-Depth)−1, where BitDepth is the bit depth required by the chroma component. When a prediction value in the prediction block (predWcp) exceeds the value of the preset range, it is necessary to perform a corresponding refining operation on the prediction value. Exemplarily, a clamping operation may be performed on predWcp[i][j], specifically as follows:

when the value of predWcp[i][j] is less than 0, the value of predWcp[i][j] is set to 0;

when the value of predWcp[i][j] is greater than or equal to 0 and less than or equal to (1<<BitDepth)−1, the value of predWcp[i][j] is equal to predWcp[i][j];

when the value of predWcp[i][j] is greater than (1<<Bit-Depth)−1, the value of predWcp[i][j] is set to (1<<Bit-Depth)−1.

In this way, after the refining processing is performed on the prediction values, it can be ensured that the prediction values of all the second colour component samples in the prediction block are between 0 and (1<<BitDepth)−1.

In another specific embodiment, a post-processing operation may also be performed on the prediction block. Accordingly, in some embodiments, the operation of performing the related process on the prediction block may further include at least one of the following sub-operations.

A filtering enhancement process is performed on prediction values of the second colour component samples in the prediction block.

A refining process is performed on the prediction values of the second colour component samples in the prediction block by using a preset compensation value.

A weighted fusion process is performed on the prediction values of the second colour component samples in the prediction block by using prediction values of the second colour component of the current block in at least one prediction mode.

It should be noted that, in the NWCP mode, in order to reduce the instability caused by the pixel-by-pixel independent and parallel prediction, the filtering enhancement process may be performed on the prediction values of the second colour component samples in the prediction block. For example, a smoothing filtering process may be performed on the prediction block, and then the processed prediction block is taken as the final prediction block.

It should also be noted that, in order to further improve the prediction accuracy in the NWCP mode, a position-related refining process may be performed on the prediction block by using a preset compensation value. For example, a chroma compensation value is calculated for each second colour component sample to be predicted by using spatially close reference pixels, the second colour component sample in a prediction block is refined by using the chroma compensation value, and a final prediction value of the second colour component sample is determined according to the refined prediction value, thereby obtaining the final prediction block.

It should also be noted that, in order to further improve the prediction accuracy in the NWCP mode, a weighted fusion may be performed on the chroma prediction value calculated in other prediction modes and the chroma prediction value calculated in the NWCP mode, and the final prediction block is determined based on the fusion result. Exemplarily, as shown in FIG. 6B, other prediction modes may include: a Planar mode, a Direct Current (DC) mode, a vertical mode, a horizontal mode and a CCLM mode, and the like, and each prediction mode is associated with a switch for controlling whether the chroma prediction values in such prediction mode participate in the weighted fusion process. It is assumed that the weight value corresponding to the Planar mode is W_Planar, the weight value corresponding to the DC mode is W_DC, the weight value corresponding to the vertical mode is W_Ver, the weight value corresponding to the horizontal mode is W_Hor, the weight value corresponding to the CCLM mode is W_CCLM, and the weight value corresponding to the NWCP mode is W_Wcp. For the chroma prediction value in the Planar mode, the chroma prediction value in the DC mode, the chroma prediction value in the vertical mode, the chroma prediction value in the horizontal mode and the chroma prediction value in the CCLM mode, if only the switch associated with the CCLM mode is closed, a weighted fusion can be performed on the chroma prediction value in the CCLM mode and the chroma prediction value in the NWCP mode according to the W_CCLM and W_Wcp, and the values of the W_CCLM and W_Wcp determine whether the weighted fusion is equal-weighted or unequal-weighted, and the weighted result is the final chroma prediction value of the second colour component sample, thereby obtaining the final prediction block.

In some embodiments, after the prediction block is determined, the operation of determining the reconstructed values of the second colour component samples of the current block according to the prediction block may include the following operations.

Prediction difference values of the second colour component samples of the current block are determined.

Prediction values of the second colour component samples of the current block are determined according to the prediction block.

The reconstructed values of the second colour component samples of the current block are determined according to the prediction difference values of the second colour component samples of the current block and the prediction values of the second colour component samples of the current block.

It should be noted that, in the embodiment of the present disclosure, the operation of determining the prediction difference values (i.e., residual) of the second colour component samples of the current block may be that the prediction difference values of the second colour component samples of the current block are determined by parsing a bitstream.

It should also be noted that in the embodiment of the present disclosure, the prediction block may include prediction values of at least part of the second colour component samples in the current block. When the prediction block contains the prediction values of all the second colour component samples in the current block, the prediction values of the second colour component samples of the current block may be set to be equal to the values of the prediction block. When the prediction block contains prediction values of part of the second colour component samples in the current block, the values of the prediction block may be up-sampling filtered, and the prediction values of the second colour component samples of the current block may be set to be equal to the values outputted after up-sampling filtering.

That is to say, in the embodiment of the present disclosure, when determining the prediction values of the second colour component samples of the current block according to the prediction block, the prediction values of the second colour component samples of the current block may be set to be equal to the values of the prediction block. Alternatively, the values of the prediction block may be filtered, and then the prediction values of the second colour component samples of the current block may be set to be equal to the values outputted after filtering.

In this way, taking the chroma component as an example, the chroma prediction difference values of the current block are determined by parsing the bitstream; the chroma prediction values of the current block may be determined according to the prediction block; and the add operation is performed on the chroma prediction values and the chroma prediction difference values to obtain the reconstructed chroma values of the current block.

It should be understood that the embodiment of the present disclosure is a NWCP technology, which mainly includes: (1) existing information of the current block is sufficiently obtained, including reconstructed luma information of the neighbouring region, reconstructed chroma information of the neighbouring region and reconstructed luma information of the current block; (2) multiple types of available input information are provided for the network-based weight chroma prediction, i.e., the reconstructed luma information difference between the current block and the reference pixels or the result after performing a process on the reconstructed luma information difference, and thus the chroma prediction can be better performed.

Figure 7:
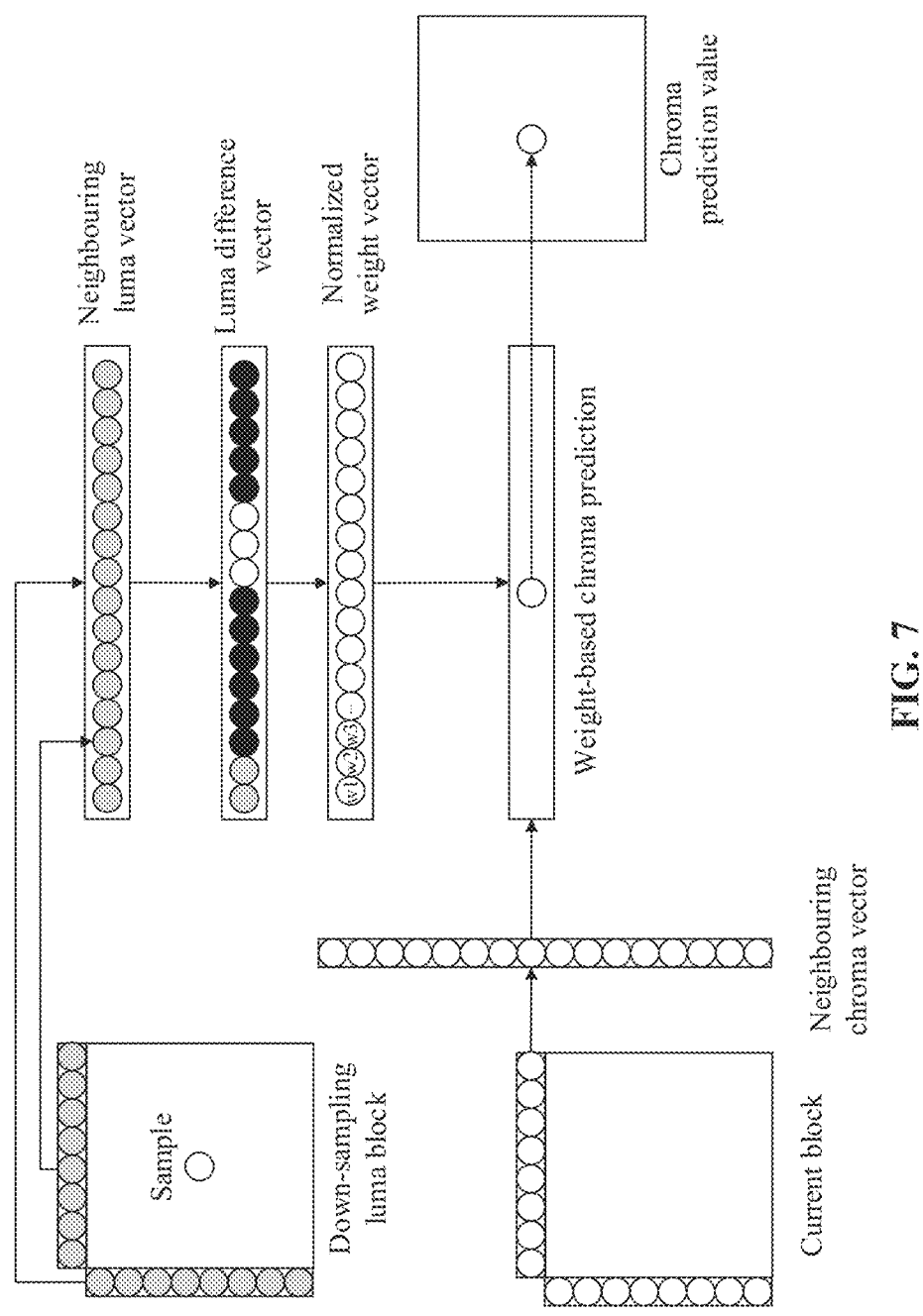
FIG. 7 is a framework schematic diagram of a weight-based chroma prediction according to an embodiment of the present disclosure.

It should also be understood that the embodiment of the present disclosure further provides a framework for the weight-based chroma prediction, as shown in FIG. 7, for each sample recY[i][j] in reconstructed luma information after downsampling (i.e., a downsampled luma block) in the current block, a luma difference vector diffY[i][j] is firstly obtained according to an absolute value of a difference value between recY[i][j] and an neighbouring luma vector refY [k]. Secondly, according to the nonlinear mapping model related to diffY[i][j], the normalized weight vector mWeight [i][j] is derived. Thirdly, by using the weight vector, a vector multiplication is performed between the weight vector and the neighbouring chroma vector of the current block, to obtain the predicted chroma prediction value predWcp[i][j]. It should be noted that the normalized weight vector mWeight[i][j] here can be obtained based on the neural network model.

An embodiment of the present disclosure provides a decoding method, which includes that: reference sample values of a first colour component of a current block are determined; according to the reference sample values of the first colour component of the current block, weighting coefficients are determined through a neural network model, herein, an input of the neural network model includes the reference sample values of the first colour component of the current block; a prediction block of a second colour component of the current block is determined according to the weighting coefficients and reference sample values of the second colour component of the current block; and reconstructed values of second colour component samples of the current block are determined according to the prediction block. In this way, by making full use of the colour component information in the neighbouring region of the current block and the colour component information in the current block, multiple types of available input information can be provided for the network-based weight chroma prediction, and thus the chroma prediction can be better performed. In addition, by taking the luma difference between the reference pixel and the current block or a result after performing a correlation process on the luma difference as one of the inputs of the neural network, and by learning a correlation between the reference chroma and the chroma to be predicted of the current block through the neural network, and using the correlation for the chroma prediction of the current block, the accuracy of the chroma prediction can be further improved, the bit rate can be saved, and the encoding and decoding performance can be improved at the same time.

In another embodiment of the present disclosure, based on the decoding method described in the foregoing embodiment, taking chroma prediction of the current block as an example, the reconstructed luma information of the current block, the reference luma information of the neighbouring region, and the reference chroma information of the neighbouring region are all decoded reference information. Therefore, the embodiment of the present disclosure proposes the network-based weight chroma prediction technique by using the above-described information.

Here, the detailed operations of the chroma prediction process in the WCP mode are as follows.

Input in the WCP mode: the position of the current block (xTbCmp, yTbCmp), the width nTbW of the current block, and the height nTbH of the current block.

Output in the WCP mode: prediction value predSamples [x][y] of the current block, where the upper-left corner position in the current block is the coordinate origin, x=0, . . . , nTbW−1, y=0, . . . , nTbH−1.

Herein, the prediction process in the WCP mode may include operations such as determining core parameters, obtaining target information, the network-based weight chroma prediction, and post-processing. After these operations, the chroma prediction values of the current block can be obtained.

In a specific embodiment, reference is made to FIG. 8, which illustrates a second schematic flowchart of a decoding method according to an embodiment of the present disclosure. As shown in FIG. 8, the method may include the following operations.

At operation S801, target information is obtained.

Figure 6A:
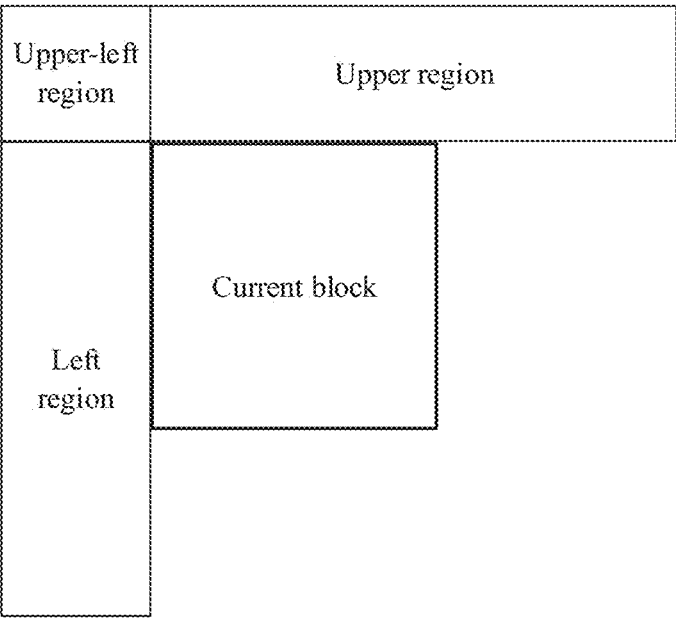
FIG. 6A is a schematic diagram of reference regions of the current block according to an embodiment of the present disclosure.
Figure 6B:
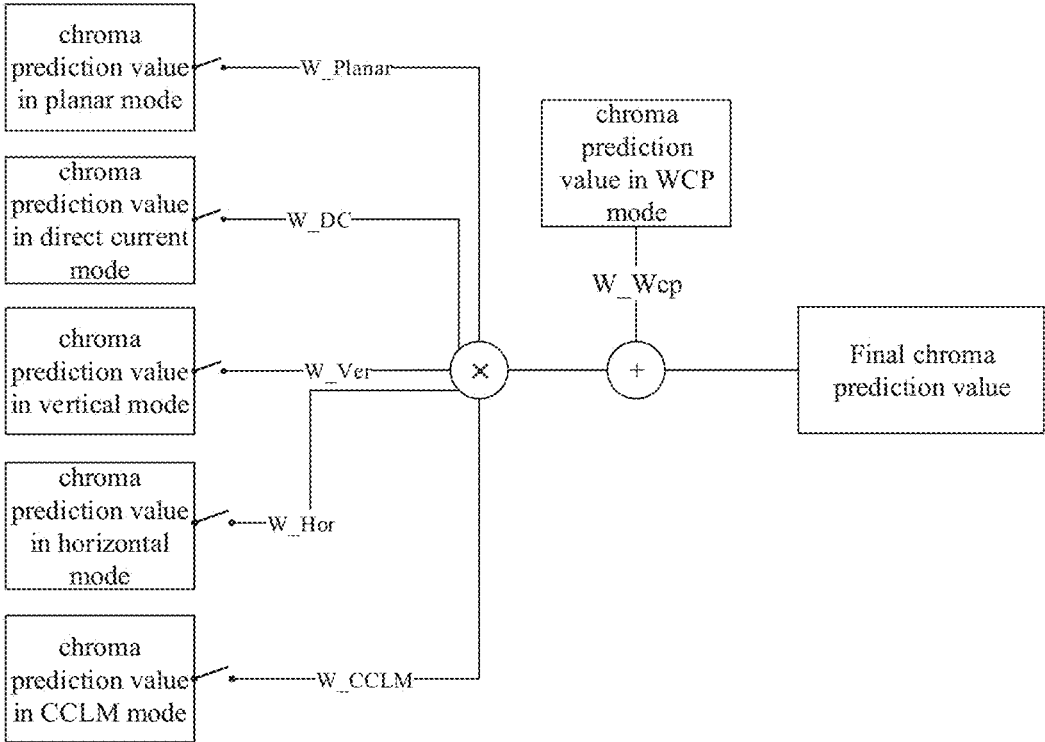
FIG. 6B is a schematic diagram of a weighted prediction of an NWCP mode and other prediction modes according to an embodiment of the present disclosure.

It should be noted that, for operation S801, when predicting the current block, the upper region, the upper-left region, and the left region of the current block are regarded as neighbouring regions (which may also be referred to as "reference regions") of the current block, and as shown in FIG. 6A, the pixels in the neighbouring regions are all decoded reference pixels.

Here, the reference chroma information refC and the reference luma information refY are acquired from the neighbouring regions. The operation of acquiring the reference chroma information includes, but is not limited to, selecting a reconstructed reference chroma value of the upper region of the current block and/or a reconstructed reference chroma value of the left region. The operation of acquiring the reference luma information includes, but is not limited to, acquiring corresponding reference luma information according to positions of the reference chroma information.

The operation of acquiring the luma reconstruction information recY of the current prediction block, may includes, but is not limited to, acquiring corresponding reconstructed luma information as the reconstructed luma information of the current block according to positions of the chroma information in the current block.

It should be noted that, in the embodiment of the present disclosure, refC, refY, or recY may be used as target information input for the network-based weight chroma prediction after a pre-processing operation is performed under certain conditions. Herein, the pre-processing operation for refC, refY or recY can be realized artificially or through a neural network-based manner.

Exemplarily, to reduce the computational complexity of the NWCP prediction, artificial or neural network-based point selection operations or down-sampling filtering operations may be performed on refC, refY or recY. For example, a convolutional neural network composed of multiple basic units may be used to perform down-sampling operation on refC, refY or recY, and the basic unit may be composed of a convolutional layer with a step size of 2 and the same pattern padding, and a ReLU activation function.

Exemplarily, for current blocks with different sizes, different artificial or neural network-based filtering operations may be performed on refC, refY or recY. For example, a convolutional neural network composed of multiple basic units may be used to perform filtering operations on refC, refY or recY, and the basic unit may be composed of a convolutional layer with a step size of 1 and the same pattern padding, and a ReLU activation function.

Exemplarily, under the condition that the spatial resolutions of the video chroma component and the video luma component are inconsistent, artificial or neural network-based up-sampling and down-sampling filtering operations may be performed on refC, refY or recY to facilitate subsequent chroma prediction calculations. Note that: in the NWCP prediction, under the condition that the spatial resolutions of the chroma component and the luma component are inconsistent, the pre-processing filtering operation of up-sampling or down-sampling may not be performed on refC, refY, or recY to align the components.

Exemplarily, under the condition that the spatial resolutions of the video chroma component and the video luma component are consistent, reference pixels of multiple rows/columns may be used, and at this time, artificial or neural network-based up-sampling and down-sampling filtering operations may be performed on refC, refY or recY to facilitate subsequent chroma prediction calculations.

That is to say, the acquired target information may include: acquired reference chroma information refC (after performing the pre-processing operation if the pre-processing operation is required) with the number of outSizes, acquired reference luma information refY (after performing the pre-processing operation if the pre-processing operation is required) with inSize numbers, and acquiring reconstructed luma information recY (after performing the pre-processing operation if the pre-processing operation is required) in the current block with a size of LSizew×LSizeh.

At operation S802, the network-based weight chroma prediction calculation is performed according to the target information, and a prediction block of the current block is determined.

It should be noted that, for operation S802, when predicting the current block, the input of the neural network model is constructed based on the acquired target information firstly, and the vector product calculation is performed on the output of the neural network model and the reference chroma information refC, to determine the chroma prediction value of the pixel to be predicted in the current block.

In a specific embodiment, reference is made to FIG. 9, which illustrates a third schematic flowchart of a decoding method according to an embodiment of the present disclosure. As shown in FIG. 9, the method may include the following operations of S901 to S903.

At operation S901, the input of the neural network model is determined.

It should be noted that in a possible implementation, the input of the neural network model may be that: for each reference luma information value, the luma difference between the each reference luma information value and all pixels in the current block is calculated, and the luma differences are stored into the diffY vector. The specific pseudo code is as follows:

for k=0, 1, . . . , outSize−1
for i=0, 1, . . . , LSizew−1, j=0, 1, . . . , LSizeh−1

$$diffY[k][i][j] = \text{abs}(refY[k] - recY[i][j]) \qquad (5)$$

where $$\text{abs}(x) = \begin{cases} x & ; \ x >= 0 \\ -x & ; \ x < 0 \end{cases},$$

abs (x) represents the absolute value of x.

In another possible implementation, the input of the neural network model may be that: each element in the one-dimensional reference luma information array refY with the number of inSize is duplicated LSizeh*LSizew times, and arranged in the second dimension and the third dimension in the form of LSizew×LSizeh, so that refY' in the form of the inSize×LSizew×LSizeh three-dimensional array can be obtained. The two-dimensional array recY as a whole is duplicated inSize times, recY' in the form of inSize× LSizew×LSizeh three-dimensional array can be obtained.

Thus, a three-dimensional luma difference matrix diffY is obtained by subtracting the corresponding matrix elements of refY' and recY' and then taking the absolute value, the equation is as follows:

for k=0, 1, . . . , outSize−1
for i=0, 1, . . . , LSizew−1, j=0, 1, . . . , LSizeh−1

$$diffY[k][i][j] = \text{abs}(ref'[k][i][j] - recY'[k][i][j]) \qquad (6)$$

In the embodiment of the present disclosure, the three-dimensional luma difference matrix diffY[k][i][j] is the input of the neural network model.

At operation S902, weighting coefficients are determined based on the neural network model, and chroma prediction values of pixels to be predicted in the current block is calculated based on the weighting coefficients.

It should be noted that, in the embodiment of the present disclosure, it is assumed that the vector shape is the first dimension, the second dimension . . . and the N-th dimension in order from left to right. A dimension is new added to the first dimension for diffY, that is, the shape of diffY becomes [1, inSize, LSizew, LSizeh], and this four-dimensional diffY is used as the input of the neural network model.

It should also be noted that the embodiment of the present disclosure uses a convolutional neural network model, and for example, the convolutional neural network composed of 7 basic units and a final layer may be used as the neural network model of the embodiment of the present disclosure. The basic unit may be composed of a convolutional layer having a step size of 1, the same pattern padding and a convolution kernel of 3×3, and a ReLU activation function; and the final layer may be composed of a convolutional layer having a step size of 1, the same pattern padding and a convolution kernel of 3×3, and a Softmax activation function.

It should be noted that the number of layers used in the convolutional neural network model is not limited, the network structure may include, but is not limited to, a convolutional layer, a pooling layer, an activation function, and the like; the size of the convolution kernel may be 3×3, 5×5 or other sizes, the convolution type may be ordinary convolution, transposed convolution, deformable convolution, and the like; and the activation function includes, but is not limited to, a ReLU activation function, a softmax activation function, and the like, which is not limited herein.

Further, the output vector cWeightFloat with the shape of [1, outSize, predSizeW, predSizeH] is calculated by the neural network model, and then the first dimension is removed from the cWeightFloat, so that the shape is modified as [outSize, predSizeW, predSizeH].

In the embodiment of the present disclosure, when the weighting coefficient is a floating-point weighting coefficient, a fixed-point processing is performed on the floating-point weighting coefficient to obtain a fixed-point weighting coefficient. That is to say, the fixed-point processing can be performed on above cWeightFloat, for example, a fixed-point processing shown below is performed on each element in cWeightFloat.

for i=0, 1, . . . , LSizew−1, j=0, 1, . . . , LSizeh−1
for k=0, 1, . . . , outSize−1

$$cWeight[k][i][j] = \text{round}\left(cWeightFloat[k][i][j] \times 2^{Shift}\right) \quad (7)$$

where Round (x)=Sign (x)×Floor (abs (x)+0.5), Floor (x) represents the largest integer less than or equal to x $$\text{Sign } (x) = \begin{cases} 1 & ; & x > 0 \\ 0 & ; & x == 0 \\ -1 & ; & x < 0 \end{cases}$$

abs (x) represents the absolute value of x. In addition, Shift is a shift amount set in the fixed-point operation to improve the accuracy.

Then a vector product is performed with refC on the first dimension (i.e. the channel dimension in the neural network model) of cWeight or cWeightFloat to obtain the neural network-based prediction block predWcp. Herein, the pseudo code for implementing the vector product is described as follows.

for i=0, 1, . . . , LSizew−1, j=0, 1, . . . , LSizeh−1
for k=0, 1, . . . , outSize−1

$$subCFloat[k][i][j] = (cWeightFloat[k][i][j] \times refC[k]) \quad (8)$$

After the calculation is completed, a fixed-point process can be performed on subCFloat[k][i][j]. In order to retain a certain calculation accuracy during the fixed-point process, it can be multiplied by a coefficient, which is specifically as follows:

$$subC[k][i][j] = \text{round}\left(subCFloat[k][i][j] \times 2^{Shift}\right) \quad (9)$$

for i=0, 1, . . . , LSizew−1, j=0, 1, . . . , LSizeh−1

$$predWcpFloat[i][j] = \sum_{k=0}^{outSize-1} subCFloat[k][i][j] \quad (10)$$

After the calculation is completed, a fixed-point process can be performed on predWcpFloat[i][j], which is as follows:

$$predWcp[i][j] = \text{round}(predWcpFloat[i][j]) \quad (11)$$

Alternatively, in another possible implementation, the calculation equation is as follows:

for k=0, 1, . . . , outSize−1

$$subC[k][i][j] = (cWeight[k][i][j] \times refC[k]) \quad (12)$$

Then the fixed-pointed subC[k][i][j] is used for a calculation, which is as follows: for i=0, 1, . . . , LSizew−1, j=0, 1, . . . , LSizeh−1

$$predWcp[i][j] = \left(\sum_{k=0}^{outSize-1} subC[k][i][j] + \text{Offset}\right) >> \text{Shift}_1 \quad (13)$$

Where Offset=1 (Shift₁−1), Shift₁ may be the shift amount when calculating cWeight[k][i][j] or subC[k][i][j] (Shift₁=Shift) or the shift amount required in the fixed-point operation taken in other links in order to improve the accuracy.

At operation S903, for the pixels to be predicted in the current block, a refining processing is performed on the calculated chroma prediction values, to determine the prediction block of the current block.

It should be noted that the chroma prediction values in predWcp should be limited to a preset range. When exceeding the preset range, the corresponding refining operation is required. Exemplarily, in a possible implementation, a clamp operation may be performed on the chroma prediction values within predWcp, which is as follows:

when the value of predWcp[i][j] is less than 0, the value of predWcp[i][j] is set to be 0;

when the value of predWcp[i][j] is greater than (1<<BitDepth)−1, the value of predWcp[i][j] is set to be (1<<BitDepth)−1.

where BitDepth is the bit depth required by the chroma pixel value, to ensure that all chroma prediction values in the prediction block predWcp are between 0 and (1<<BitDepth)−1.

i.e., $$predWcp[i][j] = \text{Clip3}\left(0, \left(1 << BitDepth\right) - 1, predWcp[i][j]\right) \quad (14)$$

where $$\text{Clip3}(x, y, z) = \begin{cases} x; z < y \\ y; z > y \\ z; \text{otherwise} \end{cases} \quad (15)$$

Alternatively, the equation (14) and the equation (15) are combined to obtain the following equation:

$$predWcp[i][j] = Clip3\left(0, \left(1 << BitDepth\right) - 1\right), \tag{16}$$

$$\left(\sum\nolimits_{k=0}^{outSize-1} subC[k][i][j] + \text{Offset}\right)\right) >> \text{Shift}_1$$

At operation S803, a post-processing operation is performed on the prediction block to determine a target prediction block of the current block.

It should be noted that, the predWcp[i][j] output by the weight-based chroma prediction may undergo a post-processing operation under certain conditions, and then be used as the final chroma prediction value (predSamples[i][j]), otherwise the final chroma prediction value predSamples[i][j] is predWcp[i][j]. Herein, in the neural network-based NWCP technology, the post-processing operation can be performed through non-neural network or neural network.

Exemplarily, when the size predSizeW of the predWcp block output through chroma prediction is not equal to the width nTbW of the current block, or when size predSizeH of the predWcp block output through chroma prediction is not equal to the height nTbH of the current block, it is necessary to perform artificial or neural network-based up-sampling or down-sampling operations on predWcp [i][j] to obtain the final chroma prediction value predSamples[i][j].

Exemplarily, in the NWCP, in order to reduce the instability caused by pixel-by-pixel independent and parallel prediction, predWcp[i][j] may undergo the artificial or neural network-based smoothing filtering and then be used as the final chroma prediction value predSamples [i][j].

Exemplarily, in order to further improve the accuracy of the prediction value in NWCP, an artificial or neural network-based position-related refining process may be performed on predWcp[i][j]. For example, a chroma compensation value is calculated for each pixel to be predicted by using spatially close reference pixels, and the chroma compensation value is used to refine predWcp[i][j], and the refined prediction value is taken as the final chroma prediction value predSamples[i][j].

Exemplarily, in order to further improve the accuracy of the prediction value in NWCP, artificial or neural network-based weighted fusion may be performed on the chroma prediction values calculated through other chroma prediction modes and the chroma prediction value predWcp[i][j] calculated through the NWCP, and the fusion result is used as the final chroma prediction value predSamples[i][j]. For example, artificial or neural network-based equal-weight or unequal-weight weighting is performed on the chroma prediction value predicted through the CCLM mode and the chroma prediction value predWcp[i][j] calculated through the NWCP, and the weighted result is used as the final chroma prediction value predSamples[i][j].

Exemplarily, in order to improve the prediction performance in NWCP, the predWcp[i][j] output through prediction in the NWCP may be refined by employing the neural network, and the like, which is not limited in the embodiments of the present disclosure.

It should also be understood that, in the embodiment of the present disclosure, for the input of the neural network model, reference luma information refY in the form of a one-dimensional array with inSize numbers may be subtracted from the reconstructed luma information of each position in the current block, and then an absolute values of these difference values may be taken, and the one-dimensional array results may be transposed as a column of a two-dimensional luma difference matrix diffY. At this time, the pseudo code for the construction process of diffY is as follows:

For k in range (inSize):
  For i in range (LSizew):
    For j in range (LSizeh):

$$diffY[k][i + j \times LSizew] = \text{abs}(refY[k] - recY[i][j])$$

At this time, the two-dimensional luma difference matrix diffY[k][i+j×LSizew] is used as the input of the neural network model. In this technical solution, a fully connected neural network model is used, and two basic units and a target unit may be used to form the fully connected network. Herein, the basic unit may be composed of: a fully connected layer+ReLU activation function; and the target unit may be composed of: a fully connected layer+Softmax activation function.

In addition, it should be noted that the number of layers used in the fully connected neural network model used is not limited, the network structure includes, but is not limited to, a fully connected layer, an activation function, and the like, there is no fixed limit on the number of neurons in the fully connected layer, and the activation function includes, but is not limited to, a ReLU activation function, a softmax activation function, or a Sigmoid activation function, and the like.

In this way, the two-dimensional output vector cWeight is calculated through the fully connected neural network model, and the cWeight and the reference chroma information refC are matrix-multiplied to obtain the prediction block of the current block.

The pseudo code of the calculation process is as follows:

For i in range (LSizew):
  For j in range (LSizeh):
    sum=0;
  For k in range (inSize):

$$\text{sum} = \text{sum} + cWeight[k][i + j \times Lsizew] \times refC[k];$$

$$predWcp[i][j] = \text{sum};$$

It should also be understood that in the embodiment of the present disclosure, the luma difference matrix diffY may be non-linear processed and then used as a network input. For example, one or more dimensions of the luma difference matrix diffY can be normalized by the softmax function, and the data after being non-linear processed can be used as the network input. Assuming that softmax processing is performed on the first dimension of the luma difference matrix diffY, for example, the specific nonlinear processing procedure is as follows:

$$f(diffY[k][i][j]) = \frac{e^{diffY[k][i][j]}}{\sum\nolimits_{n=0}^{inSize-1} e^{diffY[n][i][j]}} \tag{17}$$

It should also be understood that in the embodiment of the present disclosure, the prediction block of the current block may be obtained by performing nonlinear processing on the output vector (i.e., the weighting coefficient) cWeight of the neural network model and then performing the weighting process on the processed vector and the reference chroma information refC. For example, the output vector cWeight of the neural network model may be nonlinear processed in one or more dimensions, for example, the nonlinear processing is as follows:

$$cWeight[k][i][j] = \frac{\frac{1}{cWeight[k][i][j]+1}}{\sum_{n=0}^{outSize-1} \frac{1}{cWeight[n][i][j]+1}}$$

(18)

It should also be understood that in the embodiment of the present disclosure, for the neural network model, the number of layers of the convolutional neural network used in the chroma prediction calculation is not limited, the network structure includes, but is not limited to, a convolutional layer, a pooling layer, an activation function, and the like; the size of the convolution kernel may be 3×3 or 5×5 or other sizes, the convolution type may be ordinary convolution, transposed convolution or deformable convolution, etc., and the activation function includes, but is not limited to, a ReLU activation function, a softmax activation function, etc.

Exemplarily, the convolutional neural network model may also use a convolutional neural network composed of two down-sampling convolution units and two up-sampling convolution units as the neural network model of the embodiment of the present disclosure. The down-sampling convolution unit may be composed of: a convolutional layer having a step size of 2 and the same pattern padding+the ReLU activation function; and the up-sampling convolution unit may be composed of: a transposed convolutional layer having a step size of 2+the ReLU activation function.

Exemplarily, the convolutional neural network model may also use a convolutional neural network composed of multiple basic units as the neural network model of the embodiment of the present disclosure. Herein, the basic unit may be composed of a convolution layer having a step size of 1 and the same pattern padding+the ReLU activation function, and the size of the convolution kernel may be 3×3 or 5×5 or other sizes.

Exemplarily, the convolutional neural network model may also use a convolutional neural network composed of multiple basic units and an attention mechanism as the neural network model of the embodiment of the present disclosure. Herein, the basic unit may be composed of a convolution layer with a step size of 1 and the same pattern padding+a ReLU activation function, and the convolution kernel size may be 3×3, 5×5, or other sizes. The attention mechanism may be composed of: a convolutional layer, a ReLU activation function and a Sigmoid activation function; or a convolutional layer, a ReLU activation function and a Softmax activation function.

It should also be understood that in the embodiment of the present disclosure, for the neural network model described above, the target information herein may include: reference luma information refY, reconstructed luma information recY, and reference chroma information refC. Herein, the size of the reference luma information refY is inSize×1. The size of the reconstructed luma information recY is LSizew× LSizeh. The size of the reference chroma information refC is outSize×1. Then, through performing a related process on refY, recY and refC, multiple types of different input information can be provided for the neural network model.

Several application scenarios of the network-based weight chroma prediction are described in detail below as examples.

Figure 10:
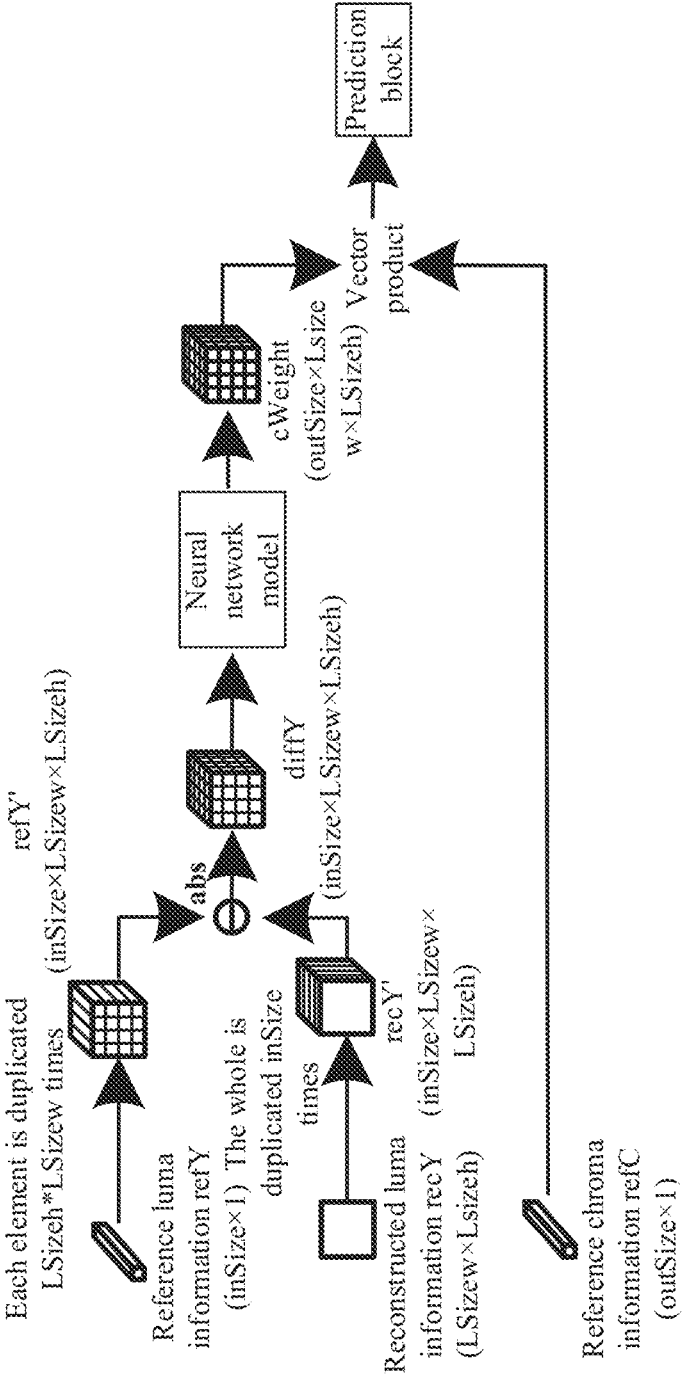
FIG. 10 is a first schematic diagram of a chroma prediction based on a neural network model according to an embodiment of the present disclosure.

In a specific embodiment, reference is made to FIG. 10, which shows a first schematic diagram of a chroma prediction based on a neural network model according to an embodiment of the present disclosure. As shown in FIG. 10, for the input information of the neural network model, it may be that: each element in the reference luma information refY is duplicated LSizew×LSizeh times, to obtain a size of reference luma information refY' being inSize×LSizew× LSizeh; the reconstructed luma information recY, as a whole, is duplicated inSize times, and the size of the obtained reconstructed luma information recY' is inSize× LSizew×LSizeh; the absolute value of difference value between the reference luma information refY' and the reconstructed luma information recY' is calculated to obtain the luma difference matrix diffY, and the size of the luma difference matrix diffY is inSize×LSizew×LSizeh. In this way, the luma difference matrix diffY is used as the input of the neural network model, the output of the neural network model is the weighting coefficients cWeight, and the size of the weighting coefficients cWeight is outSize×LSizew× LSizeh. Then, the vector product of each column vector in the channel dimension of the weighting coefficients cWeight and the reference chroma information refC is calculated to obtain the prediction block of the current block.

Figure 11:
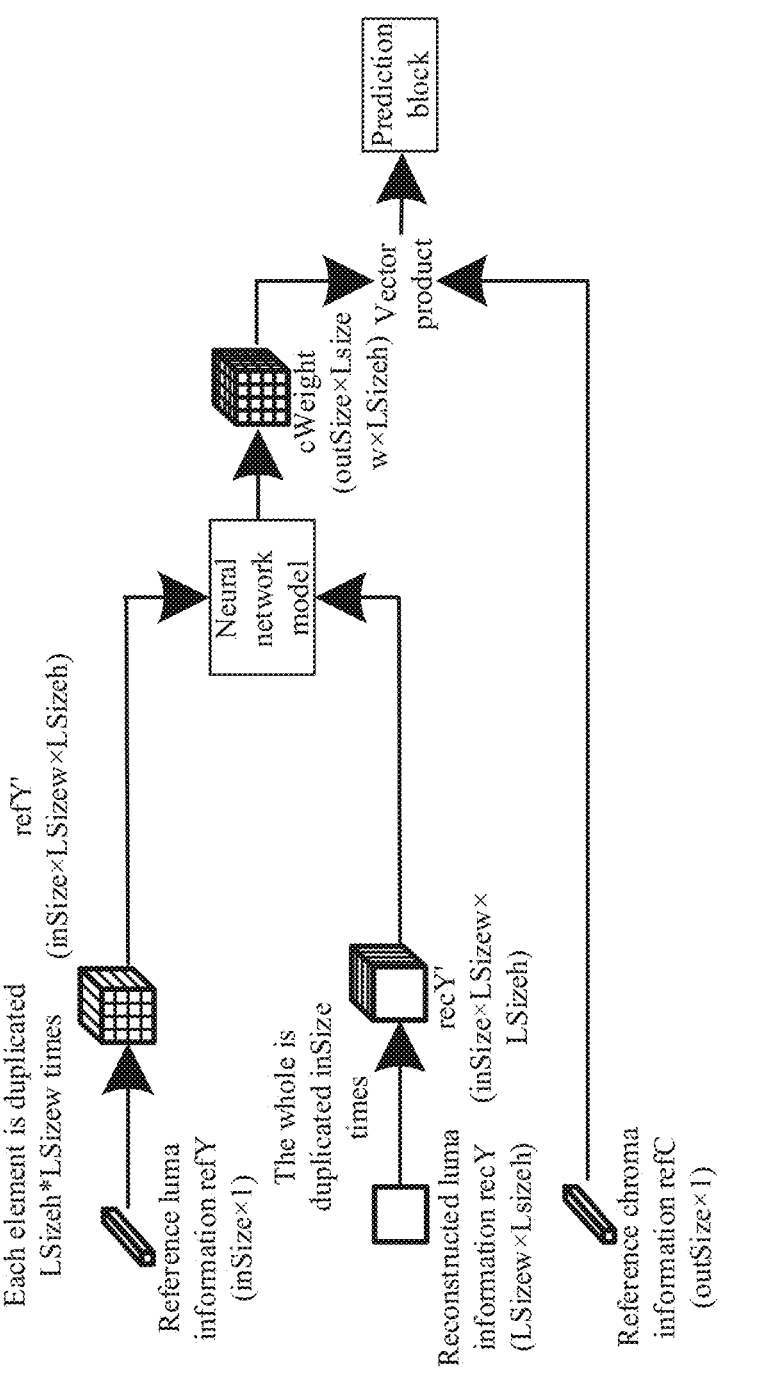
FIG. 11 is a second schematic diagram of a chroma prediction based on a neural network model according to an embodiment of the present disclosure.

In another specific embodiment, reference is made to FIG. 11, which shows a second schematic diagram of a chroma prediction based on a neural network model according to an embodiment of the present disclosure. As shown in FIG. 11, for the input information of the neural network model, it may be that: each element in the reference luma information refY is duplicated LSizew×LSizeh times, the size of the obtained reference luma information refY' is inSize× LSizew×LSizeh; the reconstructed luma information recY, as a whole, is duplicated inSize times, and the size of the obtained reconstructed luma information recY' is inSize× LSizew×LSizeh. In this way, the reference luma information refY' and the reconstructed luma information recY' are independently regarded as the input of the neural network model. At this time, the output of the neural network model is the weighting coefficients cWeight, and the size of the weighting coefficients cWeight is outSize×LSizew×LSizeh. Then, the vector product of each column vector in the channel dimension of the weighting coefficients cWeight and the reference chroma information refC is calculated to obtain the prediction block of the current block.

Specifically, in the embodiment of the present disclosure, each element in the reference luma information refY in the form of a one-dimensional array with inSize numbers may be duplicated LSizeh*LSizew times, and then arranged in the second dimension and the third dimension in the form of LSizew×LSizeh, to obtain refY' in the form of the inSize× LSizew×LSizeh of three-dimensional array. The two-dimensional array recY, as a whole, may be duplicated inSize times along the first dimensional, to obtain recY' in the form of a three-dimensional array of inSize×LSizew×LSizeh. It should be noted that when the input of the neural network model has more dimensions, refY' and recY' can also be independently used as the input of the neural network model after adding a dimension to the first dimension respectively.

Figure 12:
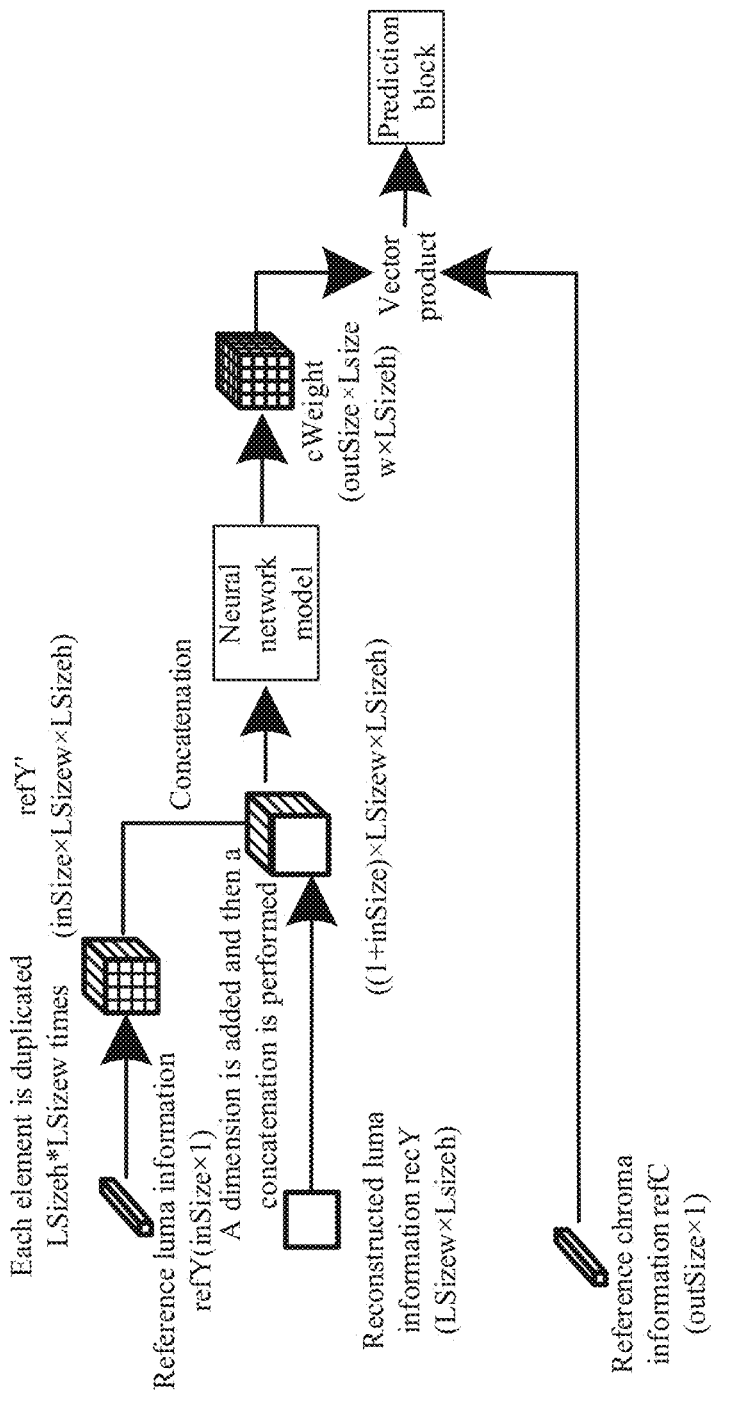
FIG. 12 is a third schematic diagram of a chroma prediction based on a neural network model according to an embodiment of the present disclosure.

In yet another specific embodiment, reference is made to FIG. 12, which shows a third schematic diagram of a chroma prediction based on a neural network model according to an embodiment of the present disclosure. As shown in FIG. 12, for the input information of the neural network model, it may be that: each element in the reference luma information refY is duplicated LSizew×LSizeh times, the size of the obtained reference luma information refY' is inSize× LSizew×LSizeh; a dimension is new added to the reconstructed luma information recY and then a concatenation process is performed, and the size of the obtained concatenated information is (1+inSize)×LSizew×LSizeh. In this way, the concatenated information is used as the input of the neural network model, and the output of the neural network model is still the weighting coefficients cWeight, and the size of the weighting coefficients cWeight is outSize×LSizew× LSizeh. Then, the vector product of each column vector in the channel dimension of the weighting coefficients cWeight and the reference chroma information refC is calculated to obtain the prediction block of the current block.

Specifically, in the embodiment of the present disclosure, each element in the reference luma information refY in the form of a one-dimensional array with inSize numbers may be duplicated LSizeh*LSizew times, and then arranged in the second dimension and the third dimension in the form of LSizew×LSizeh, to obtain refY' in the form of a three-dimensional array of inSize×LSizew×LSizeh. A dimension is new added to the two-dimensional array recY along the first dimension, to obtain recY' in the form of a 1×LSizew× LSizeh of three-dimensional array. The refY' and the recY' are concatenated together, and then are add a new dimension in the first dimension to form an input vector, which is the input of the neural network model.

Figure 13:
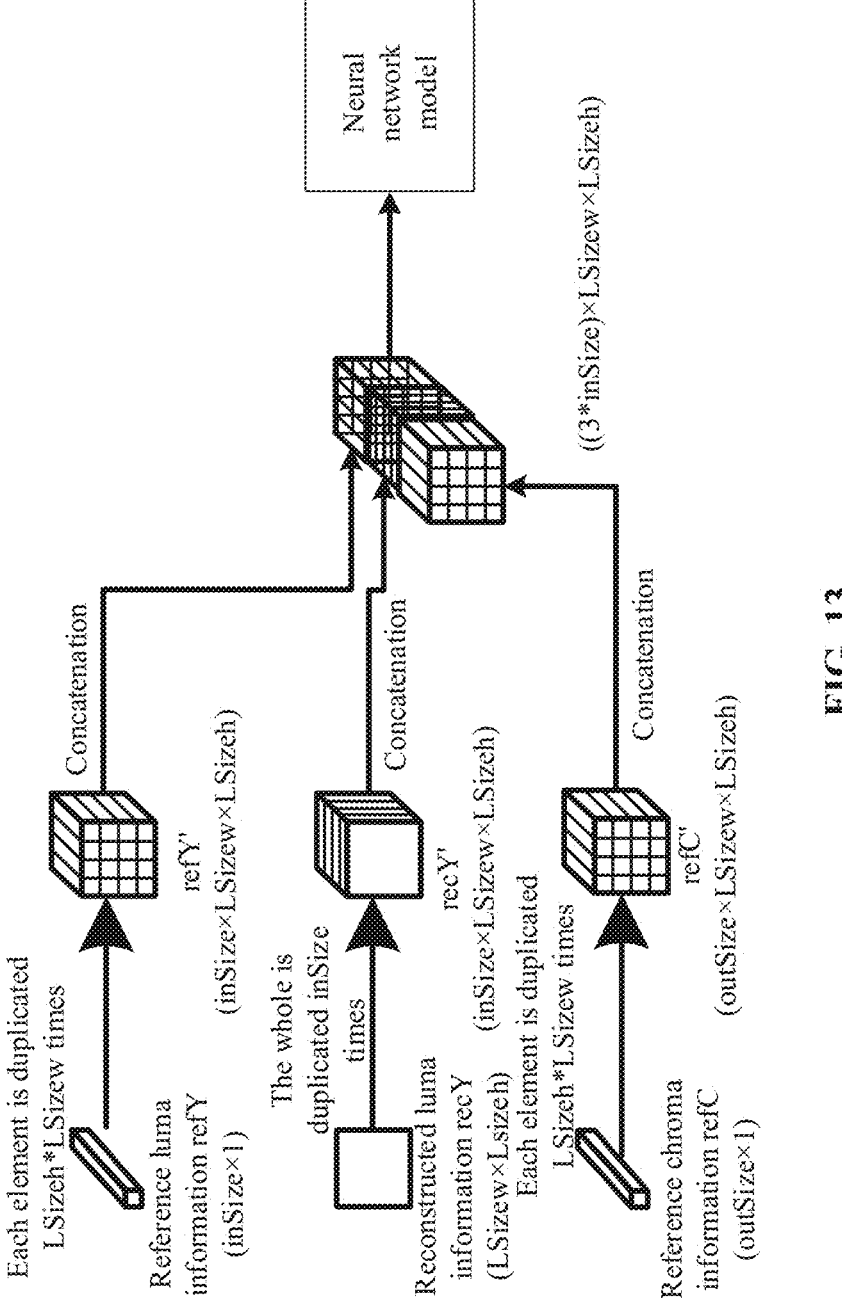
FIG. 13 is a fourth schematic diagram of a chroma prediction based on a neural network model according to an embodiment of the present disclosure.

In still another specific embodiment, reference is made to FIG. 13, which shows a fourth schematic diagram of a chroma prediction based on a neural network model according to an embodiment of the present disclosure. As shown in FIG. 13, for the input information of the neural network model, it may be that: each element in the reference luma information refY is duplicated LSizew×LSizeh times, the size of the obtained reference luma information refY' is inSize×LSizew×LSizeh; the reconstructed luma information recY, as a whole, is duplicated inSize times, and the size of the obtained reconstructed luma information recY' is inSize×LSizew×LSizeh; each element of the reference chroma information refC is duplicated LSizew×LSizeh times, the size of the obtained reference chroma information refC' is outSize×LSizew×LSizeh. In this way, refY', recY', and refC' are concatenated, and the concatenated information is taken as an input of the neural network model.

Figure 14:
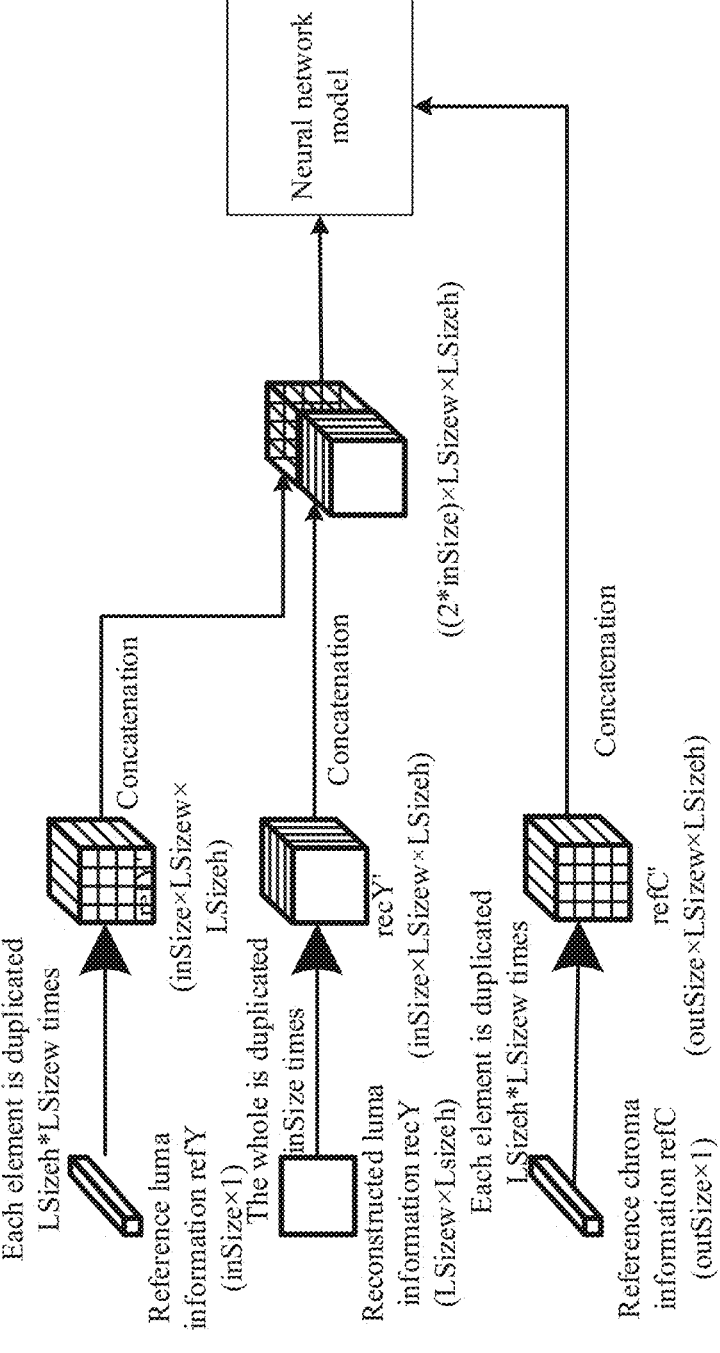
FIG. 14 is a fifth schematic diagram of a chroma prediction based on a neural network model according to an embodiment of the present disclosure.

In still another specific embodiment, reference is made to FIG. 14, which shows a fifth schematic diagram of a chroma prediction based on a neural network model according to an embodiment of the present disclosure. As shown in FIG. 14, for the input information of the neural network model, it may be that: each element in the reference luma information refY is duplicated LSizew×LSizeh times, the size of the obtained reference luma information refY' is inSize× LSizew×LSizeh; the reconstructed luma information recY, as a whole, is duplicated inSize times, and the size of the obtained reconstructed luma information recY' is inSize× LSizew×LSizeh; each element of the reference chroma information refC is duplicated LSizew×LSizeh times, the size of the obtained reference chroma information refC' is outSize×LSizew×LSizeh. In this way, refY' and recY' are concatenated, and the concatenated information together with the refC' are independently taken as an input of the neural network model.

Figure 15:
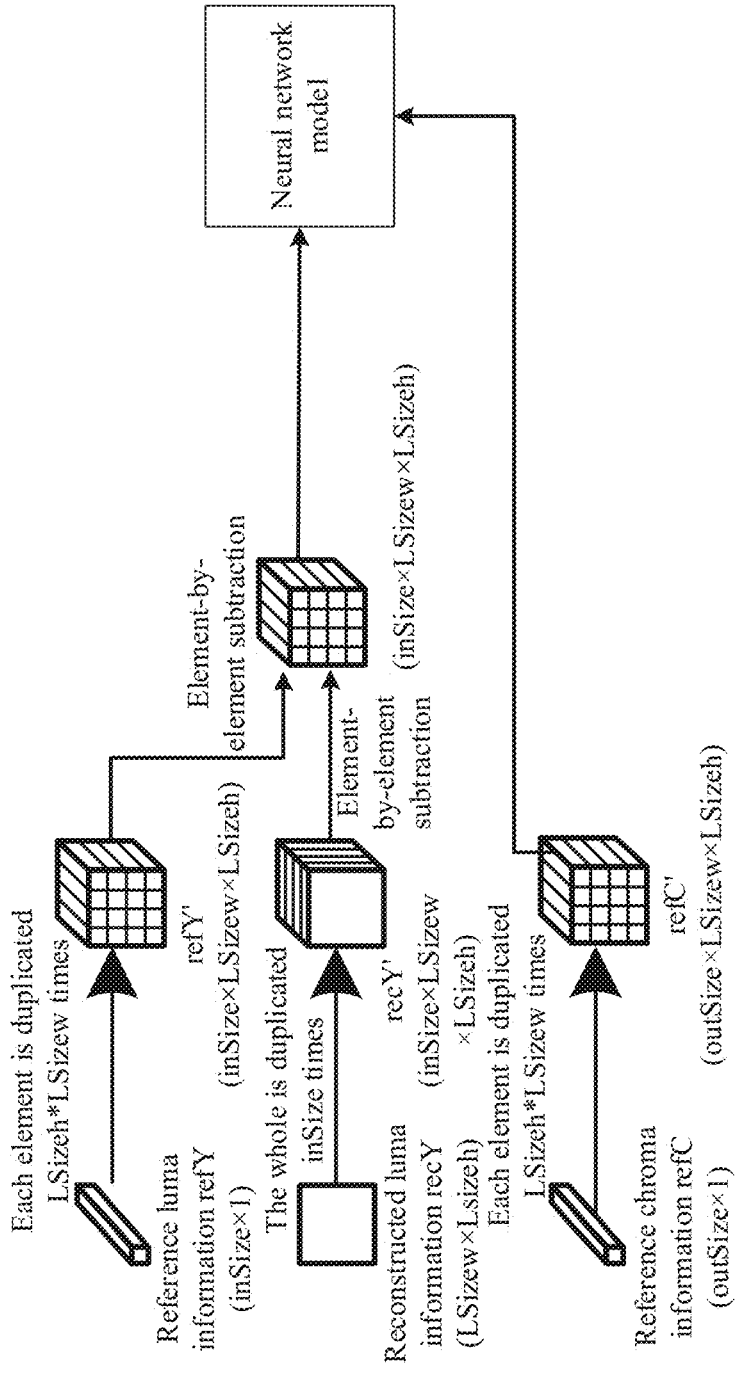
FIG. 15 is a sixth schematic diagram of a chroma prediction based on a neural network model according to an embodiment of the present disclosure.

In still another specific embodiment, reference is made to FIG. 15, which shows a sixth schematic diagram of a chroma prediction based on a neural network model according to an embodiment of the present disclosure. As shown in FIG. 15, for the input information of the neural network model, it may be that: each element in the reference luma information refY is duplicated LSizew×LSizeh times, the size of the obtained reference luma information refY' is inSize× LSizew×LSizeh; the reconstructed luma information recY, as a whole, is duplicated inSize times, and the size of the obtained reconstructed luma information recY' is inSize× LSizew×LSizeh; each element of the reference chroma information refC is duplicated LSizew×LSizeh times, the size of the obtained reference chroma information refC' is outSize×LSizew×LSizeh. In this way, element-by-element subtraction is performed on refY' and recY', to obtain a luma difference matrix, the size of the luma difference matrix is inSize×LSizew×LSizeh. In this way, the luma difference matrix together with the refC' are independently taken as the input of the neural network model.

Figure 16:
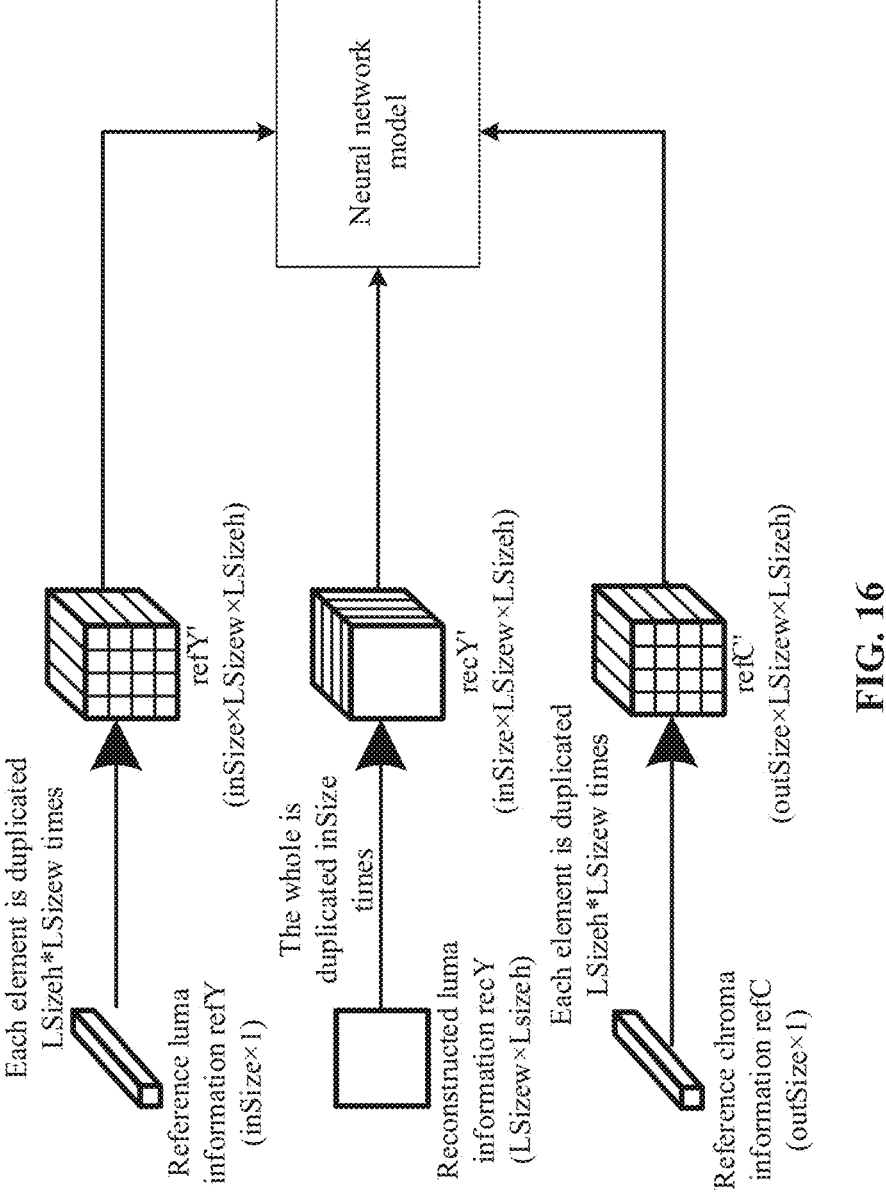
FIG. 16 is a seventh schematic diagram of a chroma prediction based on a neural network model according to an embodiment of the present disclosure.

In still another specific embodiment, reference is made to FIG. 16, which shows a seventh schematic diagram of a chroma prediction based on a neural network model according to an embodiment of the present disclosure. As shown in FIG. 16, for the input information of the neural network model, it may be that: each element in the reference luma information refY is duplicated LSizew×LSizeh times, the size of the obtained reference luma information refY' is inSize×LSizew×LSizeh; the reconstructed luma information recY, as a whole, is duplicated inSize times, and the size of the obtained reconstructed luma information recY' is inSize×LSizew×LSizeh; each element of the reference chroma information refC is duplicated LSizew×LSizeh times, and the size of the obtained reference chroma information refC' is outSize×LSizew×LSizeh. In this way, refY', recY', and refC' together are independently taken as the input of the neural network model.

That is to say, in the embodiment of the present disclosure, each element in the reference luma information refY in the form of a one-dimensional array with inSize numbers may be duplicated LSizeh*LSizew times, and then arranged in the second dimension and the third dimension in the form of LSizew×LSizeh, to obtain refY' in the form of a three-dimensional array of inSize×LSizew×LSizeh. The reconstructed luma information recY, as a whole, in the form of two-dimensional array is duplicated inSize times along the first dimensional, to obtain recY' in the form of a three-dimensional array of inSize×LSizew×LSizeh. Each element in the reference chroma information refC in the form of a one-dimensional array with the number of outSizes may be duplicated LSizeh*LSizew times, and then arranged in the second dimension and the third dimension in the form of LSizew×LSizeh, to obtain refC' in the form of a three-dimensional array of the outSize×LSizew×LSizeh. In this way, recY', refY', and refC' are directly used as the input of the neural network model, and recY', refY', and refC' may be combined as the input of the model in a variety of ways. For example, after recY', refY', and refC' are concatenated in a first dimension, a dimension is new added to the concatenated vector in the first dimension to form an input vector as the input of the neural network model, as shown in FIG. 13 for details. Alternatively, after recY' and refY' are concatenated in the first dimension, a dimension is new added to the concatenated vector and refC' in the first dimension, respectively, and then used as the input of the neural network model independently, as shown in FIG. 14 for details. Alternatively, recY' and refY' can be subtracted element by element to form a vector, and a dimension is new added to the vector and refC' in the first dimension, respectively, and then used as the input of the neural network model independently, as shown in FIG. 15 for details. Alternatively, refY', recY', and refC' together are independently taken as the input of the neural network model, as shown in FIG. 16 for details.

Figure 17:
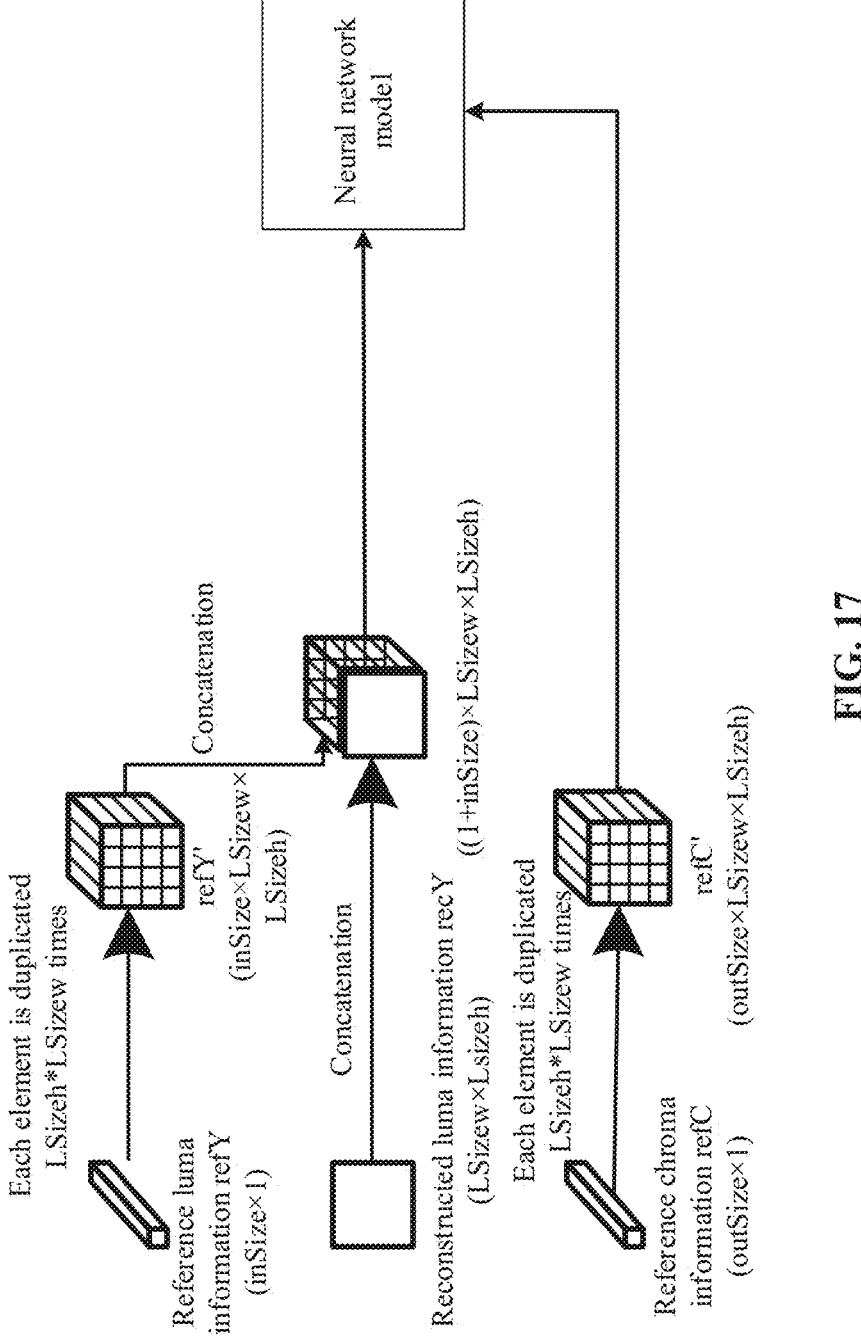
FIG. 17 is an eighth schematic diagram of a chroma prediction based on a neural network model according to an embodiment of the present disclosure.

In still another specific embodiment, reference is made to FIG. 17, which shows a eighth schematic diagram of a block diagram of a chroma prediction based on a neural network model according to an embodiment of the present disclosure. As shown in FIG. 17, for the input information of the neural network model, it may be that: each element in the reference luma information refY is duplicated LSizew× LSizeh times, the size of the obtained reference luma information refY' is inSize×LSizew×LSizeh. A dimension is new added to the reconstructed luma information recY and then a concatenation process is performed, and the obtained size of the concatenated information is (1+inSize)×LSizew× LSizeh. Each element of the reference chroma information refC is duplicated LSizew×LSizeh times, the size of the obtained reference chroma information refC' is outSize× LSizew×LSizeh. In this way, the concatenated information and refC' together are independently taken as the input of the neural network model.

That is to say, in the embodiment of the present disclosure, each element in the reference luma information refY in the form of a one-dimensional array with inSize numbers may be duplicated LSizeh*LSizew times, and then arranged in the second dimension and the third dimension in the form of LSizew×LSizeh, to obtain refY' in the form of the three-dimensional array of inSize×LSizew×LSizeh. A dimension is new added to the two-dimensional array recY in the first dimension, to obtain a recY' in the form of a three-dimensional array of 1×LSizew×LSizeh. Each element in the reference chroma information refC in the form of a one-dimensional array with the outSize numbers may be duplicated LSizeh*LSizew times, and then arranged in the second dimension and the third dimension in the form of LSizew×LSizeh, to obtain refC' in the form of a three-dimensional array of outSize×LSizew×LSizeh. Herein, recY', refY', and refC' are directly used as the input of the neural network model, and recY', refY', and refC' may be combined as the input of the model in a variety of ways. For example, A dimension is new added to recY' in the first dimension, and then concatenated with refY' in the first dimension; and a dimension is new added to the concatenated vector and refC' in the first dimension, respectively, then used as the input of the neural network model independently, as shown in FIG. 17 for details.

Further, for FIG. 13 to FIG. 17, herein, the output of the neural network model is the weighting coefficients cWeight, and the size of the weighting coefficients cWeight is out-Size×LSizew×LSizeh. Then, the vector product of each column vector in the channel dimension of the weighting coefficients cWeight and the reference chroma information refC is calculated to obtain the prediction block of the current block. Alternatively, the output of the neural network model may be directly a prediction block, which is not limited herein.

Figure 18:
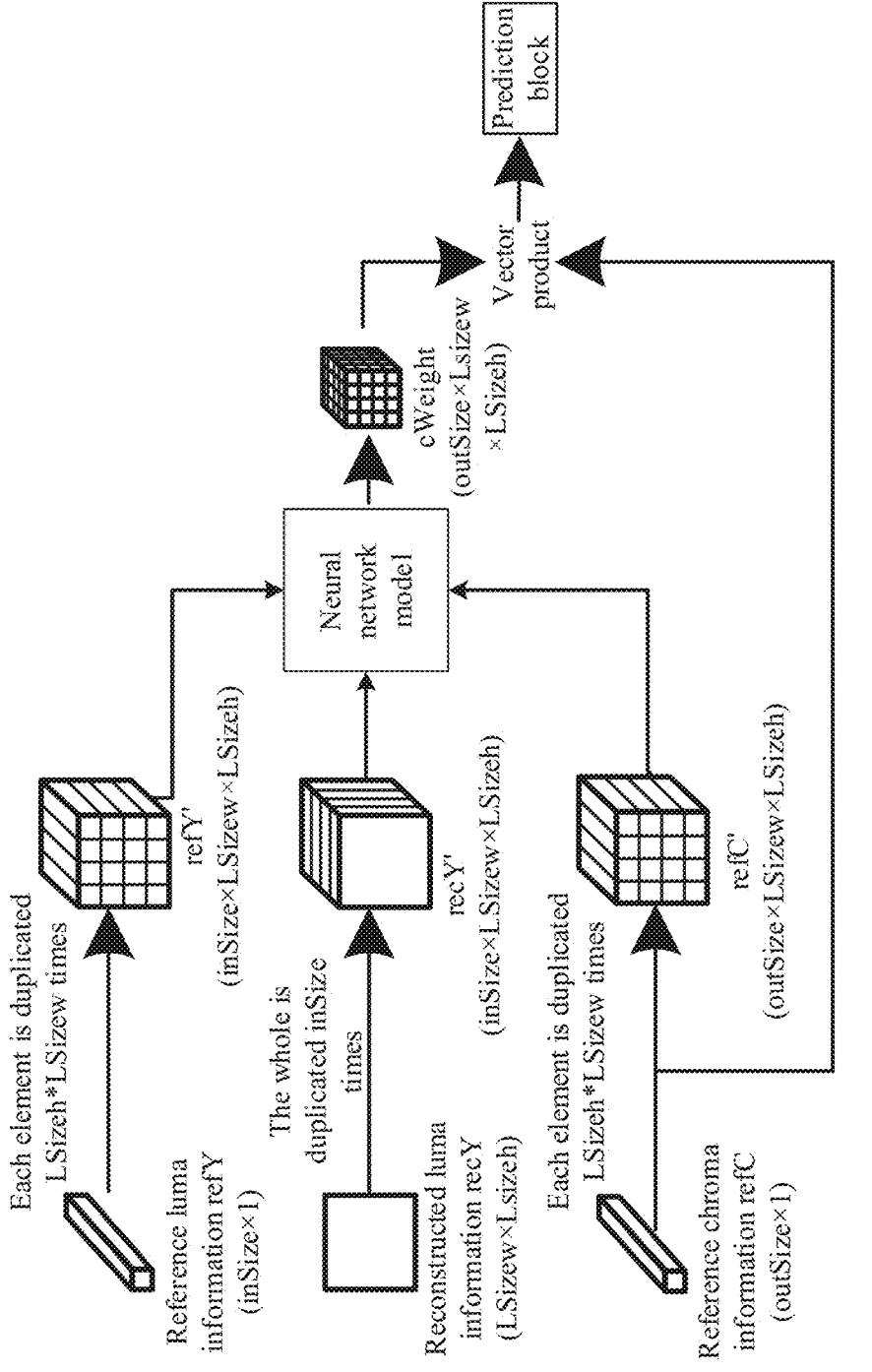
FIG. 18 is a ninth schematic diagram of a chroma prediction based on a neural network model according to an embodiment of the present disclosure.

Exemplarily, if the output of the neural network model is weighting coefficients, reference is made to FIG. 18, which shows a ninth schematic diagram of a chroma prediction based on a neural network model according to an embodiment of the present disclosure. As shown in FIG. 18, for the input information of the neural network model, it may be that: each element in the reference luma information refY is duplicated LSizew×LSizeh times, the size of the obtained reference luma information refY' is inSize×LSizew×LSizeh; the reconstructed luma information recY, as a whole, is duplicated inSize times, and the size of the obtained reconstructed luma information recY' is inSize×LSizew×LSizeh; each element of the reference chroma information refC is duplicated LSizew×LSizeh times, the size of the obtained reference chroma information refC' is outSize×LSizew× LSizeh. In this way, refY', recY', and refC' together are independently taken as the input of the neural network model. At this time, the output of the neural network model is the weighting coefficients cWeight, and the size of the weighting coefficients cWeight is outSize×LSizew×LSizeh. Then, the vector product of each column vector in the channel dimension of the weighting coefficients cWeight and the reference chroma information refC is calculated to obtain the prediction block of the current block.

Figure 19:
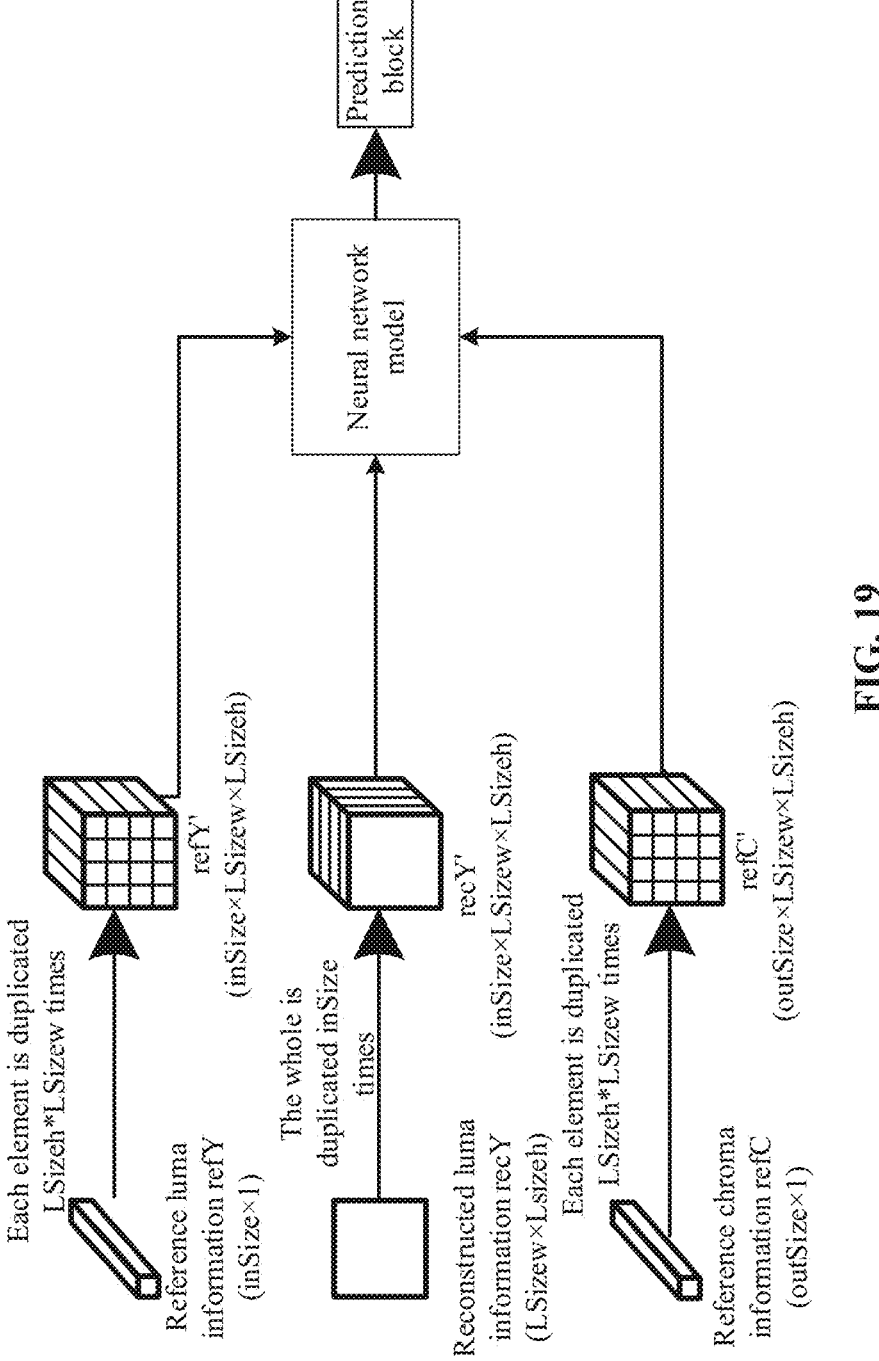
FIG. 19 is a tenth schematic diagram of a chroma prediction based on a neural network model according to an embodiment of the present disclosure.

For example, if the output of the neural network model is a prediction block, reference is made to FIG. 19, which shows a tenth schematic diagram of a chroma prediction based on a neural network model according to an embodiment of the present disclosure. As shown in FIG. 19, for the input information of the neural network model, it may be that: each element in the reference luma information refY is duplicated LSizew×LSizeh times, the size of the obtained reference luma information refY' is inSize×LSizew×LSizeh; the reconstructed luma information recY, as a whole, is duplicated inSize times, and the size of the obtained reconstructed luma information recY' is inSize×LSizew×LSizeh; each element of the reference chroma information refC is duplicated LSizew×LSizeh times, the size of the obtained reference chroma information refC' is outSize×LSizew× LSizeh. In this way, refY', recY', and refC' together are independently taken as the input of the neural network model. At this time, the output of the neural network model may be directly a prediction block of the current block.

The present embodiment provides a decoding method, and the specific implementations of the foregoing embodiments are described in detail through the present embodiment, from which it can be seen that according to the technical solutions of the foregoing embodiments, multiple types of available network input information can be provided for the network-based weight chroma prediction, and thus the chroma prediction can be better performed. In addition, by taking the reconstructed luma information difference of the neighbouring region and the current block or a result of a reconstructed luma information difference after performing correlation process as one of the inputs of the neural network, it plays a guiding role for the network to learn the correlation between the reference chroma and the chroma to be predicted in the current prediction block, thereby further improving the accuracy of the chroma prediction, saving the bit rate, and improving the encoding and decoding performance at the same time.

Figures 20, 21:
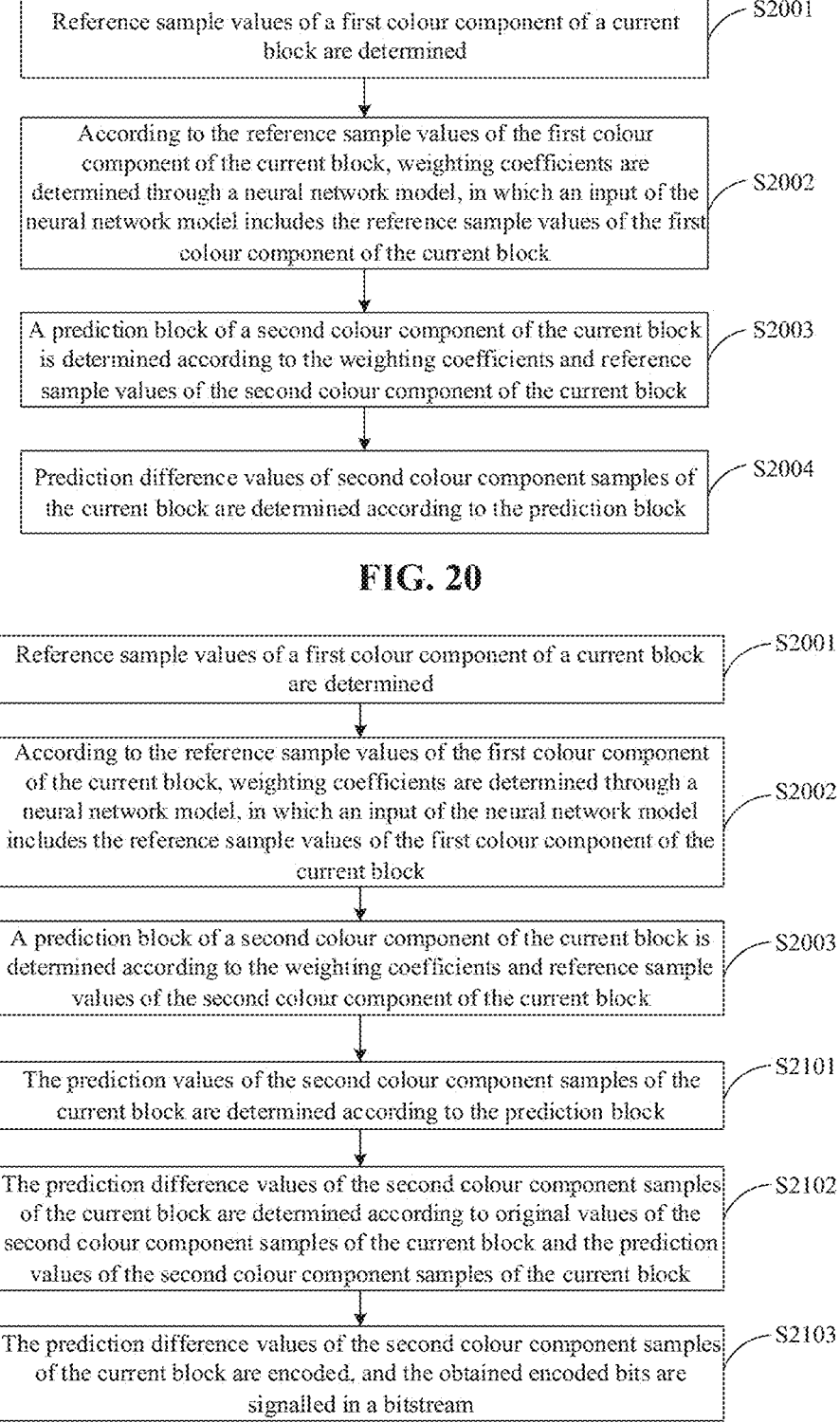
FIG. 20 is a first schematic flowchart of an encoding method according to an embodiment of the present disclosure.
FIG. 21 is a second schematic flowchart of an encoding method according to an embodiment of the present disclosure.

In another embodiment of the present disclosure, referring to FIG. 20, which illustrates a first schematic flowchart of an encoding method according to an embodiment of the present disclosure. As shown in FIG. 20, the method can include the following operations.

At operation S2001, reference sample values of a first colour component of a current block are determined.

It should be noted that the encoding method of the embodiment of the present disclosure is applied to an encoding apparatus or an encoding device integrated with the encoding apparatus (which may also be referred to as an "encoder"). Further, the encoding method in the embodiment of the present disclosure may specifically refer to an intra prediction method, and more specifically, refer to a Network-based Weight Chroma Prediction (NWCP) method.

In the embodiment of the present disclosure, a video picture can be partitioned into multiple coding blocks, each coding block may include a first colour component, a second colour component, and a third colour component, and the current block here refers to a coding block currently to be intra predicted in the video picture. In addition, assuming that a prediction of the first colour component is performed for the current block, and the first colour component is a luma component, i.e., the component to be predicted is a luma component, the current block may also be referred to as a luma prediction block. Alternatively, assuming that a prediction of the second colour component is performed for the current block, and the second colour component is a chroma component, i.e., the component to be predicted is a chroma component, the current block may also be referred to as a chroma prediction block.

It should also be noted that, in the embodiment of the present disclosure, reference information of the current block may include values of first colour component samples in a neighbouring region of the current block and values of second colour component samples in a neighbouring region of the current block, and these samples may be determined according to encoded pixels in the neighbouring region of the current block. In some embodiments, the neighbouring region of the current block may include at least one of an upper neighbouring region, an upper-right neighbouring region, a left neighbouring region and a bottom-left neighbouring region.

In some embodiments, the method may further include the following operation. Neighbouring reference values of the first colour component of the current block are determined according to first colour component samples in a neighbouring region of the current block.

It should be noted that, in the embodiment of the present disclosure, the reference pixels of the current block may specifically refer to reference pixel points that are neighbouring the current block. Here, the "neighbouring" may be "spatially neighbouring", but is not limited thereto. For example, the "neighbouring" may be "temporally neighbouring", "spatially and temporally neighbouring", and even the reference pixel of the current block may be a reference pixel obtained by performing some processing on the spatially neighbouring reference pixel point, the temporally neighbouring reference pixel point, the spatially and temporally neighbouring reference pixel point, and the like, which is not limited in the embodiments of the present disclosure.

It should also be noted that, in the embodiment of the present disclosure, both the first colour component samples and the second colour component samples in the neighbouring region of the current block may be referred to as reference pixels of the current block. Assuming that the first colour component is a luma component and the second colour component is a chroma component, a value of the first colour component sample in the neighbouring region of the current block is reference luma information corresponding to the reference pixel of the current block, and a value of the second colour component sample in the neighbouring region of the current block is reference chroma information corresponding to the reference pixel of the current block.

It should also be noted that, in the embodiment of the present disclosure, the neighbouring region of the current block may include: only the upper neighbouring region; only the left neighbouring region; both the upper neighbouring region and the upper-right neighbouring region; both the left neighbouring region and the bottom-left neighbouring region; both the upper neighbouring region and the left neighbouring region; or even the upper neighbouring region, the upper-right neighbouring region and the left neighbouring region, and the like, which is not limited in the embodiments of the present disclosure.

It should also be noted that, in the embodiment of the present disclosure, the neighbouring region may be determined according to the prediction mode of the current block. For example, when the prediction mode of the current block is the horizontal mode, only the upper neighbouring region and/or the upper-right neighbouring region may be selected for the neighbouring region in the prediction of the chroma component. When the prediction mode of the current block is the vertical mode, only the left neighbouring region and/or the bottom-left neighbouring region may be selected for the neighbouring region in the prediction of the chroma component.

Further, in some embodiments, for a determination of the neighbouring reference values of the first colour component, the method may further include that: the neighbouring reference values of the first colour component of the current block are determined by performing a screening process on values of the first colour component samples in the neighbouring region.

It should be noted that, among the first colour component samples in the neighbouring region, there may be some unimportant samples (for example, the correlation between these samples is poor) or some abnormal samples, and in order to ensure the accuracy of the prediction, these samples need to be eliminated to obtain available values of the first colour component samples.

In a specific embodiment, the operation of determining the neighbouring reference values of the first colour component of the current block by performing the screening process on the values of the first colour component samples in the neighbouring region may include the following operations.

Positions of samples to be selected are determined based on positions and/or colour component intensities of the first colour component samples in the neighbouring region.

The neighbouring reference values of the first colour component of the current block are determined from the neighbouring region according to the positions of the samples to be selected.

It should be noted that, in the embodiment of the present disclosure, the colour component intensity may be represented by colour component information, such as reference luma information, reference chroma information, and the like. Here, the larger the value of the colour component information indicates that the colour component intensity is higher. In this way, the values of the first colour component samples in the neighbouring region may be screened according to the positions of the samples or the intensities of the colour component, so that the available values of the first colour component samples are determined according to the samples obtained by the screening, and thus the neighbouring reference values of the first colour component of the current block are further determined.

In some embodiments, for the neighbouring reference values of the first colour component, the method may further include that: the neighbouring reference values of the first colour component of the current block are determined by performing a first filtering process on values of the first colour component samples in the neighbouring region.

It should be noted that, in the embodiment of the present disclosure, the first filtering process may be a down-sampling filtering process. The first colour component is the luma component, and at this time, the down-sampling filtering processing may be performed on the reference luma information to enable that the spatial resolution of the filtered reference luma information is the same as the spatial resolution of the reference chroma information. Alternatively, the first filtering process may be an up-sampling filtering process, so as to keep the reference luma information not lost, which is not limited here.

It should also be noted that, in the embodiment of the present disclosure, the reference information of the current block may further include reconstructed values of the first colour component samples in the current block. At this time, in some embodiments, the method may further include that: a reference value of the first colour component of the current block is determined according to the reconstructed values of the first colour component samples in the current block.

In the embodiment of the present disclosure, assuming that the first colour component is a luma component, the reconstructed values of the samples of the first colour component in the current block are reconstructed luma information of the current block.

In some embodiments, for the reference value of the first colour component in the current block, the method may further include that: the reference value of the first colour component in the current block is determined by performing a second filtering process on the reconstructed values of the first colour component samples in the current block.

It should be noted that, in the embodiment of the present disclosure, the second filtering process may be a down-sampling filtering process. Here, the first colour component is a luma component, and at this time, the down-sampling filtering processing may be performed on the reconstructed luma information in the current block. Alternatively, the second filtering process may be an up-sampling filtering process, so as to keep the reconstructed luma information not lost, which is not limited here.

In some embodiments, for operation S2001, the determination of the reference sample values of the first colour component of the current block may include the following operations.

Neighbouring reference values of the first colour component of the current block are determined according to first colour component samples in a neighbouring region of the current block.

The reference sample values of the first colour component of the current block are determined according to reconstructed values of the first colour component samples in the current block and the neighbouring reference values of the first colour component of the current block.

In a specific embodiment, the operation of determining the reference sample values of the first colour component of the current block according to the reconstructed values of the first colour component samples in the current block and the neighbouring reference values of the first colour component of the current block may include the following operations.

A reference value of the first colour component of the current block is determined according to the reconstructed values of the first colour component samples in the current block.

The reference sample values of the first colour component of the current block are determined according to the reference value of the first colour component in the current block and the neighbouring reference values of the first colour component of the current block.

It should be noted that, in the embodiment of the present disclosure, the reference sample values of the first colour component of the current block may be luma difference information. Here, the reference sample value of the first colour component of the current block may be an absolute value of a difference between a neighbouring reference value of the first colour component of the current block and a reference value of the first colour component in the current block. In addition, in the embodiment of the present disclosure, the reference sample value of the first colour component of the current block may also be an absolute value of the difference between the reconstructed value of the first colour component sample in the current block and the neighbouring reference value of the first colour component of the current block. Alternatively, the reference sample value of the first colour component of the current block may also be an absolute value of a difference between a reconstructed value of the first colour component sample in the current block and a value of the first colour component sample in the neighbouring region of the current block. Alternatively, the reference sample value of the first colour component of the current block may be an absolute value of the difference between the reference value of the first colour component in the current block and the value of the first colour component sample in the neighbouring region of the current block, and the like, which is not limited herein.

It should be also understood that, in the embodiment of the present disclosure, for the second colour component samples in the neighbouring region, in some embodiments, the method may further include the following operation. The reference sample values of the second colour component of the current block are determined by performing a third filtering process on values of the second colour component samples in the neighbouring region.

It should be noted that, in the embodiment of the present disclosure, the third filtering process may be an up-sampling filtering process. Alternatively, the third filtering process may be a down-sampling filtering process, which is not limited herein. Herein, the second colour component is a chroma component, and at this time, the up-sampling filtering processing or down-sampling filtering processing may be performed on the reference chroma information, finally resulting in the spatial resolution of the filtered reference chroma information being the same as the spatial resolution of the reference luma information.

That is to say, the reference chroma information and the reference luma information of the current block may be acquired from the neighbouring region. The acquired reference chroma information includes, but is not limited to, selecting a reconstructed reference chroma value of the upper region of the current block and/or a reconstructed reference chroma value of the left region of the current block. The acquired reference luma information includes, but is not limited to, acquiring corresponding reference luma information according to the position of the reference chroma information. The operation of acquiring the reconstructed luma information in the current block includes, but is not limited to, acquiring corresponding reconstructed luma information as the reconstructed luma information of the current block according to the position of the chroma information position in the current block.

It should also be understood that in the embodiment of the present disclosure, the reference chroma information, the reference luma information, or the reconstructed luma information be subjected to a relevant filtering process under certain conditions, and the processed information may be used as the target information of the current block. In addition, the relevant filtering operation herein may be implemented in a manner based on a neural network structure, which is not limited herein. In this way, the target information of the current block may include: the neighbouring reference values of the first colour component of the current block (i.e., reference luma information), the reference value of the first colour component in the current block (i.e., reconstructed luma information), and the reference sample value of the second colour component of the current block (i.e., reference chroma information). These information may be information after filtering or information without filtering, which is not limited in the embodiments of the present disclosure.

It should also be understood that in the embodiment of the present disclosure, the luma difference information is constituted by multiple luma difference matrices. Thus, in some embodiments, the reference sample values of the first colour component of the current block may include N matrices, where N represents the number of the reference sample values of the second colour component of the current block, a k-th matrix includes an absolute value of a difference between a k-th value among the neighbouring reference values of the first colour component of the current block and the reference value of the first colour component in the current block, k=0, 1, . . . , N−1.

At S2002, according to the reference sample values of the first colour component of the current block, weighting coefficients are determined through a neural network model, herein, an input of the neural network model includes the reference sample values of the first colour component of the current block.

It should be noted that, in the embodiment of the present disclosure, after the reference sample values of the first colour component of the current block are determined, the reference sample values of the first colour component of the current block may be used as an input of the neural network model, and the output of the neural network model may be the weighting coefficients.

In a possible implementation, in a case that the reference sample values of the first colour component of the current block includes N matrices, for operation S2002, the operation of determining the weighting coefficients through the neural network model according to the reference sample values of the first colour component of the current block may include that: an output of the neural network model is determined as the weighting coefficients by taking the N matrices as the input of the neural network model.

It should also be noted that, in the embodiment of the present disclosure, the N matrices, as a whole, are used as the input of the neural network model, and the output of the neural network model is the weighting coefficients. Exemplarily, deltaLuma represents a three-dimensional array or a three-dimensional matrix, here, deltaLuma as a whole is used as the input of the neural network model, and mWeight represents the weighting coefficients.

In another possible implementation, the luma difference information (e.g., N matrices) may also be non-linearly processed, and then the processed result may be used as reference sample values of the first colour component of the current block. In some embodiments, the method may further include the following operations.

Values corresponding to the N matrices under a preset mapping relationship are determined.

The reference sample values of the first colour component of the current block are determined according to the values corresponding to the N matrices.

Here, in a specific embodiment, the preset mapping relationship is a Softmax function, as shown in the aforementioned equations (1) and (17). In another specific embodiment, the preset mapping relationship is a weighting function having an inverse relationship with the i-th matrix, as shown in the aforementioned equations (2) and (3).

Accordingly, in some embodiments, for operation S2002, the operation of determining the weighting coefficients through the neural network model according to the reference sample values of the first colour component of the current block may include that: an output of the neural network model is determined as the weighting coefficients by taking the values corresponding to the N matrices under the preset mapping relationship as the input of the neural network model.

It should be noted that after the values corresponding to the N matrices under the preset mapping relationship are determined, the values corresponding to the N matrices, as a whole, are also used as the input of the neural network model, and the output of the neural network model is the weighting coefficients.

It should also be noted that, in the embodiment of the present disclosure, the preset mapping relationship may be a preset function relationship such as a Softmax function, or may be a preset look-up table manner, for example, an array element look-up table manner is adopted to reduce a part of calculation operations, and the like, which is not limited in the embodiment of the present disclosure.

It should also be noted that in the embodiment of the present disclosure, the reference sample values of the first colour component of the current block are a three-dimensional data structure. Specifically, after the absolute value of the difference between the neighbouring reference value of the first colour component of the current block and the reference value of the first colour component in the current block is calculated, the absolute value of the difference value may be stored in N matrices of the three-dimensional data structure. Alternatively, each element of the neighbouring reference values of the first colour component of the current block may be duplicated multiple times to obtain the neighbouring reference values of the first colour component of the three-dimensional data structure. The reference values of the first colour component in the current block, as a whole, may be duplicated multiple times to obtain the reference values of the first colour component of the three-dimensional data structure. Then, the absolute value of the difference value is calculated according to the neighbouring reference value of the first colour component of the three-dimensional data structure and the reference value of the first colour component of the three-dimensional data structure, and N matrices of the three-dimensional data structure can also be obtained, which is no limited herein.

It should be understood that in the embodiment of the present disclosure, the input of the neural network model may be other forms of information in addition to the luma difference information or the information obtained by performing an nonlinear process on the luma difference information, for example, the reference value of the first colour component in the current block and the neighbouring reference values of the first colour component of the current block are directly taken as the input of the neural network model, information obtained by performing concatenating process on the reference value of the first colour component in the current block and the neighbouring reference values of the first colour component of the current block is used as the input of the neural network model, or information obtained by combining the reference value of the first colour component in the current block and the neighbouring reference values of the first colour component of the current block with the reference sample values of the second colour component of the current block is used as the input of the neural network model, etc. These cases will be described below.

In a possible implementation, for operation S2002, the operation of determining the weighting coefficients through the neural network model according to the reference sample values of the first colour component of the current block may include the following operation.

An output of the neural network model is determined as the weighting coefficients by taking the reference value of the first colour component in the current block and the neighbouring reference values of the first colour component of the current block as the input of the neural network model.

It should be noted that in this case, it is not necessary to perform a related process on the reference value of the first colour component in the current block and the neighbouring reference values of the first colour component of the current block, the reference value of the first colour component in the current block and the neighbouring reference values of the first colour component of the current block may be directly used as the input of the neural network model.

In another possible implementation, for operation S2002, the operation of determining the weighting coefficients through the neural network model according to the reference sample values of the first colour component of the current block may include the following operations.

First concatenated information is obtained by performing a concatenating process on the reference value of the first colour component in the current block and the neighbouring reference values of the first colour component of the current block.

An output of the neural network model is determined as the weighting coefficients by taking the first concatenated information as the input of the neural network model.

It should be noted that in this case, the reference value of the first colour component in the current block and the neighbouring reference values of the first colour component of the current block may be concatenated in the first dimension, but it is not necessary to calculate the absolute value of the difference value between the reference value of the first colour component in the current block and the neighbouring reference values of the first colour component of the current block, and thus, the obtained first concatenated information may be used as an input of the neural network model. The first concatenated information is processed by the neural network model, and finally the output of the neural network model is the weighting coefficients.

In yet another possible implementation, for operation S2002, the method may further include the following operations.

An output of the neural network model is determined as the weighting coefficients by taking the reference sample values of the first colour component of the current block and the reference sample values of the second colour component of the current block as the input of the neural network model.

In a specific embodiment, the method may include that: the output of the neural network model is determined as the weighting coefficients by taking the reference value of the first colour component in the current block, the neighbouring reference values of the first colour component of the current block and the reference sample values of the second colour component of the current block as the input of the neural network model.

It should be noted that in this case, all of the target information (including the reference luma information in the neighbouring region, the reference chroma information in the neighbouring region, and the reconstructed luma information in the current block) of the current block may be used as the input of the neural network model, and then these information may be processed by the neural network model, and finally the output of the neural network model is weighting coefficients.

In another specific embodiment, the method may include that: second concatenated information is obtained by performing a concatenating process on the reference value of the first colour component in the current block and the neighbouring reference values of the first colour component of the current block. The output of the neural network model is determined as the weighting coefficients by taking the second concatenated information and the reference sample values of the second colour component of the current block as the input of the neural network model.

It should be noted that in this case, the reference value of the first colour component in the current block and the neighbouring reference values of the first colour component of the current block may be concatenated in the first dimension, but it is not necessary to calculate the absolute value of the difference value between the reference value of the first colour component in the current block and the neighbouring reference values of the first colour component of the current block, and then the obtained second concatenated information and the reference sample values of the second colour component of the current block are collectively used as the input of the neural network model, and these information are processed by the neural network model, and finally the output of the neural network model is the weighting coefficients.

In still another specific embodiment, the method may include that: third concatenated information is obtained by performing a concatenating process on the reference value of the first colour component in the current block, the neighbouring reference values of the first colour component of the current block and the reference sample values of the second colour component of the current block, and the output of the neural network model is determined as the weighting coefficients by taking the third concatenated information as the input of the neural network model.

It should be noted that in this case, the reference value of the first colour component in the current block, the neighbouring reference values of the first colour component of the current block and the reference sample values of the second colour component of the current block may be concatenated in the first dimension, then the obtained third concatenated information may be used as an input of the neural network model, and the third concatenated information may be processed by the neural network model, and finally the output of the neural network model is weighting coefficients.

It should also be noted that, in the embodiment of the present disclosure, since the input of the neural network model is required to be in a three-dimensional data structure, that is, the reference value of the first colour component in the current block, the neighbouring reference values of the first colour component of the current block and the reference sample values of the second colour component of the current block each need to be transformed into a three-dimensional data structure before being used as the input of the neural network model. For example, before being used as the input of the neural network model, the reference value of the first colour component in the current block is duplicated as a whole, the neighbouring reference values of the first colour component of the current block are duplicated element by element, or the reference sample values of the second colour component of the current block are duplicated element by element.

In addition, it should be also illustrated that, for the neural network model, when information with more dimensions is required for the input of the neural network model, the embodiment of the present disclosure may further expand the dimension of the input information. Then, after the expanded information is processed by the neural network model, the output of the neural network model is dimensionally deleted to restore the original dimension, and then the weighting coefficients of the three-dimensional data structure can still be obtained.

As can be understood, for the neural network model, in some embodiments, the neural network model may be a convolutional neural network model.

Here, the convolutional neural network model may include at least one basic unit and a target unit.

The basic unit includes at least a first convolutional layer and a first activation function.

The target unit includes at least a second convolutional layer and a second activation function.

In an embodiment of the present disclosure, the first activation function is a ReLU function, and the second activation function is a softmax function. In a specific embodiment, the convolutional neural network model may be composed of seven basic units and a target unit formed by a final layer. The basic unit may be composed of a convolutional layer having a step size of 1, a same pattern padding and a convolution kernel of 3×3, and a first activation function ReLU; and the target unit may be composed of a convolutional layer having a step size of 1, a same pattern padding and a convolution kernel of 3×3, and a softmax activation function.

It should be noted that, the same pattern padding means that the size of the feature map after convolution remains unchanged, that is, the size of the input picture and the size of the output picture are the same.

It should also be noted that the number of layers of the convolutional neural network model used herein is not limited, the network structure may include but is not limited to a convolutional layer, a pooling layer, an activation function, and the like, the size of the convolution kernel may be 3×3, 5×5 or other sizes, the convolution type may be ordinary convolution, transposed convolution, deformable convolution, and the like. Whether it is the first activation function or the second activation function, it includes, but is not limited to, a ReLU activation function, a softmax activation function, and the like, which is not limited in the embodiment of the present disclosure.

It should also be understood that, for the neural network model, in some embodiments, the neural network model is a fully connected neural network model.

Here, the fully connected neural network model may include at least one basic unit and a target unit.

The basic unit includes at least a first fully connected layer and a first activation function;

The target unit includes at least a second fully connected layer and a second activation function.

In an embodiment of the present disclosure, the first activation function is a ReLU function, and the second activation function is a softmax function. In a specific embodiment, in the fully connected neural network model, two basic units and a target unit formed by the final layer may be used to constitute the used fully connected network. Herein, the basic unit may be composed of a fully connected layer and a ReLU activation function, and the target unit may be composed of a fully connected layer and a Softmax activation function.

It should also be noted that the number of layers used in the fully connected network model is not limited, and the network structure includes, but is not limited to, a fully connected layer, an activation function, and the like. There is no fixed limit on the number of neurons in the fully connected layer, and the activation function includes, but is not limited to, a ReLU activation function, a softmax activation function, or a Sigmoid activation function, and the like, which is not specifically limited in the embodiments of the present disclosure.

It should also be understood that in the embodiment of the present disclosure, deltaLuma[k][y][x] is used as a three-dimensional matrix data structure, then deltaLuma[k][y][x] can also be regarded as W×H one-dimensional matrices. Thus, in some embodiments, the method may further include the following operation.

The reference sample values of the first colour component of the current block includes W×H one-dimensional matrices, the one-dimensional matrix includes N weighting coefficients, where the W×H represents the number of the second colour component samples of the current block, and N represents the number of the reference sample values of the second colour component of the current block.

It should be noted that in the embodiments of the present disclosure, W×H represents the number of the second colour component samples of the current block. Alternatively, W×H may also be interpreted as the number of second colour component prediction points of the current block, or the number of second colour component prediction points determined through calculation.

It should be noted that in this case, each one-dimensional matrix includes N weighting coefficients, so that the prediction values of the second colour component prediction points corresponding to the one-dimensional matrix in the current block are determined according to the N weighting coefficients. In a one-dimensional matrix, the sum of N weighting coefficients is equal to 1, and each weighting coefficient is a value greater than or equal to 0 and less than or equal to 1. But it should be noted here that "the sum of N weighting coefficients is equal to 1" is only a theoretical concept. In the actual fixed-point implementation process, the absolute value of the weighting coefficient may be greater than 1.

At operation S2003, a prediction block of a second colour component of the current block is determined according to the weighting coefficients and reference sample values of the second colour component of the current block.

It should be noted that, after the weighting coefficients is output via the neural network model, the prediction block of the second colour component of the current block may be determined by performing weighting calculation based on the weighting coefficients and the reference sample values of the second colour component of the current block.

In some embodiments, for operation S2003, the operation of determining the prediction block of the second colour component of the current block according to the weighting coefficients and the reference sample values of the second colour component of the current block may include the following operations.

A first one-dimensional matrix for calculating the second colour component samples to be predicted is determined according to position indexes of second colour component samples to be predicted in the current block and the weighting coefficients.

The prediction block of the second colour component of the current block is determined according to the first one-dimensional matrix and the reference sample values of the second colour component of the current block.

Herein, the first one-dimensional matrix represents a one-dimensional matrix corresponding to the position indexes in a three-dimensional matrix data structure of the weighting coefficients.

That is to say, the weighting coefficients are a three-dimensional matrix data structure. When the position index of the second colour component sample to be predicted in the current block is the w-th column and the h-th row, the first one-dimensional matrix is the one-dimensional matrix at the w-th column and the h-th row in the three-dimensional matrix data structure of the weighting coefficients.

In other embodiments, for operation S2003, the operation of determining the prediction block of the second colour component of the current block according to the weighting coefficients and the reference sample values of the second colour component of the current block may include that: the prediction block of the second colour component of the current block is determined according to the position indexes of the second colour component samples to be predicted in the current block and the weighting coefficients.

In the embodiment of the present disclosure, the prediction value of the second colour component sample to be predicted in the prediction block may be set to be equal to a sum of weighted values of the reference sample values of the second colour component of the current block and the coefficients in the second one-dimensional matrix. The second one-dimensional matrix represents the one-dimensional matrix corresponding to the position index in the three-dimensional matrix data structure of the weighting coefficients.

That is to say, still taking the position index of the second colour component sample to be predicted in the current block being the w-th column and h-th row as an example. For the second colour component sample to be predicted, its corresponding one-dimensional matrix at the w-th column and h-th row in the three-dimensional matrix data structure of weighting coefficients includes N weighting coefficients. Then the weighted value of the reference sample value of the second colour component of the current block and the corresponding coefficient among the N weighting coefficients is determined, and the prediction value of the second colour component sample to be predicted may be set to be equal to the sum of the N weighted values, where N represents the number of reference sample values of the second colour component, and N is a positive integer.

It should also be noted that, in the embodiment of the present disclosure, for the weighting coefficients output by the neural network model, a non-linear process is performed on the weighting coefficients, and the weighting calculation may be performed on the processed coefficients and the reference sample values of the second colour component of the current block. In some embodiments, the method may further include the following operations.

Values corresponding to the weighting coefficients under a preset mapping relationship are determined after determining the weighting coefficients through the neural network model.

The weighting coefficients are updated based on the values corresponding to the weighting coefficients under the preset mapping relationship.

Here, the weighting coefficients output by the neural network model may be processed non-linearly in one dimension or multiple dimensions. Exemplarily, the preset mapping relationship of the nonlinear processing is shown in the aforementioned equation (4) or equation (18).

It should also be noted that, in the embodiment of the present disclosure, for a weighting coefficient output by the neural network model, a fixed-point process may be performed on the weighting coefficient when the weighting coefficient is a floating-point weighting coefficient. Alternatively, when the prediction value calculated for the second colour component sample to be predicted is a floating-point number, a fixed-point process may be performed on the prediction value.

In addition, the output of the neural network model may be a weighting coefficients involved in the calculation of the chroma prediction value, or may directly be a prediction block of the chroma component of the current block. Thus, in some embodiments, the method may further include the following operations.

According to the reference sample values of the first colour component of the current block and the reference sample values of the second colour component of the current block, the prediction block of the second colour component of the current block is determined through the neural network model.

The reconstructed values of the second colour component samples of the current block are determined according to the prediction block.

In an embodiment of the present disclosure, the method may include that: an output of the neural network model is determined as the prediction block by taking the reference sample values of the first colour component of the current block and the reference sample values of the second colour component of the current block as the input of the neural network model.

It should be noted that, for the input of the neural network model, the reference value of the first colour component in the current block, the neighbouring reference values of the first colour component of the current block and the reference sample values of the second colour component of the current block may be used as the input of the neural network model. Alternatively, the reference value of the first colour component in the current block, the neighbouring reference values of the first colour component of the current block and the reference sample values of the second colour component of the current block may be concatenated, and the concatenated information may be used as the input of the neural network model. Alternatively, the reference value of the first colour component in the current block and the neighbouring reference values of the first colour component of the current block may be concatenated, and the concatenated information and the reference sample values of the second colour component of the current block may be used as the input of the neural network model. Alternatively, after the absolute value of the difference between the reference value of the first colour component in the current block and the neighbouring reference values of the first colour component of the current block is calculated, the absolute value of the difference value and the reference sample values of the second colour component of the current block may be used as the input of the neural network model, etc. At this time, the output of the neural network model may be directly the prediction block of the second colour component of the current block.

At operation S2004, reconstructed values of second colour component samples of the current block are determined according to the prediction block.

It should be noted that, in the embodiment of the present disclosure, the prediction block may include prediction values of at least part of second colour component samples in the current block. When the prediction block includes the prediction values of all the second colour component samples in the current block, no processing is required for the prediction block at this time, and the prediction block can be directly regarded as the final prediction block. When the prediction block includes the prediction values of part of second colour component samples in the current block, an up-sampling filtering is required to be performed on the prediction block to obtain the final prediction block. When the number of prediction values of the second colour component included in the prediction block is the same as the number of the second colour component samples included in the current block, but the prediction values of the second colour component samples of the current block are not included, at this time, a filtering process is required to enhance the prediction values, to obtain the final prediction block. Accordingly, in some embodiments, the method may further include that: after determining the prediction block of the second colour component of the current block, a related process is performed on the prediction block, and the processed prediction block is determined as the prediction block.

In a specific embodiment, the prediction values of the second colour component samples in the prediction block usually needs to be limited within a preset range. Accordingly, in some embodiments, the operation of performing the process on the prediction block may include that: a refining operation is performed on the prediction values of the second colour component samples in the prediction block, to determine the prediction block of the second colour component of the current block.

It should be noted that in the embodiment of the present disclosure, the preset range may be between 0 and $(1<<\text{BitDepth})-1$, where BitDepth is the bit depth required by the chroma component. When a prediction value in the prediction block (predWcp) exceeds the value of the preset range, it is necessary to perform a corresponding refining operation on the prediction value. For example, a clamp operation may be performed on predWcp[i][j], to ensure that the prediction values of all the second colour component samples in the prediction block are between 0 and $(1<<\text{BitDepth})-1$.

In another specific embodiment, a post-processing operation may also be performed on the prediction block. Accordingly, in some embodiments, the operation of performing the related process on the prediction block may further include at least one of the following sub-operations.

A filtering enhancement process is performed on prediction values of the second colour component samples in the prediction block.

A refining process is performed on the prediction values of the second colour component samples in the prediction block by using a preset compensation value.

A weighted fusion process is performed on the prediction values of the second colour component samples in the prediction block by using prediction values of the second colour component of the current block in at least one prediction mode.

It should be noted that, in the NWCP mode, for the process on the prediction block, in order to reduce the instability caused by the NWCP pixel-by-pixel independent and parallel prediction, a smoothing filtering process may be performed on the prediction block, and then the processed prediction block is used as the final chroma prediction value. Alternatively, in order to further improve the accuracy of prediction values in the NWCP, a position-related refining process may be performed on the prediction block. For example, a chroma compensation value is calculated for each pixel to be predicted by using reference pixels with close spatial positions, the prediction block is refined by using the chroma compensation value, and the refined prediction value is used as a final chroma prediction value. Alternatively, in order to further improve the accuracy of prediction values in the NWCP, a weighted fusion may be performed on the chroma prediction value calculated in other chroma prediction modes and the chroma prediction value calculated in the NWCP, and the fusion result is used as the final chroma prediction value. Alternatively, in order to improve the NWCP prediction performance, the neural network model may be used to refine the chroma prediction value calculated in the NWCP, and the like, which is not limited in the embodiment of the present disclosure.

In some embodiments, after the prediction block is determined, as shown in FIG. 21, after the operation S2003, the method may further include the following operations.

At operation S2101, the prediction values of the second colour component samples of the current block are determined according to the prediction block.

At operation S2102, the prediction difference values of the second colour component samples of the current block are determined according to original values of the second colour component samples of the current block and the prediction values of the second colour component samples of the current block according to the prediction block.

At operation S2103, the prediction difference values of the second colour component samples of the current block are encoded, and the obtained encoded bits are signaled in a bitstream.

It should be noted that in the embodiment of the present disclosure, the prediction block may include prediction values of at least part of the second colour component samples in the current block. When the prediction block contains the prediction values of all the second colour component samples in the current block, the prediction values of the second colour component samples of the current block may be set to be equal to the values of the prediction block. When the prediction block contains prediction values of part of the second colour component samples in the current block, the values of the prediction block may be up-sampling filtered, and the prediction values of the second colour component sample of the current block may be set to be equal to the values outputted after up-sampling filtering.

It should also be noted that, after the prediction values of the second colour component samples of the current block are determined, the prediction difference values for the second colour component samples of the current block are determined according to original values of the second colour component samples and the prediction values of the second colour component samples. Specifically, the prediction difference values for the second colour component samples of the current block can be determined by performing a subtracting operation on the original values of the second colour component samples and the prediction values of the second colour component samples. In this way, after the prediction difference values of the second colour component samples are signalled in the bitstream, the prediction difference values for the second colour component samples can be obtained by decoding at the decoding side subsequently, so as to recover the reconstructed values of the second colour component samples of the current block.

In summary, the embodiment of the present disclosure is a NWCP technology, which mainly includes: on the one hand, existing information of the current block is sufficiently obtained, including reconstructed luma information of the neighbouring region, reconstructed chroma information of the neighbouring region and reconstructed luma information of the current block; on the other hand, multiple types of available input information are provided for the network-based weight chroma prediction, i.e., the reconstructed luma information difference between the current block and the reference pixels or the result after performing a process on the reconstructed luma information difference, and thus the chroma prediction can be better performed.

An embodiment of the present disclosure provides an encoding method, which includes that: reference sample values of a first colour component of a current block are determined; according to the reference sample values of the first colour component of the current block, weighting coefficients are determined through a neural network model, herein, an input of the neural network model includes the reference sample values of the first colour component of the current block; a prediction block of a second colour component of the current block is determined according to the weighting coefficients and reference sample values of the second colour component of the current block; prediction difference values of second colour component samples of the current block are determined according to the prediction block. In this way, by making full use of the colour component information in the neighbouring region of the current block and the colour component information in the current block, multiple types of available input information can be provided for the network-based weight chroma prediction, and thus the chroma prediction can be better performed. In addition, by taking the luma difference between the reference pixel and the current block or a result after performing a correlation process on the luma difference as one of the inputs of the neural network, and by learning a correlation between the reference chroma and the chroma to be predicted of the current block through the neural network, and using the correlation for the chroma prediction of the current block, the accuracy of the chroma prediction can be further improved, the bit rate can be saved, and the encoding and decoding performance can be improved at the same time.

In still another embodiment of the present disclosure, the embodiment of the present disclosure further provides a bitstream, which is generated by bit encoding according to information to be encoded. The information to be encoded includes at least the prediction difference values of the second colour component samples of the current block.

In the embodiment of the present disclosure, after the prediction difference values of the second colour component samples of the current block is transmitted from the encoding side to the decoding side; the decoding side obtains the prediction difference values of the second colour component samples by decoding at, and then combines the prediction values of the second colour component samples of the current block, to recover the reconstructed values of the second colour component samples of the current block. In this way, by making full use of the colour component information in the neighbouring region of the current block and the colour component information in the current block, multiple types of available input information can be provided for the network-based weight chroma prediction, and thus the chroma prediction can be better performed. Furthermore, by learning a correlation between the reference chroma and the chroma to be predicted of the current block through the neural network, and using the correlation for the chroma prediction of the current block, the accuracy of the chroma prediction can be further improved, the bit rate can be saved, and the encoding and decoding performance can be improved at the same time.

Figure 22:
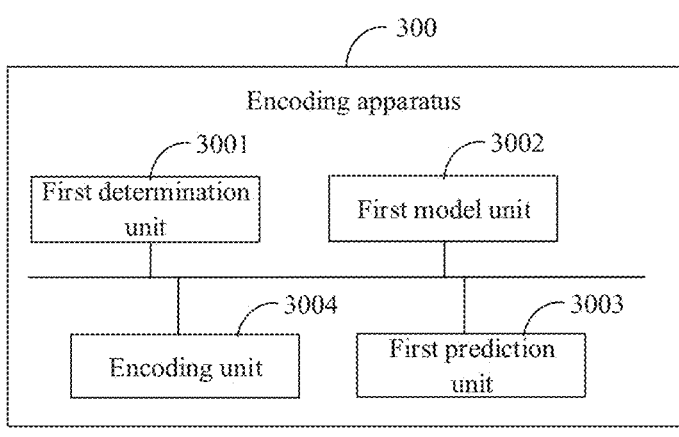
FIG. 22 is a schematic diagram of a composition structure of an encoding apparatus according to an embodiment of the present disclosure.

In still another embodiment of the present application, based on the same inventive concept as the embodiments described above, referring to FIG. 22, which shows a schematic diagram of a composition structure of an encoding apparatus 300 according to an embodiment of the present disclosure. As shown in FIG. 22, the encoding apparatus 300 may include: a first determination unit 3001, a first model unit 3002 and a first prediction unit 3003.

The first determination unit 3001 is configured to determine reference sample values of a first colour component of a current block.

The first model unit 3002 is configured to determine, according to the reference sample values of the first colour component of the current block, weighting coefficients through a neural network model, herein, an input of the neural network model includes the reference sample values of the first colour component of the current block The first prediction unit 3003 is configured to determine a prediction block of a second colour component of the current block according to the weighting coefficients and reference sample values of the second colour component of the current block.

The first determination unit 3001 is further configured to determine prediction difference values of second colour component samples of the current block according to the prediction block.

In some embodiments, the first determination unit 3001 is further configured to: determine neighbouring reference values of the first colour component of the current block according to first colour component samples in a neighbouring region of the current block; and determine the reference sample values of the first colour component of the current block according to reconstructed values of the first colour component samples in the current block and the neighbouring reference values of the first colour component of the current block. Herein, the neighbouring region includes at least one of: an upper neighbouring region, an upper-right neighbouring region, a left neighbouring region and a bottom-left neighbouring region.

In some embodiments, the first determination unit 3001 is further configured to determine a reference value of the first colour component in the current block according to the reconstructed values of the first colour component samples in the current block, and to determine the reference sample values of the first colour component of the current block according to the reference value of the first colour component in the current block and the neighbouring reference values of the first colour component of the current block.

In some embodiments, the first determination unit 3001 is further configured to determine that the reference sample value of the first colour component of the current block is an absolute value of a difference between an neighbouring reference value of the first colour component of the current block and a reference value of the first colour component in the current block.

In some embodiments, the first determination unit 3001 is further configured to determine that the reference sample values of the first colour component of the current block include N matrices, wherein N represents the number of the reference sample values of the second colour component of the current block, a k-th matrix includes an absolute value of a difference between a k-th value among the neighbouring reference values of the first colour component of the current block and the reference value of the first colour component in the current block, $k=0, 1, \ldots, N-1$.

In some embodiments, the first model unit 3002 is further configured to determine an output of the neural network model as the weighting coefficients by taking the N matrices as the input of the neural network model.

In some embodiments, the first determination unit 3001 is further configured to determine values corresponding to the N matrices under a preset mapping relationship, and determine the reference sample values of the first colour component of the current block according to the values corresponding to the N matrices under the preset mapping relationship.

In some embodiments, the first model unit 3002 is further configured to determine an output of the neural network model as the weighting coefficients by taking the values corresponding to the N matrices under the preset mapping relationship as the input of the neural network model.

In some embodiments, the preset mapping relationship is a Softmax function.

In some embodiments, the preset mapping relationship is a weighting function having an inverse relationship with the k-th matrix.

In some embodiments, the first determination unit 3001 is further configured to determine the neighbouring reference values of the first colour component of the current block by performing a screening process on values of the first colour component samples in the neighbouring region.

In some embodiments, the first determination unit 3001 is further configured to determining positions of samples to be selected based on positions and/or colour component intensities of the first colour component samples in the neighbouring region, and determine the neighbouring reference values of the first colour component of the current block from the neighbouring region according to the positions of the samples to be selected.

In some embodiments, the first determination unit 3001 is further configured to determine the neighbouring reference values of the first colour component of the current block by performing a first filtering process on values of the first colour component samples in the neighbouring region.

In some embodiments, the first determination unit 3001 is further configured to determine the reference value of the first colour component in the current block by performing a second filtering process on the reconstructed values of the first colour component samples in the current block.

In some embodiments, the first model unit 3002 is further configured to determine an output of the neural network model as the weighting coefficients by taking the reference value of the first colour component in the current block and the neighbouring reference values of the first colour component of the current block as the input of the neural network model.

In some embodiments, the first model unit 3002 is further configured to obtain first concatenated information by performing a concatenating process on the reference value of the first colour component in the current block and the neighbouring reference values of the first colour component of the current block, and to determine an output of the neural network model as the weighting coefficients by taking the first concatenated information as the input of the neural network model.

In some embodiments, the first model unit 3002 is further configured to determine an output of the neural network model as the weighting coefficients by taking the reference sample values of the first colour component of the current block and the reference sample values of the second colour component of the current block as the input of the neural network model.

In some embodiments, the first model unit 3002 is further configured to determine the output of the neural network model as the weighting coefficients by taking the reference value of the first colour component in the current block, the neighbouring reference values of the first colour component of the current block and the reference sample values of the second colour component of the current block as the input of the neural network model.

In some embodiments, the first model unit 3002 is further configured to obtain second concatenated information by performing a concatenating process on the reference value of the first colour component in the current block and the neighbouring reference values of the first colour component of the current block, and to determine the output of the neural network model as the weighting coefficients by taking the second concatenated information and the reference sample values of the second colour component of the current block as the input of the neural network model.

In some embodiments, the first model unit 3002 is further configured to obtain third concatenated information by performing a concatenating process on the reference value of the first colour component in the current block, the neighbouring reference values of the first colour component of the current block and the reference sample values of the second colour component of the current block, and to determine the output of the neural network model as the weighting coefficients by taking the third concatenated information as the input of the neural network model.

In some embodiments, the neural network model is a convolutional neural network model, and the convolutional neural network model includes at least one basic unit and a target unit.

The basic unit includes at least a first convolutional layer and a first activation function, and the target unit includes at least a second convolutional layer and a second activation function.

In some embodiments, the neural network model is a fully connected neural network model, and the fully connected neural network model includes at least one basic unit and a target unit.

The basic unit includes at least a first fully connected layer and a first activation function, and the target unit includes at least a second fully connected layer and a second activation function.

In some embodiments, the first activation function is a ReLU function and the second activation function is a softmax function.

In some embodiments, the reference sample values of the first colour component of the current block includes W×H one-dimensional matrices, the one-dimensional matrix includes N weighting coefficients, where the W×H represents the number of the second colour component samples of the current block, and N represents the number of the reference sample values of the second colour component of the current block.

In some embodiments, the first determination unit 3001 is further configured to determine the reference sample values of the second colour component of the current block according to second colour component samples in a neighbouring region of the current block.

In some embodiments, the first determination unit 3001 is further configured to determine the reference sample values of the second colour component of the current block by performing a third filtering process on values of the second colour component samples in the neighbouring region of the current block.

In some embodiments, the first prediction unit 3003 is further configured to: determine, according to position indexes of second colour component samples to be predicted in the current block and the weighting coefficients, a first one-dimensional matrix for calculating the second colour component samples to be predicted, and determine the prediction block of the second colour component of the current block according to the first one-dimensional matrix and the reference sample values of the second colour component of the current block.

In some embodiments, the first one-dimensional matrix represents a one-dimensional matrix corresponding to the position indexes in a three-dimensional matrix data structure of the weighting coefficients.

In some embodiments, the first prediction unit 3003 is further configured to determine the prediction block of the second colour component of the current block according to position indexes of second colour component samples to be predicted in the current block and the weighting coefficients.

In some embodiments, prediction values of the second colour component samples to be predicted in the prediction block are set to be equal to weighted sums of the reference sample values of the second colour component of the current block and coefficients in a second one-dimensional matrix, and the second one-dimensional matrix represents a one-dimensional matrix corresponding to the position indexes in a three-dimensional matrix data structure of the weighting coefficients.

In some embodiments, the first model unit 3002 is further configured to determine values corresponding to the weighting coefficients under a preset mapping relationship after determining the weighting coefficients through the neural network model, and update the weighting coefficients based on the values corresponding to the weighting coefficients under the preset mapping relationship.

In some embodiments, the first prediction unit 3003 is further configured to determine, according to the reference sample values of the first colour component of the current block and the reference sample values of the second colour component of the current block, the prediction block of the second colour component of the current block through the neural network model.

The first determination unit 3001 is further configured to determine the reconstructed values of the second colour component samples of the current block according to the prediction block.

In some embodiments, the first prediction unit 3003 is further configured to determine an output of the neural network model as the prediction block by taking the reference sample values of the first colour component of the current block and the reference sample values of the second colour component of the current block as the input of the neural network model.

In some embodiments, the first prediction unit 3003 is further configured to: after determining the prediction block of the second colour component of the current block, perform a process on the prediction block, and determine the processed prediction block as the prediction block.

In some embodiments, the operation of performing the process on the prediction block includes at least one of the following.

A filtering enhancement process is performed on prediction values of the second colour component samples in the prediction block.

A refining process is performed on the prediction values of the second colour component samples in the prediction block by using a preset compensation value.

A weighted fusion process is performed on the prediction values of the second colour component samples in the prediction block by using prediction values of the second colour component of the current block in at least one prediction mode.

In some embodiments, the first determination unit 3001 is further configured to: determine prediction difference values of the second colour component samples of the current block; determine prediction values of the second colour component samples of the current block according to the prediction block; and determine the reconstructed values of the second colour component samples of the current block according to the prediction difference values of the second colour component samples of the current block and the prediction values of the second colour component samples of the current block.

In some embodiments, the first determination unit 3001 is further configured to: determine prediction values of the second colour component samples of the current block according to the prediction block, and determine the prediction difference values of the second colour component samples of the current block according to original values of the second colour component samples of the current block and the prediction values of the second colour component samples of the current block.

In some embodiments, as shown in FIG. 22, the encoding apparatus 300 may further include an encoding unit 3004, configured to encode the prediction difference values of the second colour component samples of the current block, and signal obtained encoded bits in a bitstream.

It should be understood that in the embodiment of the present disclosure, "unit" may be part of circuits, part of processors, part of programs or softwares, etc., or may be a module or non-modular. Moreover, components in the present embodiment may be integrated in one processing unit, each unit may exist physically alone, or two or more units may be integrated in one unit. The integrated unit can be realized either in a form of hardware or in a form of software function module.

If the integrated unit is implemented in the form of software function module rather than being sold or used as a stand-alone product, it may be stored in a computer readable storage medium. Based on such a understanding, the technical solution of the present embodiments, in essence or in part contributing to the prior art, or in whole or in part of the technical solution, may be embodied in a form of a software product, the computer software product is stored in a storage medium, and includes instructions for causing a computer device (which may be a personal computer, a server, or a network device, etc.) or a processor to perform all of or part of the steps of the method of the present embodiment. The aforementioned storage medium includes a USB flash disk, a removable hard disk, a Read Only Memory (ROM), a Random Access Memory (RAM), a magnetic disk or an optical disk and other medium capable of storing program codes.

Thus, an embodiment of the present disclosure provides a computer readable storage medium storing computer programs, applied to the encoding apparatus 300, the computer programs are used to implement the method of any of the preceding embodiments when executed by a first processor.

Figure 23:
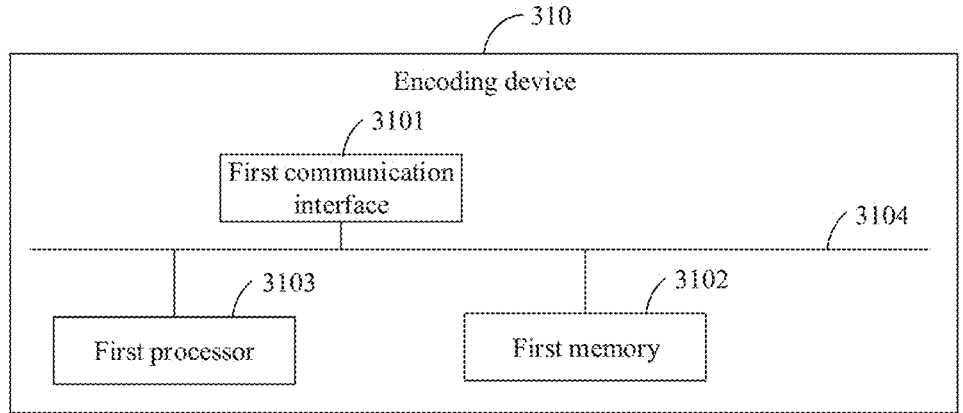
FIG. 23 is a schematic diagram of a specific hardware structure of an encoding device according to an embodiment of the present disclosure.

Based on the above-described composition of the encoding apparatus 300 and the computer readable storage medium, referring to FIG. 23, a schematic diagram of a specific hardware structure of an encoding device 310 according to an embodiment of the present disclosure is shown. As shown in FIG. 23, the encoding device 310 may include a first communication interface 3101, a first memory 3102 and a first processor 3103. All components are coupled together by a first bus system 3104. It can be understood that the first bus system 3104 is used to implement connection communications between these components. The first bus system 3104 includes a power bus, a control bus and a status signal bus in addition to a data bus. However, the various buses are designated as the first bus system 3104 in FIG. 23 for clarity.

The first communication interface 3101 is used to receive and transmit signals in the process of transmitting and receiving information with other external network elements.

The first memory 3102 is used to store computer programs executable on the first processor 3103.

The first processor 3103 is used to, when executing the computer programs, perform operations of:

determining reference sample values of a first colour component of a current block;

determining, according to the reference sample values of the first colour component of the current block, weighting coefficients through a neural network model, herein, an input of the neural network model includes the reference sample values of the first colour component of the current block;

determining a prediction block of a second colour component of the current block according to the weighting coefficients and reference sample values of the second colour component of the current block; and determining prediction difference values of second colour component samples of the current block according to the prediction block.

It can be understood that the first memory 3102 in the embodiments of the present disclosure may be a volatile memory or a non-volatile memory, or may include both the volatile memory and the non-volatile memory. The non-volatile memory can be a read-only memory (ROM), a programmable ROM (PROM), an erasable PROM (EPROM), an electrically EPROM (EEPROM) or a flash memory. The volatile memory can be a random access memory (RAM), which is used as an external cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). The first memory 3102 of the systems and methods described herein is intended to include, but is not limited to, memories of these and any other suitable type.

The first processor 3103 may be an integrated circuit chip with signal processing capability. In the implementation process, various operations in the above method can be implemented by an integrated logic circuit of hardware in the processor 3103 or instructions in the form of software. The above mentioned first processor 3103 can be a general purpose processor, a digital signal processor (DSPS), an application specific integrated circuit (ASIC), a field programmable gate array (FPGA) or other programmable logic devices, discrete gates or transistor logic devices, and discrete hardware components. Various methods, operations and logic block diagrams disclosed in the embodiments of the present disclosure can be implemented or executed. The general-purpose processor may be a microprocessor or the processor may be any conventional processor or the like. The operations of the methods disclosed in connection with the embodiments of the present disclosure can be directly embodied as being implemented by a hardware decoding processor, or by a combination of the hardware and software modules in the decoding processor. The software module can be located in a random memory, a flash memory, a read-only memory, a programmable read-only memory or an electrically erasable programmable memory, a register and other mature storage media in the art. The storage medium is located in the first memory 3102, and the first processor 3103 reads information in the first memory 3102 and implements the operations of the above methods in combination with its hardware.

It can be understood that the embodiments described herein may be implemented in a hardware, a software, a firmware, a middleware, a microcode or a combination thereof. For a hardware implementation, the processing unit may be implemented in one or more ASICs, DSPs, DSP devices (DSPDs), Programmable Logic Devices (PLDs), FPGAs, general purpose processors, controllers, microcontrollers, microprocessors, other electronic units for performing the functions described herein, or combinations thereof. For a software implementation, the techniques described herein may be implemented by modules (e.g. procedures, functions, etc.) that perform the functions described herein. The software code may be stored in a memory and executed by a processor. The memory can be implemented inside the processor or outside the processor.

Optionally, as another embodiment, the first processor 3103 is further configured to perform the method of any of the aforementioned embodiments when executing the computer programs.

The embodiment provides an encoding device, and the encoding device may include the encoding apparatus 300 described in the previous embodiment. For the encoding device, by making full use of the colour component information in the neighbouring region of the current block and the colour component information in the current block, multiple types of available input information can be provided for the network-based weight chroma prediction, and thus the chroma prediction can be better performed. Furthermore, by learning a correlation between the reference chroma and the chroma to be predicted of the current block through the neural network, and using the correlation for the chroma prediction of the current block, the accuracy of the chroma prediction can be further improved, the bit rate can be saved, and the encoding and decoding performance can be improved at the same time.

Figure 24:
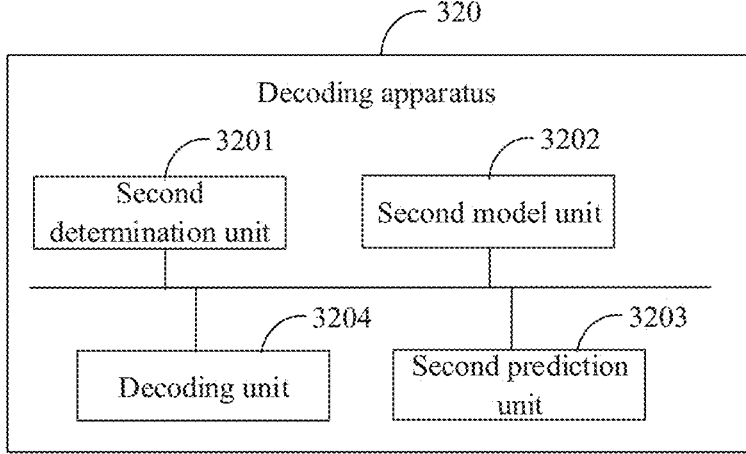
FIG. 24 is a schematic diagram of a composition structure of a decoding apparatus according to an embodiment of the present disclosure.

In still another embodiment of the present application, based on the same inventive concept as the embodiments described above, referring to FIG. 24, which shows a schematic diagram of a composition structure of a decoding apparatus 320 according to an embodiment of the present disclosure. As shown in FIG. 24, the decoding apparatus 320 may include: a second determination unit 3201, a second model unit 3202 and a second prediction unit 3203.

The second determination unit 3201 is configured to determine reference sample values of a first colour component of a current block.

The second model unit 3202 is configured to determine, according to the reference sample values of the first colour component of the current block, weighting coefficients through a neural network model, herein, an input of the neural network model includes the reference sample values of the first colour component of the current block The second prediction unit 3203 is configured to determine a prediction block of a second colour component of the current block according to the weighting coefficients and reference sample values of the second colour component of the current block.

The second determination unit 3201 is further configured to determine reconstructed values of second colour component samples of the current block according to the prediction block.

In some embodiments, the second determination unit 3201 is further configured to: determine neighbouring reference values of the first colour component of the current block according to first colour component samples in a neighbouring region of the current block; and determine the reference sample values of the first colour component of the current block according to reconstructed values of the first colour component samples in the current block and the neighbouring reference values of the first colour component of the current block. Herein, the neighbouring region includes at least one of: an upper neighbouring region, an upper-right neighbouring region, a left neighbouring region and a bottom-left neighbouring region.

In some embodiments, the second determination unit 3201 is further configured to determine a reference value of the first colour component in the current block according to the reconstructed values of the first colour component samples in the current block, and to determine the reference sample values of the first colour component of the current block according to the reference value of the first colour component in the current block and the neighbouring reference values of the first colour component of the current block.

In some embodiments, the second determination unit 3201 is further configured to determine that the reference sample value of the first colour component of the current block is an absolute value of a difference between an neighbouring reference value of the first colour component of the current block and a reference value of the first colour component within the current block.

In some embodiments, the second determination unit 3201 is further configured to determine that the reference sample values of the first colour component of the current block include N matrices, wherein N represents the number of the reference sample values of the second colour component of the current block, a k-th matrix includes an absolute value of a difference between a k-th value among the neighbouring reference values of the first colour component of the current block and the reference value of the first colour component in the current block, k=0, 1, . . . , N−1.

In some embodiments, the second model unit 3202 is further configured to determine an output of the neural network model as the weighting coefficients by taking the N matrices as the input of the neural network model.

In some embodiments, the second determination unit 3201 is further configured to determine values corresponding to the N matrices under a preset mapping relationship, and determine the reference sample values of the first colour component of the current block according to the values corresponding to the N matrices under the preset mapping relationship.

In some embodiments, the second model unit 3202 is further configured to determine an output of the neural network model as the weighting coefficients by taking the values corresponding to the N matrices under the preset mapping relationship as the input of the neural network model.

In some embodiments, the preset mapping relationship is a Softmax function.

In some embodiments, the preset mapping relationship is a weighting function having an inverse relationship with the k-th matrix.

In some embodiments, the second determination unit 3201 is further configured to determine the neighbouring reference values of the first colour component of the current block by performing a screening process on values of the first colour component samples in the neighbouring region.

In some embodiments, the second determination unit 3201 is further configured to determining positions of samples to be selected based on positions and/or colour component intensities of the first colour component samples in the neighbouring region, and determine the neighbouring reference values of the first colour component of the current block from the neighbouring region according to the positions of the samples to be selected.

In some embodiments, the second determination unit 3201 is further configured to determine the neighbouring reference values of the first colour component of the current block by performing a first filtering process on values of the first colour component samples in the neighbouring region.

In some embodiments, the second determination unit 3201 is further configured to determine the reference value of the first colour component in the current block by performing a second filtering process on the reconstructed values of the first colour component samples in the current block.

In some embodiments, the second model unit 3202 is further configured to determine an output of the neural network model as the weighting coefficients by taking the reference value of the first colour component in the current block and the neighbouring reference values of the first colour component of the current block as the input of the neural network model.

In some embodiments, the second model unit 3202 is further configured to obtain first concatenated information by performing a concatenating process on the reference value of the first colour component in the current block and the neighbouring reference values of the first colour component of the current block, and to determine an output of the neural network model as the weighting coefficients by taking the first concatenated information as the input of the neural network model.

In some embodiments, the second model unit 3202 is further configured to determine an output of the neural network model as the weighting coefficients by taking the reference sample values of the first colour component of the current block and the reference sample values of the second colour component of the current block as the input of the neural network model.

In some embodiments, the second model unit 3202 is further configured to determine the output of the neural network model as the weighting coefficients by taking the reference value of the first colour component in the current block, the neighbouring reference values of the first colour component of the current block and the reference sample values of the second colour component of the current block as the input of the neural network model.

In some embodiments, the second model unit 3202 is further configured to obtain second concatenated information by performing a concatenating process on the reference value of the first colour component in the current block and the neighbouring reference values of the first colour component of the current block, and to determine the output of the neural network model as the weighting coefficients by taking the second concatenated information and the reference sample values of the second colour component of the current block as the input of the neural network model.

In some embodiments, the second model unit 3202 is further configured to obtain third concatenated information by performing a concatenating process on the reference value of the first colour component in the current block, the neighbouring reference values of the first colour component of the current block and the reference sample values of the second colour component of the current block, and to determine the output of the neural network model as the weighting coefficients by taking the third concatenated information as the input of the neural network model.

In some embodiments, the neural network model is a convolutional neural network model, and the convolutional neural network model includes at least one basic unit and a target unit.

The basic unit includes at least a first convolutional layer and a first activation function, and the target unit includes at least a second convolutional layer and a second activation function.

In some embodiments, the neural network model is a fully connected neural network model, and the fully connected neural network model includes at least one basic unit and a target unit.

The basic unit includes at least a first fully connected layer and a first activation function, and the target unit includes at least a second fully connected layer and a second activation function.

In some embodiments, the first activation function is a ReLU function and the second activation function is a softmax function.

In some embodiments, the reference sample values of the first colour component of the current block includes W×H one-dimensional matrices, the one-dimensional matrix includes N weighting coefficients, where the W×H represents the number of the second colour component samples of the current block, and N represents the number of the reference sample values of the second colour component of the current block.

In some embodiments, the second determination unit 3201 is further configured to determine the reference sample values of the second colour component of the current block according to second colour component samples in a neighbouring region of the current block.

In some embodiments, the second determination unit 3201 is further configured to determine the reference sample values of the second colour component of the current block by performing a third filtering process on values of the second colour component samples in the neighbouring region of the current block.

In some embodiments, the second prediction unit 3203 is further configured to determine, according to position indexes of second colour component samples to be predicted in the current block and the weighting coefficients, a first one-dimensional matrix for calculating the second colour component samples to be predicted, and determine the prediction block of the second colour component of the current block according to the first one-dimensional matrix and the reference sample values of the second colour component of the current block.

In some embodiments, the first one-dimensional matrix represents a one-dimensional matrix corresponding to the position indexes in a three-dimensional matrix data structure of the weighting coefficients.

In some embodiments, the second prediction unit 3203 is further configured to determine the prediction block of the second colour component of the current block according to position indexes of second colour component samples to be predicted in the current block and the weighting coefficients.

In some embodiments, prediction values of the second colour component samples to be predicted in the prediction block are set to be equal to weighted sums of the reference sample values of the second colour component of the current block and coefficients in a second one-dimensional matrix, and the second one-dimensional matrix represents a one-dimensional matrix corresponding to the position indexes in a three-dimensional matrix data structure of the weighting coefficients.

In some embodiments, the second model unit 3202 is further configured to determine values corresponding to the weighting coefficients under a preset mapping relationship after determining the weighting coefficients through the neural network model, and update the weighting coefficients based on the values corresponding to the weighting coefficients under the preset mapping relationship.

In some embodiments, the second determination unit 3201 is further configured to determine, according to the reference sample values of the first colour component of the current block and the reference sample values of the second colour component of the current block, the prediction block of the second colour component of the current block through the neural network model, and determine the reconstructed values of the second colour component samples of the current block according to the prediction block.

In some embodiments, the second prediction unit 3203 is further configured to determine an output of the neural network model as the prediction block by taking the reference sample values of the first colour component of the current block and the reference sample values of the second colour component of the current block as the input of the neural network model.

In some embodiments, the second prediction unit 3203 is further configured to: after determining the prediction block of the second colour component of the current block, perform a process on the prediction block, and determine the processed prediction block as the prediction block.

In some embodiments, the operation of performing the process on the prediction block includes at least one of the following.

A filtering enhancement process is performed on prediction values of the second colour component samples in the prediction block.

A refining process is performed on the prediction values of the second colour component samples in the prediction block by using a preset compensation value.

A weighted fusion process is performed on the prediction values of the second colour component samples in the prediction block by using prediction values of the second colour component of the current block in at least one prediction mode.

In some embodiments, the second determination unit 3201 is further configured to determine prediction difference values of the second colour component samples of the current block; determine prediction values of the second colour component samples of the current block according to the prediction block; and determine the reconstructed values of the second colour component samples of the current block according to the prediction difference values of the second colour component samples of the current block and the prediction values of the second colour component samples of the current block.

In some embodiments, referring to FIG. 24, the decoding apparatus 320 may further include a decoding unit 3204, configured to parse the bitstream, to determine prediction difference values of second colour component samples of the current block.

It should be understood that in the embodiment of the present disclosure, "unit" may be part of circuits, part of processors, part of programs or softwares, etc., or may be a module or non-modular. Moreover, components in the present embodiment may be integrated in one processing unit, each unit may exist physically alone, or two or more units may be integrated in one unit. The integrated unit can be realized either in a form of hardware or in a form of software function module.

If the integrated unit is implemented in the form of software function module rather than being sold or used as a stand-alone product, it may be stored in a computer readable storage medium. Based on such a understanding, an embodiment of the present disclosure provides a computer readable storage medium storing computer programs, applied to the decoding apparatus 320, the computer programs are used to implement the method of any of the preceding embodiments when executed by a second processor.

Figure 25:
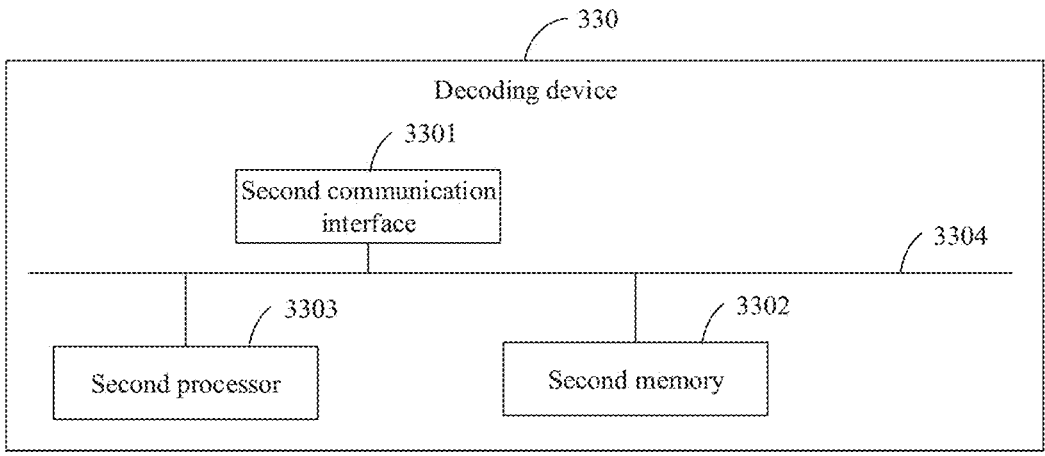
FIG. 25 is a schematic diagram of a specific hardware structure of a decoding device according to an embodiment of the present disclosure.

Based on the above-described composition of the decoding apparatus 320 and the computer readable storage medium, referring to FIG. 25, a schematic diagram of a specific hardware structure of a decoding device 330 according to an embodiment of the present disclosure is shown. As shown in FIG. 25, the decoding device 330 may include a second communication interface 3301, a second memory 3302 and a second processor 3303. All components are coupled together by a second bus system 3304. It can be understood that the second bus system 3304 is used to implement connection communications between these components. The second bus system 3304 includes a power bus, a control bus and a status signal bus in addition to a data bus. However, the various buses are designated as the second bus system 3304 in FIG. 25 for clarity.

The second communication interface 3301 is used to receive and transmit signals in the process of transmitting and receiving information with other external network elements.

The second memory 3302 is used to store computer programs executable on the second processor 3303.

The second processor 3303 is used to, when executing the computer programs, perform operations of:

determining reference sample values of a first colour component of a current block;

determining, according to the reference sample values of the first colour component of the current block, weighting coefficients through a neural network model, herein, an input of the neural network model includes the reference sample values of the first colour component of the current block;

determining a prediction block of a second colour component of the current block according to the weighting coefficients and reference sample values of the second colour component of the current block; and determining reconstructed values of second colour component samples of the current block according to the prediction block.

Optionally, as another embodiment, the second processor 3303 is further configured to perform the method of any of the aforementioned embodiments when executing the computer programs.

It will be understood that the second memory 3302 is similar in hardware function to the first memory 3102, and the second processor 3303 is similar in hardware function to the first processor 3103, which will not be described in details here.

The embodiment provides a decoding device, and the decoding device may include the decoding apparatus 320 described in the previous embodiment. For the decoding device, by making full use of the colour component information in the neighbouring region of the current block and the colour component information in the current block, multiple types of available input information can be provided for the network-based weight chroma prediction, and thus the chroma prediction can be better performed. Furthermore, by learning a correlation between the reference chroma and the chroma to be predicted of the current block through the neural network, and using the correlation for the chroma prediction of the current block, the accuracy of the chroma prediction can be further improved, the bit rate can be saved, and the encoding and decoding performance can be improved at the same time.

Figure 26:
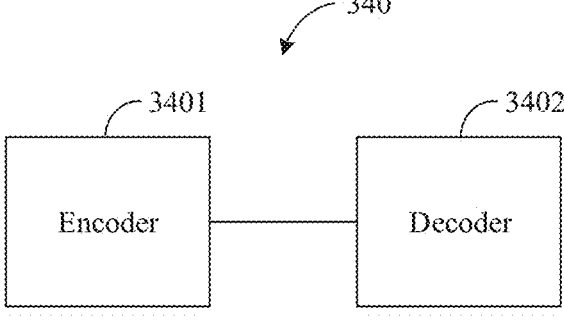
FIG. 26 is a schematic diagram of a composition structure of a codec system according to an embodiment of the present disclosure.

In still another embodiment of the present disclosure, referring to FIG. 26, a schematic diagram of a composition structure of a codec system according to an embodiment of the present disclosure is shown. As shown in FIG. 26, the codec system 340 may include an encoder 3401 and a decoder 3402. The encoder 3401 may be a device integrated with the encoding apparatus 300 described in the foregoing embodiment, or may be the encoding device 310 described in the foregoing embodiment. The decoder 3402 may be a device integrated with the decoding apparatus 320 described in the foregoing embodiment, or may be the decoding device 330 described in the foregoing embodiment.

In the embodiment of the present disclosure, in the codec system 340, both the encoder 3401 and the decoder 3402, can make full use of the colour component information in the neighbouring region of the current block and the colour component information in the current block, can provide multiple types of available input information for the network-based weight chroma prediction, and thus can better perform the chroma prediction. In addition, both the encoder 3401 and the decoder 3402, can learn a correlation between the reference chroma and the chroma to be predicted of the current block through the neural network, and use the correlation for the chroma prediction of the current block, so that the accuracy of the chroma prediction can be further improved, the bit rate can be saved, and the encoding and decoding performance can be improved at the same time.

It should be noted that, as used herein, the terms "including," "comprising," or any other variation thereof are intended to encompass non-exclusive inclusion, so that a process, a method, an object, or an apparatus comprising a set of elements includes not only those elements but also other elements not explicitly listed, or also includes elements inherent to such a process, a method, an object, or an apparatus. In the absence of further limitations, an element defined by the phrase "comprises an . . . " does not preclude the existence of another identical element in the process, the method, the object, or the apparatus including the element.

The above serial numbers of the embodiments of the present disclosure are for description only and do not represent advantages and disadvantages of the embodiments.

The methods disclosed in several method embodiments provided in the present disclosure can be arbitrarily combined without conflict, to obtain new method embodiments.

Features disclosed in several product embodiments provided in the present disclosure can be arbitrarily combined without conflict, to obtain new product embodiments.

Features disclosed in several method or device embodiments provided in the present disclosure can be arbitrarily combined without conflict, to obtain new method embodiments or device embodiments.

The above is only the specific embodiments of the present disclosure, but the scope of protection of the present disclosure is not limited to this. Any modifications and variations that can be easily known by the person skilled in the technical field within the technical scope disclosed in the present disclosure shall be included in the scope of protection of the present disclosure. Therefore, the scope of protection of the present disclosure shall be subject to the scope of protection of the claims.

INDUSTRIAL APPLICABILITY

In the embodiments of the present disclosure, in both an encoding side and a decoding side: an encoding device, a decoding device and a storage medium. In both an encoding side and a decoding side: reference sample values of a first colour component of a current block are determined; according to the reference sample values of the first colour component of the current block, weighting coefficients are determined through a neural network model, herein, an input of the neural network model includes the reference sample values of the first colour component of the current block; a prediction block of a second colour component of the current block is determined according to the weighting coefficients and reference sample values of the second colour component of the current block. So that at the encoding side, prediction difference values of second colour component samples of the current block can be determined according to the prediction block, and the prediction difference values are signalled in a bitstream. At the decoding side, reconstructed values of second colour component samples of the current block are determined according to the prediction block and the decoded prediction difference values. In this way, existing information, including the colour component information in the neighbouring region of the current block and the colour component information in the current block, of the current block is sufficiently obtained, multiple types of available input information can be provided for the network-based weight chroma prediction, and thus the chroma prediction can be better performed. In addition, by taking the luma difference between the reference pixel and the current block or a result after performing a correlation process on the luma difference as one of the inputs of the neural network, and by learning a correlation between the reference chroma and the chroma to be predicted of the current block through the neural network, and using the correlation for the chroma prediction of the current block, the accuracy of the chroma prediction can be further improved, the bit rate can be saved, and the encoding and decoding performance can be improved at the same time.

The invention claimed is:

1. A decoding method, comprising:
determining reference sample values of a first colour component of a current block;
determining, according to the reference sample values of the first colour component of the current block, weighting coefficients through a neural network model, wherein an input of the neural network model comprises the reference sample values of the first colour component of the current block;
determining a prediction block of a second colour component of the current block according to the weighting coefficients and reference sample values of the second colour component of the current block; and
determining reconstructed values of second colour component samples of the current block according to the prediction block,
wherein determining the reference sample values of the first colour component of the current block comprises:

determining neighbouring reference values of the first colour component of the current block according to first colour component samples in a neighbouring region of the current block; and
determining the reference sample values of the first colour component of the current block according to reconstructed values of the first colour component samples in the current block and the neighbouring reference values of the first colour component of the current block, which comprises:
determining a reference value of the first colour component of the current block according to the reconstructed values of the first colour component samples in the current block; and
determining the reference sample values of the first colour component of the current block according to the reference value of the first colour component in the current block and the neighbouring reference values of the first colour component of the current block,
wherein the method further comprises:
determining that each reference sample value of the first colour component of the current block is an absolute value of a difference between a respective neighbouring reference value of the first colour component of the current block and the reference value of the first colour component in the current block, or
determining that the reference sample values of the first colour component of the current block comprise N matrices, wherein N represents a number of the reference sample values of the second colour component of the current block, a k-th matrix comprises an absolute value of a difference between a k-th value among the neighbouring reference values of the first colour component of the current block and the reference value of the first colour component in the current block, k=0, 1, . . . , N−1.

2. The method of claim 1, wherein the neighbouring region comprises at least one of: an upper neighbouring region, an upper-right neighbouring region, a left neighbouring region and a bottom-left neighbouring region.

3. The method of claim 1, wherein determining, according to the reference sample values of the first colour component of the current block, the weighting coefficients through the neural network model comprises:
determining an output of the neural network model as the weighting coefficients by taking the N matrices as the input of the neural network model,
wherein the method further comprises:
determining values corresponding to the N matrices under a preset mapping relationship; and
determining the reference sample values of the first colour component of the current block according to the values corresponding to the N matrices under the preset mapping relationship.

4. The method of claim 3, wherein determining, according to the reference sample values of the first colour component of the current block, the weighting coefficients through the neural network model comprises:
determining an output of the neural network model as the weighting coefficients by taking the values corresponding to the N matrices under the preset mapping relationship as the input of the neural network model,
wherein
the preset mapping relationship is a Softmax function, or
the preset mapping relationship is a weighting function having an inverse relationship with the k-th matrix.

5. The method of claim 1, wherein the determining neighbouring reference values of the first colour component of the current block according to first colour component samples in a neighbouring region of the current block comprises:

determining the neighbouring reference values of the first colour component of the current block by performing a screening process on values of the first colour component samples in the neighbouring region, wherein the determining the neighbouring reference values of the first colour component of the current block by performing the screening process on the values of the first colour component samples in the neighbouring region comprises:

determining positions of samples to be selected based on positions and/or colour component intensities of the first colour component samples in the neighbouring region; and determining, according to the positions of the samples to be selected, the neighbouring reference values of the first colour component of the current block from the neighbouring region.

6. The method of claim 1, wherein the determining neighbouring reference values of the first colour component of the current block according to first colour component samples in a neighbouring region of the current block comprises:

determining the neighbouring reference values of the first colour component of the current block by performing a first filtering process on values of the first colour component samples in the neighbouring region.

7. The method of claim 1, wherein the determining a reference value of the first colour component of the current block according to the reconstructed values of the first colour component samples in the current block comprises:

determining the reference value of the first colour component in the current block by performing a second filtering process on the reconstructed values of the first colour component samples in the current block.

8. The method of claim 1, wherein determining, according to the reference sample values of the first colour component of the current block, the weighting coefficients through the neural network model comprises:

determining an output of the neural network model as the weighting coefficients by taking the reference value of the first colour component in the current block and the neighbouring reference values of the first colour component of the current block as the input of the neural network model, or obtaining first concatenated information by performing a concatenating process on the reference value of the first colour component in the current block and the neighbouring reference values of the first colour component of the current block; and determining an output of the neural network model as the weighting coefficients by taking the first concatenated information as the input of the neural network model, or determining an output of the neural network model as the weighting coefficients by taking the reference sample values of the first colour component of the current block and the reference sample values of the second colour component of the current block as the input of the neural network model, or determining the output of the neural network model as the weighting coefficients by taking the reference value of the first colour component in the current block, the neighbouring reference values of the first colour component of the current block and the reference sample values of the second colour component of the current block as the input of the neural network model, or obtaining second concatenated information by performing a concatenating process on the reference value of the first colour component in the current block and the neighbouring reference values of the first colour component of the current block; and determining the output of the neural network model as the weighting coefficients by taking the second concatenated information and the reference sample values of the second colour component of the current block as the input of the neural network model, or obtaining third concatenated information by performing a concatenating process on the reference value of the first colour component in the current block, the neighbouring reference values of the first colour component of the current block and the reference sample values of the second colour component of the current block; and determining the output of the neural network model as the weighting coefficients by taking the third concatenated information as the input of the neural network model.

9. The method of claim 1, wherein the neural network model is a convolutional neural network model, and the convolutional neural network model comprises at least one basic unit and a target unit, wherein the basic unit comprises at least a first convolutional layer and a first activation function; and the target unit comprises at least a second convolutional layer and a second activation function, or wherein the neural network model is a fully connected neural network model, and the fully connected neural network model comprises at least one basic unit and a target unit, wherein the basic unit comprises at least a first fully connected layer and a first activation function; and the target unit comprises at least a second fully connected layer and a second activation function.

10. An encoding method, comprising:

determining reference sample values of a first colour component of a current block;

determining, according to the reference sample values of the first colour component of the current block, weighting coefficients through a neural network model, wherein an input of the neural network model comprises the reference sample values of the first colour component of the current block;

determining a prediction block of a second colour component of the current block according to the weighting coefficients and reference sample values of the second colour component of the current block; and determining prediction difference values of second colour component samples of the current block according to the prediction block, wherein determining the reference sample values of the first colour component of the current block comprises:

determining neighbouring reference values of the first colour component of the current block according to first colour component samples in a neighbouring region of the current block; and determining the reference sample values of the first colour component of the current block according to reconstructed values of the first colour component samples in the current block and the neighbouring reference values of the first colour component of the current block, which comprises:

determining a reference value of the first colour component of the current block according to the reconstructed values of the first colour component samples in the current block; and determining the reference sample values of the first colour component of the current block according to the reference value of the first colour component in the current block and the neighbouring reference values of the first colour component of the current block, wherein the method further comprises:

determining that each reference sample value of the first colour component of the current block is an absolute value of a difference between a respective neighbouring reference value of the first colour component of the current block and the reference value of the first colour component in the current block, or determining that the reference sample values of the first colour component of the current block comprise N matrices, wherein N represents a number of the reference sample values of the second colour component of the current block, a k-th matrix comprises an absolute value of a difference between a k-th value among the neighbouring reference values of the first colour component of the current block and the reference value of the first colour component in the current block, k=0, 1, . . . , N−1.

11. The method of claim 10, wherein the neighbouring region comprises at least one of: an upper neighbouring region, an upper-right neighbouring region, a left neighbouring region and a bottom-left neighbouring region.

12. The method of claim 10, wherein determining, according to the reference sample values of the first colour component of the current block, the weighting coefficients through the neural network model comprises:

determining an output of the neural network model as the weighting coefficients by taking the N matrices as the input of the neural network model.

13. The method of claim 10, further comprising:

determining values corresponding to the N matrices under a preset mapping relationship; and determining the reference sample values of the first colour component of the current block according to the values corresponding to the N matrices under the preset mapping relationship, wherein determining, according to the reference sample values of the first colour component of the current block, the weighting coefficients through the neural network model comprises:

determining an output of the neural network model as the weighting coefficients by taking the values corresponding to the N matrices under the preset mapping relationship as the input of the neural network model.

14. The method of claim 13, wherein the preset mapping relationship is a Softmax function, or the preset mapping relationship is a weighting function having an inverse relationship with the k-th matrix.

15. The method of claim 10, further comprising:

determining the neighbouring reference values of the first colour component of the current block by performing a screening process on values of the first colour component samples in the neighbouring region, wherein the determining the neighbouring reference values of the first colour component of the current block by performing the screening process on the values of the first colour component samples in the neighbouring region comprises:

determining positions of samples to be selected based on positions and/or colour component intensities of the first colour component samples in the neighbouring region; and determining, according to the positions of the samples to be selected, the neighbouring reference values of the first colour component of the current block from the neighbouring region.

16. A decoding device, comprising a memory and a processor, wherein the memory is configured to store computer programs executable on the processor; and the processor is configured to perform operations of:

determining reference sample values of a first colour component of a current block;

determining, according to the reference sample values of the first colour component of the current block, weighting coefficients through a neural network model, wherein an input of the neural network model comprises the reference sample values of the first colour component of the current block;

determining a prediction block of a second colour component of the current block according to the weighting coefficients and reference sample values of the second colour component of the current block; and determining reconstructed values of second colour component samples of the current block according to the prediction block, wherein determining the reference sample values of the first colour component of the current block comprises:

determining neighbouring reference values of the first colour component of the current block according to first colour component samples in a neighbouring region of the current block; and determining the reference sample values of the first colour component of the current block according to reconstructed values of the first colour component samples in the current block and the neighbouring reference values of the first colour component of the current block, which comprises:

determining a reference value of the first colour component of the current block according to the reconstructed values of the first colour component samples in the current block; and determining the reference sample values of the first colour component of the current block according to the reference value of the first colour component in the current block and the neighbouring reference values of the first colour component of the current block, wherein the processor is configured to further perform an operation of:

determining that each reference sample value of the first colour component of the current block is an absolute value of a difference between a respective neighbouring reference value of the first colour component of the current block and the reference value of the first colour component in the current block, or determining that the reference sample values of the first colour component of the current block comprise N matrices, wherein N represents a number of the reference sample values of the second colour component of the current block, a k-th matrix comprises an absolute value of a difference between a k-th value among the neighbouring reference values of the first colour component of the current block and the reference value of the first colour component in the current block, k=0, 1, . . . , N−1.

17. A non-transitory computer-readable storage medium, having a computer program and a bitstream stored thereon, wherein the computer program, when executed by a processor, enables the processor to perform the steps of the encoding method of claim 10 to generate the bitstream.

* * * * *